United States Patent [19]
Yoshimura et al.

[11] Patent Number: 5,917,980
[45] Date of Patent: Jun. 29, 1999

[54] OPTICAL CIRCUIT DEVICE, ITS MANUFACTURING PROCESS AND A MULTILAYER OPTICAL CIRCUIT USING SAID OPTICAL CIRCUIT DEVICE

[75] Inventors: Tetsuzo Yoshimura; Satoshi Tatsuura; Wataru Sotoyama; Yasuhiro Yoneda; Katsusada Motoyoshi; Koji Tsukamoto; Takeshi Ishitsuka, all of Kawasaki, Japan

[73] Assignee: Fujitsu Limited, Kanagawa, Japan

[21] Appl. No.: 08/028,550

[22] Filed: Mar. 8, 1993

[30] Foreign Application Priority Data

| Mar. 6, 1992 | [JP] | Japan | 4-048961 |
| Mar. 11, 1992 | [JP] | Japan | 4-052206 |
| Jun. 18, 1992 | [JP] | Japan | 4-159350 |
| Jul. 7, 1992 | [JP] | Japan | 4-179909 |
| Jul. 16, 1992 | [JP] | Japan | 4-189554 |

[51] Int. Cl.$^6$ .................................... G02B 6/10
[52] U.S. Cl. ................ 385/129; 385/14; 385/130; 385/131; 385/132; 385/141; 385/122; 385/41
[58] Field of Search .................................... 385/2, 5, 7, 8, 385/9, 11, 14, 16, 24, 27, 40, 41, 43, 129, 130, 131, 132, 141, 142, 143, 145, 122; 359/1, 15, 22, 27, 34, 35

[56] References Cited

U.S. PATENT DOCUMENTS

| 3,885,856 | 5/1975 | Ostrowsky et al. | 359/15 X |
| 4,783,136 | 11/1988 | Elman et al. | 385/130 |
| 4,798,426 | 1/1989 | Malcolm et al. | 359/15 X |
| 5,045,365 | 9/1991 | Fang | 385/122 |
| 5,108,201 | 4/1992 | Matsuura et al. | 385/143 |
| 5,138,687 | 8/1992 | Horie et al | 385/129 |
| 5,207,862 | 5/1993 | Baker et al. | 156/600 |

OTHER PUBLICATIONS

Applied Physics Letters, vol. 56, No. 2, "Epitaxial Growth of Aligned Polydiacetylene Films on Anisotropic Orienting Polymers", by J.S. Patel et al, pp., 131–133, Jan. 8, 1990.

Applied Physics Letters, vol. 51, No. 23, "Highly Oriented Polydiacetylene Films by Vacuum Deposition", by T. Kanetake et al, pp., 1957–1959, Dec. 7, 1987.

Primary Examiner—Brian Healy
Attorney, Agent, or Firm—Nikaido Marmelstein Murray & Oram, LLP

[57] ABSTRACT

An optical circuit device is manufactured by forming an organic film formed on a substrate, and giving this organic film non-linear optical properties. An optical circuit device is formed containing an organic film formed on a substrate, wherein said film is either selectively formed on a portion of the region on a substrate or said film being formed over the entire region on a substrate, and a portion of a region of that film is either selectively formed to a thickness differing from other regions or selectively having a different structure. This optical circuit device can be manufactured to have various constitutions, and allows the formation of a multilayer optical circuit.

21 Claims, 58 Drawing Sheets

SiOₓ
OBLIQUE
EVAPORATION
DEPOSITED
FILM

X DIRECTION

Y DIRECTION

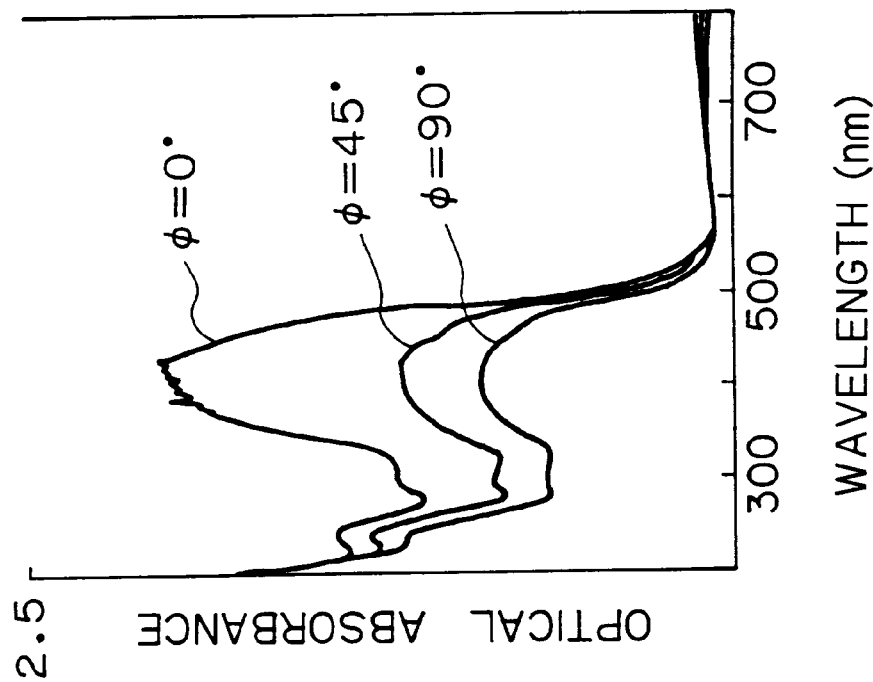
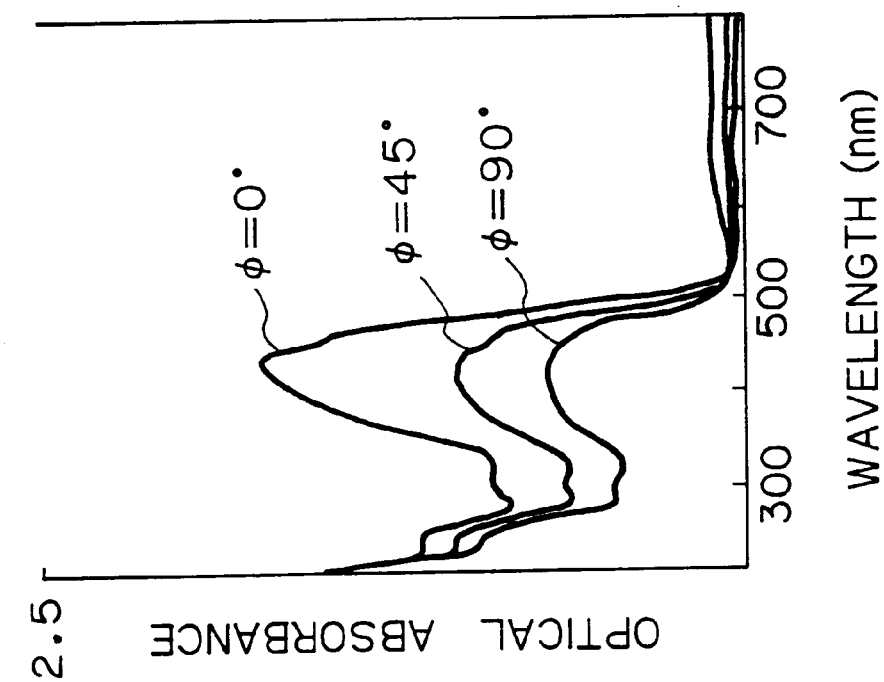

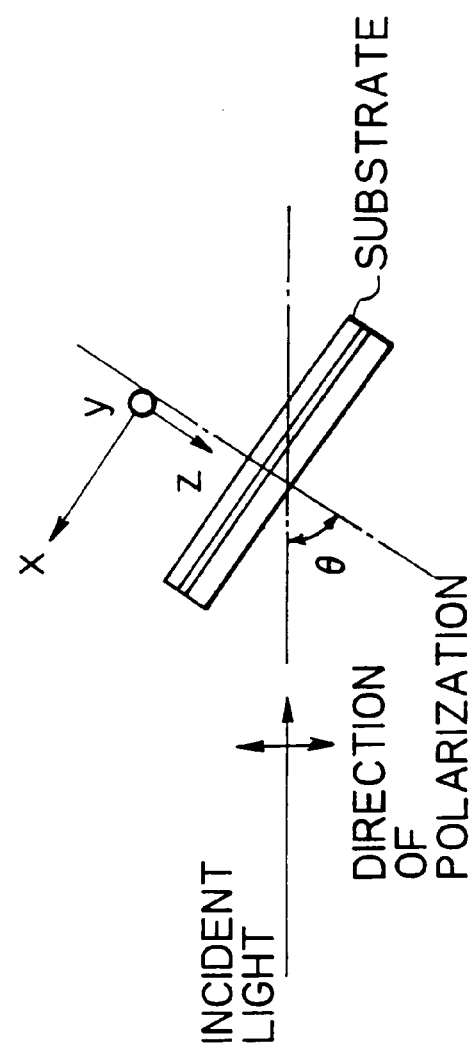
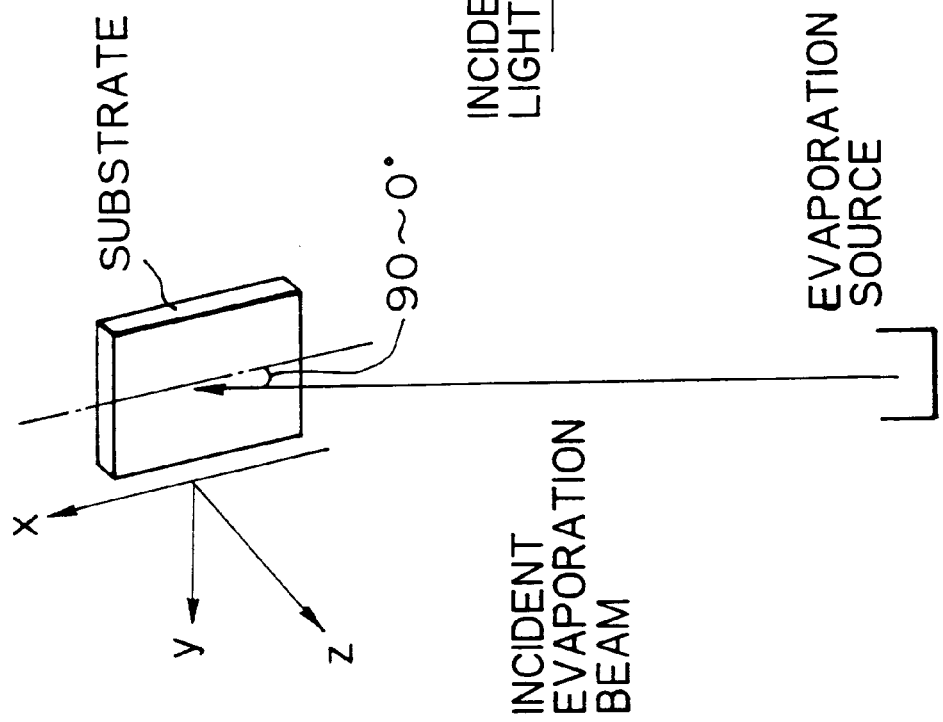

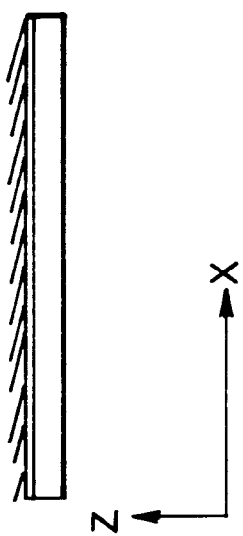
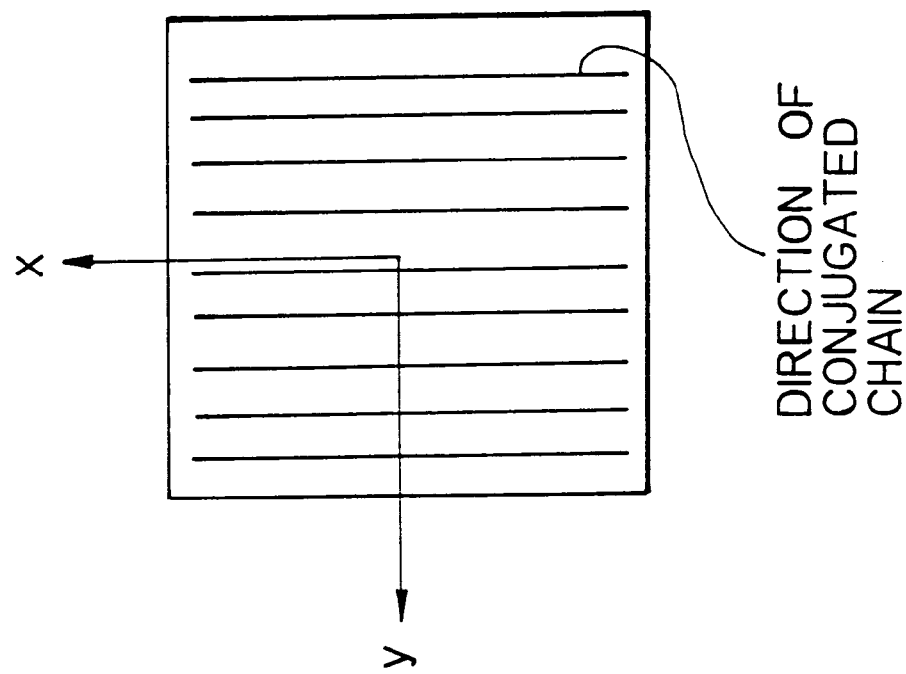

━━━ WAVEGUIDE OF FIRST LAYER  ▨ ELECTRODE
─── WAVEGUIDE OF SECOND LAYER
──── WAVEGUIDE OF THIRD LAYER

===== WAVEGUIDE OF FIRST LAYER
────── WAVEGUIDE OF SECOND LAYER

═══ WAVEGUIDE OF FIRST LAYER
─── WAVEGUIDE OF SECOND LAYER

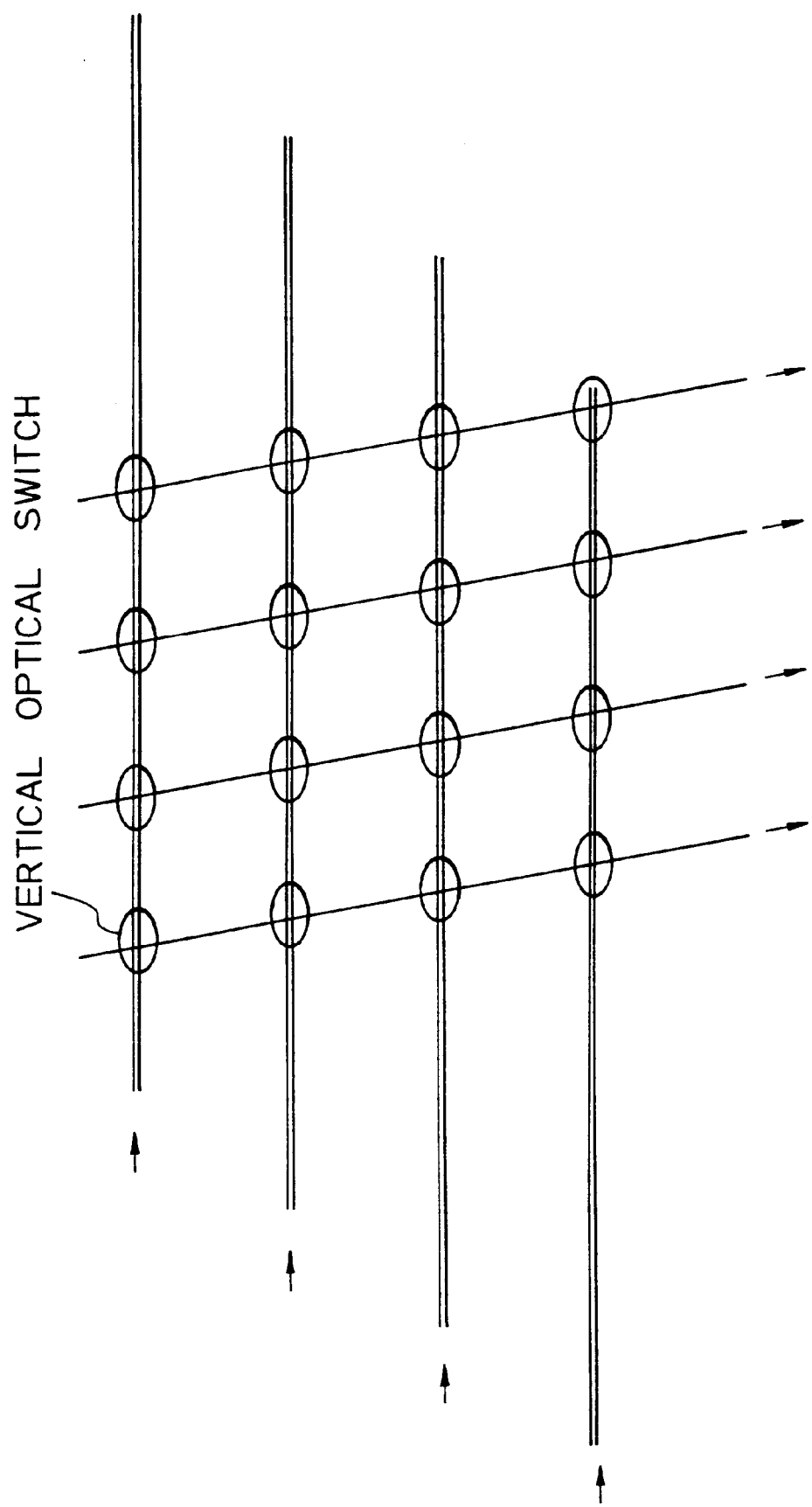

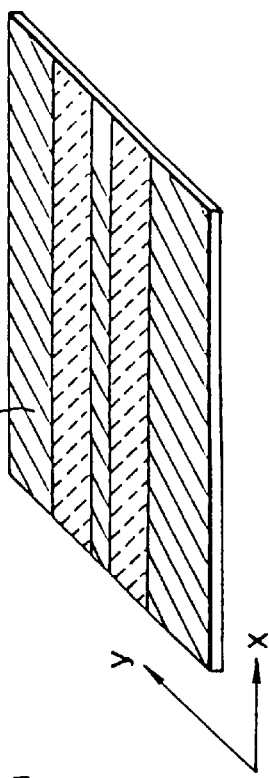
Fig. 27a
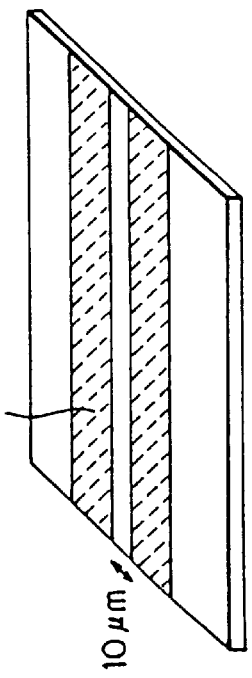
Fig. 27b DIELECTRIC FILM
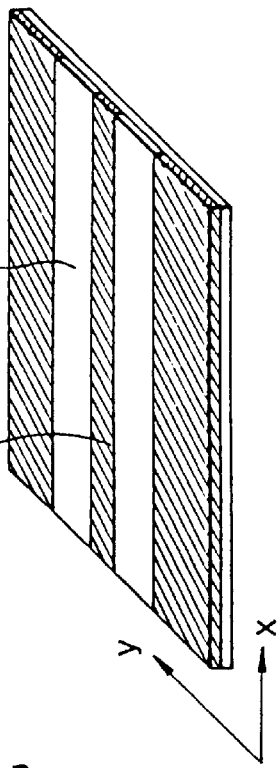
Fig. 27d ALIGNED(∥y)POLYMER RANDOM POLYMER
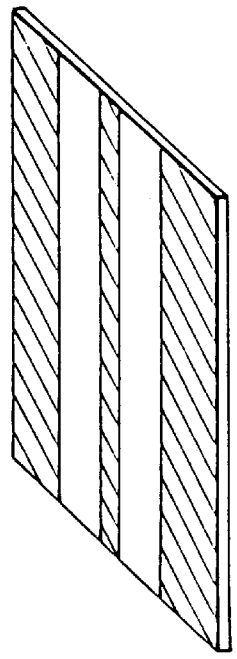
Fig. 27c Fig. 35b
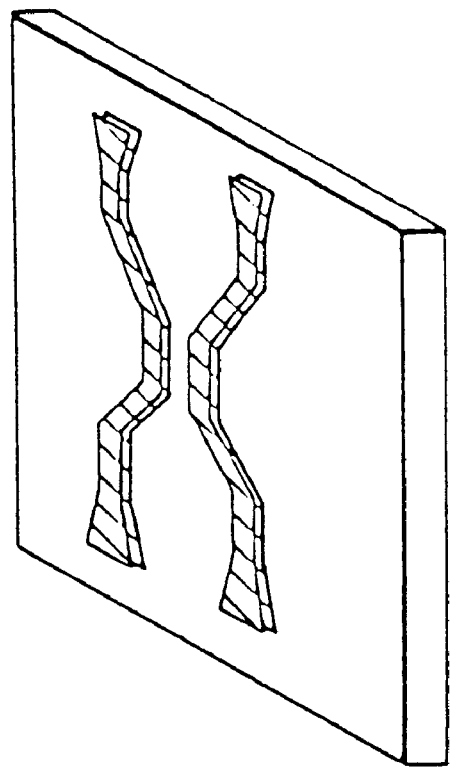
Fig. 35a
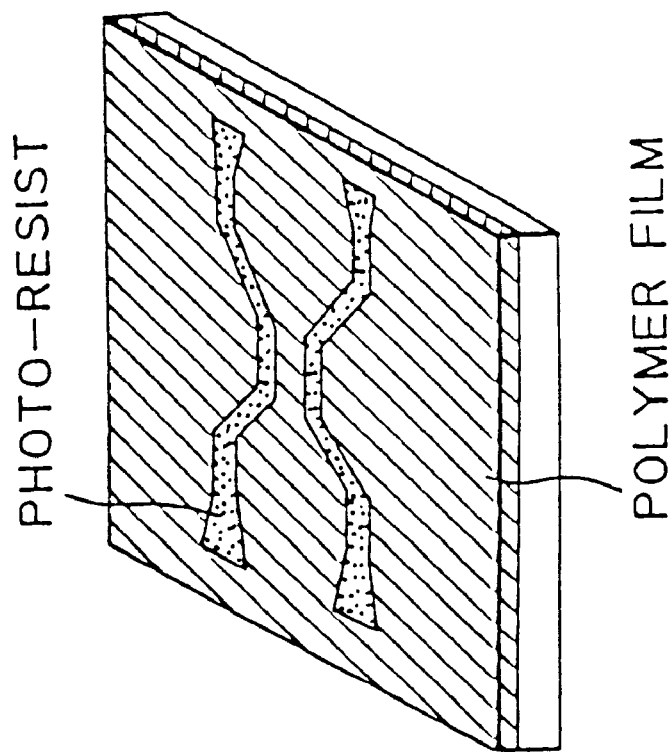
PHOTO-RESIST
POLYMER FILM

PHOTORESIST

DIELECTRIC FILM

ALIGNED(//y)POLYMER
RANDOM POLYMER

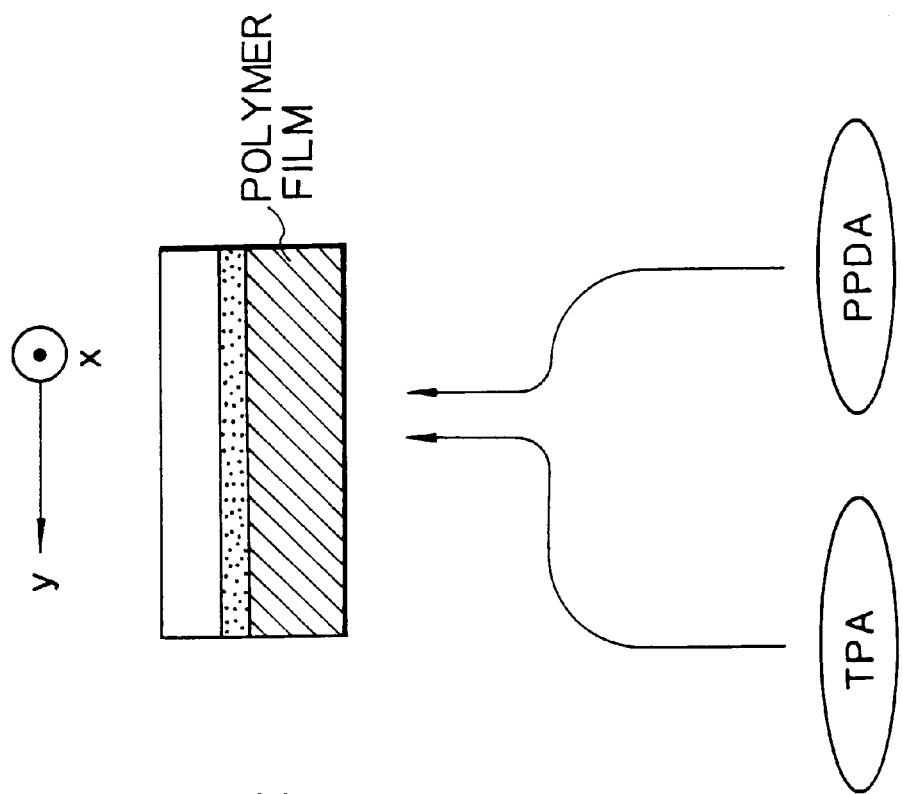
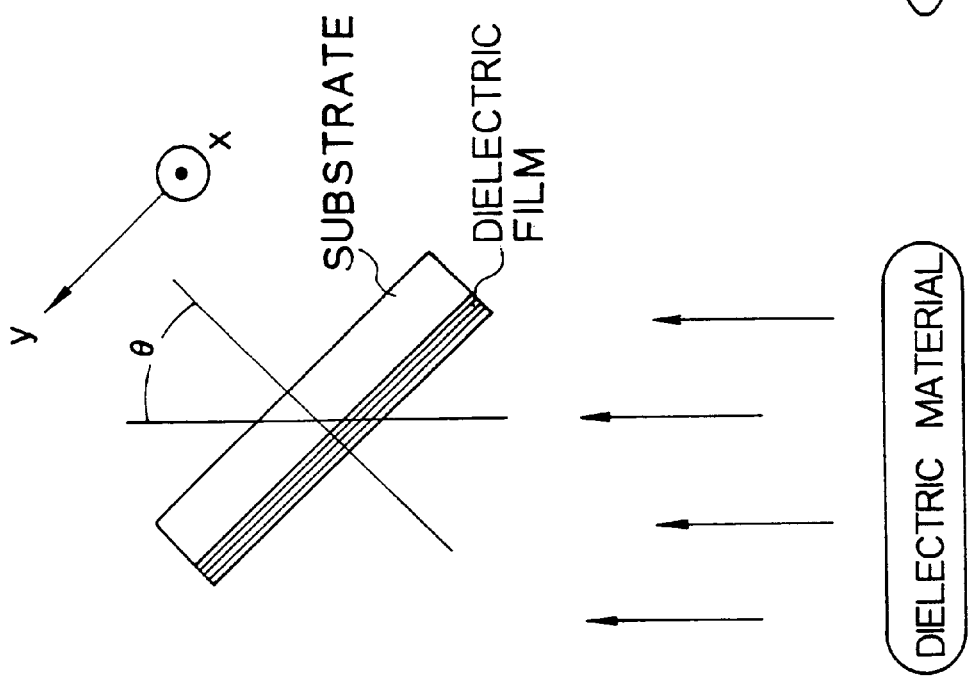

Fig. 50a  Fig. 50b
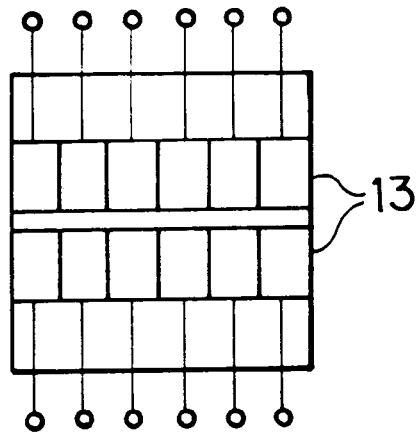
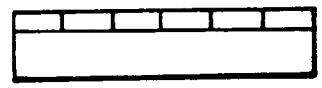
Fig. 51a  Fig. 51b
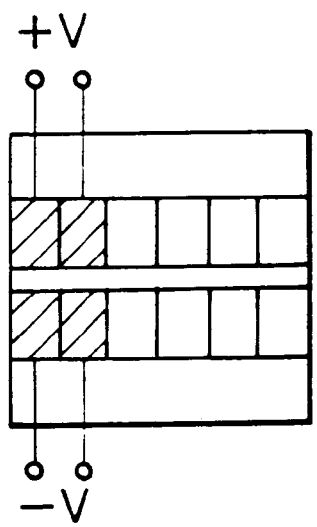
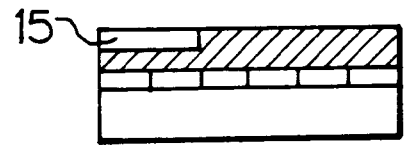

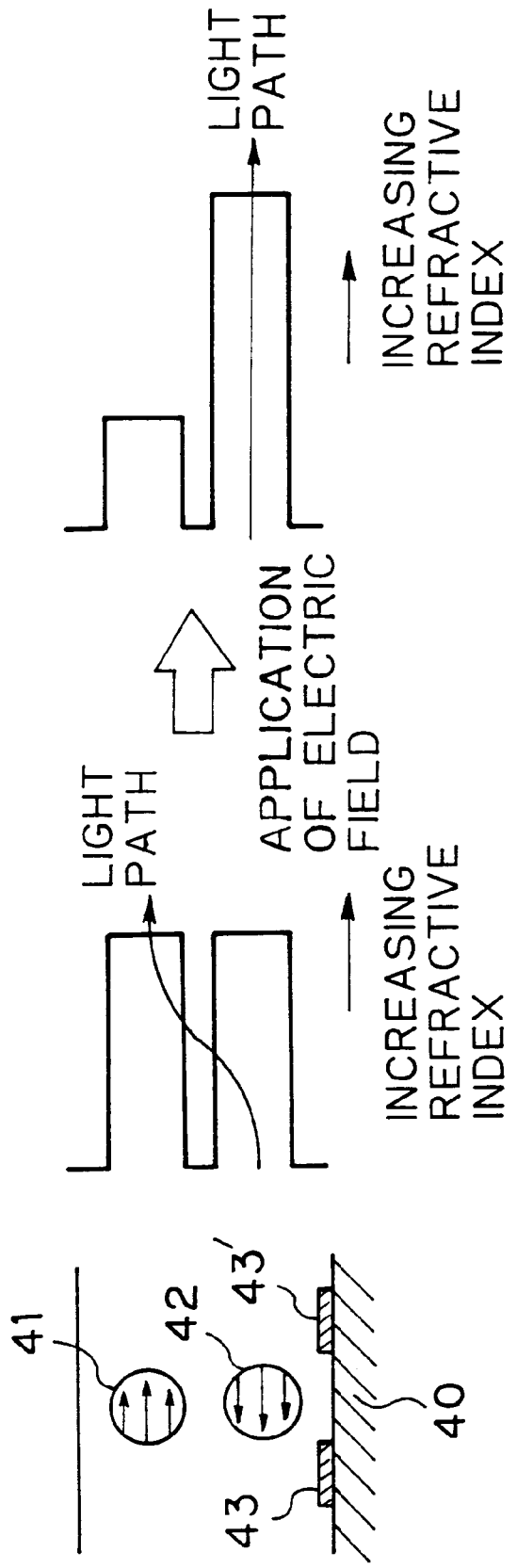

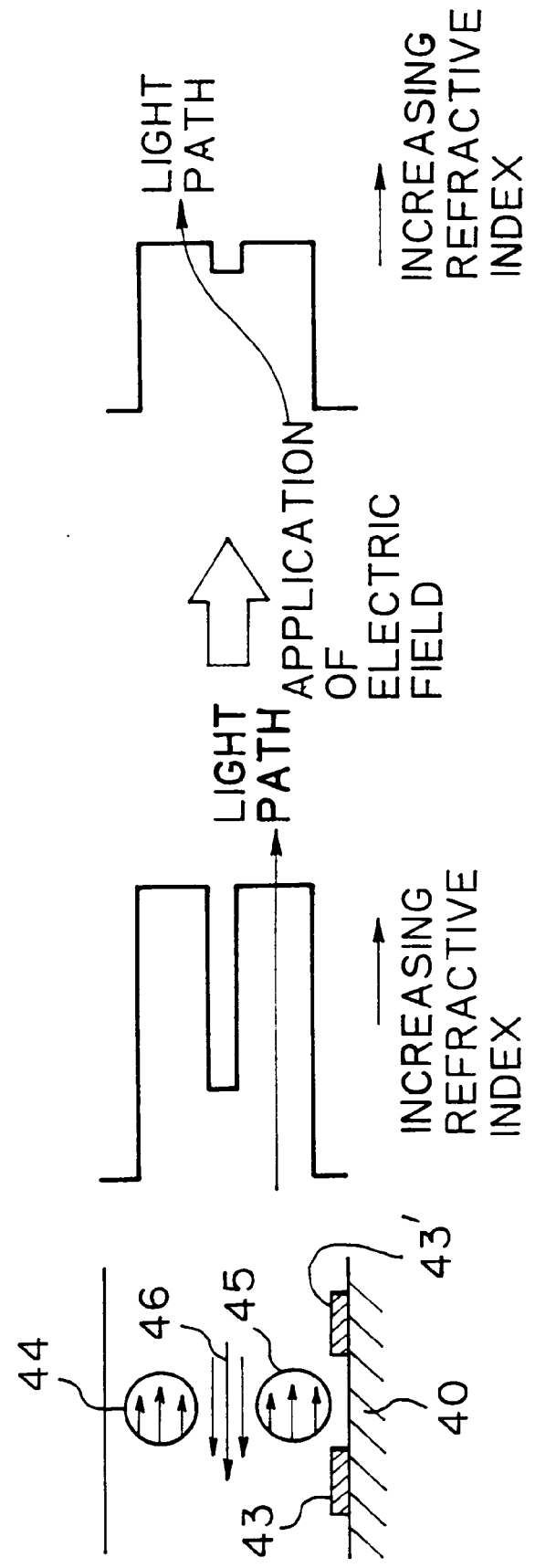

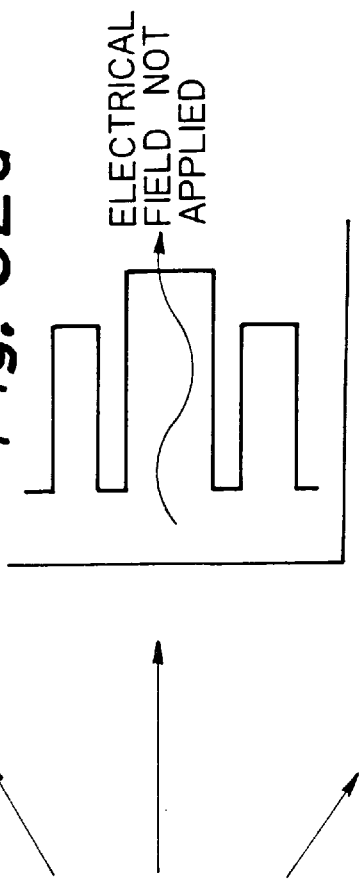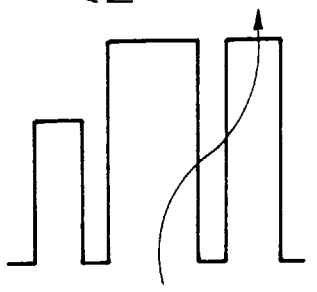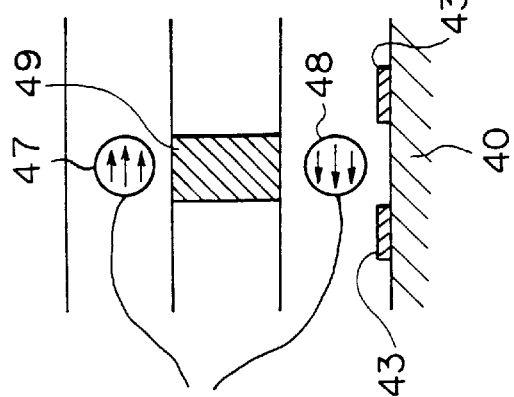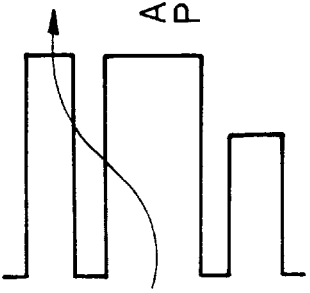

OPTICAL CIRCUIT DEVICE, ITS MANUFACTURING PROCESS AND A MULTILAYER OPTICAL CIRCUIT USING SAID OPTICAL CIRCUIT DEVICE

BACKGROUND OF THE INVENTION

1. Field of the Invention

This invention relates to a process for selectively forming an organic film, and a process for selectively controlling the orientation of that organic film. In addition, this invention relates to an optical waveguide, a multilayer optical circuit, an electrical wiring and a TFT. In addition, this invention relates to an optical waveguide, a multilayer optical circuit, an electrical wiring that are formed using the above-mentioned organic film forming process.

2. Description of the Related Art

As an example of a process for manufacturing an organic film wherein an optical waveguide is formed, a process is known wherein an organic film is formed on a substrate using spin coating, this organic film is etched using reaction ion etching and patterned into the form of an optical waveguide.

In order to improve the performance of non-linear optical materials and other organic functional materials, it is necessary to control the orientation of an organic film grown on a substrate. In the past, oriented film coating has been realized within the substrate surface of a diacetylene thin film by a rubbing film. (J. S. Patel et al., Applied Physics Letters 56, 131(1992); T. Kanetake et al., Applied physics Letters 51, 1957 (1987)).

Optical circuits are playing important roles in various types of optical systems including optical interconnection of computers and optical exchanges. An example of an optical circuit of the prior art is indicated in FIG. 17. This optical circuit performs transmission of signals by coupling the IC with optical waveguides.

In the case of forming an organic film using spin coating, forming this organic film into a pattern and forming it into the form of an optical waveguide, light scattering tends to occur easily due to the rough edges of the patterned organic film. In addition, this type of formation also has the problem of etching processing of the organic film of a thickness on the micron order requiring considerable time.

Although waveguide formation by optical polymerization presents few problems in terms of light scattering, this type of formation has problems including the materials being limited and control of molecular orientation being difficult.

In the case of forming non-linear optical waveguides, it is desirable to orient the lengthwise axial direction of the molecules that form the vaveguide in the direction of polarization of the light. However, the above-mentioned processes of the prior art have the problem of molecular orientation being random. In the case of forming an electrical wiring using conductive organic materials as well, it is also desirable to make the orientation of molecules in the wiring uniform. Although orientation by drawing is also considered, since this is limited to cases wherein the base substrate is soft and there is the risk of defects occurring in the film, it is not a suitable process for manufacturing of devices.

Moreover, in the case of coupling an optical waveguide and an opto-electronic device, it is necessary to improve the adhesion between the two. However, the processes of the prior art had the problem of a gap tending to form easily between the device and the waveguide.

In addition, oriented film coating by a rubbing film has problems including those with respect to the flatness of the film, and the incorporation of a mechanical rubbing step in manufacturing processes of various photonics devices is itself not preferable. Although it is possible to control orientation by using organic single crystal for the substrate, due to the tremendous restrictions on the substrate, it is difficult to apply this to practical integrated devices.

In addition, with respect to optical circuits, as the number of IC increase and connections become increasingly complex, it is necessary for the waveguides to frequently intersect. In addition, it also becomes important to provide smooth interfaces between semiconductor lasers and photodiodes. Moreover, when optical switch and optical modulator functions are attempted to be demonstrated with waveguides, it becomes necessary to use non-linear optical materials. Normally, due to the large optical loss associated with non-linear optical waveguides, it is desirable to suppress the minimum length required for switching and wire the other portions with low-loss passive waveguides, thus making the multi-layering of optical circuits desirable.

SUMMARY OF THE INVENTION

The object of the present invention is the elimination of these shortcomings by providing a process for manufacturing a patterned organic film having a low level of light scattering, a process for controlling the orientation of an organic film, and a multilayer optical circuit.

According to the present invention, in order to solve the above-mentioned problems, an optical circuit device is provided containing an organic film formed on a substrate, said organic film either being selectively formed on a portion of the region of said substrate or said film being selectively formed over the entire region on a substrate, and a portion of a region of that film either being selectively formed to a thickness differing from other regions or selectively having a different structure.

BRIEF DESCRIPTION OF THE DRAWINGS

FIGS. 7a and 7b are graphs indicating the dichroism of a polyazomethine film on an $SiO_2$ EB evaporation deposited film.

FIGS. 13a and 13b are drawings indicating the relationship between a substrate and the direction of an incident evaporation beam, the direction of polarization and the direction of incident light.

FIGS. 16a and 16b are schematic drawings indicating the direction of polarization of a polymer chain

FIG. 26 is a drawing indicating an example of a matrix optical switch consisting of vertical optical switches.

FIGS. 27a through 27d are drawings of a process for manufacturing a polymer film.

FIGS. 35(a)–36(b) are explanatory drawings indicating one example of a process for forming an optical waveguide by etching.

FIGS. 36(a)–36(b) are explanatory drawings indicating an example wherein a core polymer chain is oriented during core formation.

FIGS. 40a and 40b are explanatory drawings of a process for forming a gate insulating film (or base film) and a following polymer semiconductor film.

FIGS. 50a and 50b are explanatory drawings of a process for manufacturing an optical waveguide curved in the vertical direction.

FIGS. 51a and 51b are explanatory drawings of a process for manufacturing an optical waveguide curved in the vertical direction.

FIGS. 60a through 60c are explanatory drawings of the principle of the optical switch between upper and lower waveguides of the present invention.

FIGS. 61a through 61c are explanatory drawings of the principle of the optical switch between upper and lower waveguides of the present invention.

FIGS. 62a through 62d are explanatory drawings of the principle of the optical switch between upper and lower waveguides of the present invention.

DESCRIPTION OF THE PREFERRED EMBODIMENTS

Figure 1A:
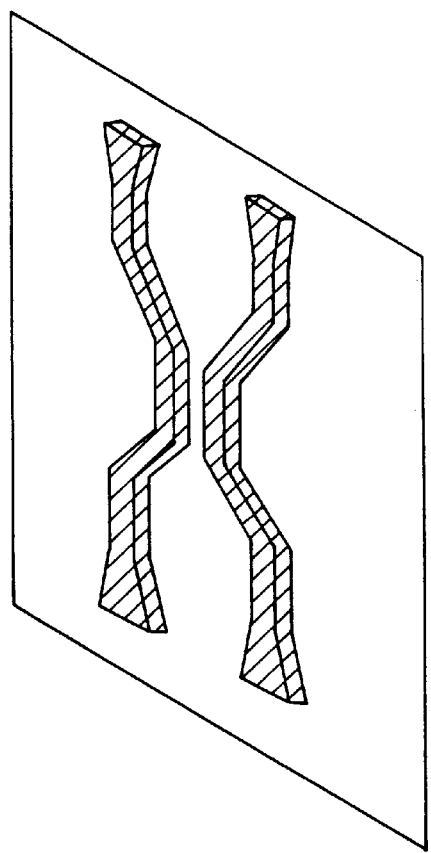
FIGS. 1a and 1b are explanatory drawings of an optical waveguide forming process.

Specific examples of optical circuit devices here are an optical waveguide, optical switch, optical modulator, waveguide lens, prism, mirror, waveguide grating, hologram, optical splitter, optical coupler, wavelength filter and optical branching device.

The optical circuit device of the present invention can be formed according to any of the organic film deposition means described below.

A first means is a process for manufacturing an organic film wherein an organic or inorganic thin film pattern is formed on a substrate, and an organic film is selectively formed on that pattern. A second means is a process for manufacturing an organic film wherein an organic or inorganic thin film pattern is formed on a substrate, and an organic film is selectively formed thicker than other regions on that pattern. A third means is a process for manufacturing an organic film wherein an organic or inorganic thin film pattern is formed on a substrate, and an organic film is selectively formed on regions other than on that pattern. A fourth means is a process for manufacturing an organic film wherein an organic or inorganic thin film pattern is formed on a substrate, and an organic film is selectively formed thinner than other regions on that pattern. A fifth means is a process for manufacturing an organic film wherein an organic or inorganic thin film pattern is formed on a substrate, and an organic film having a different structure is selectively formed on that pattern. A sixth means is a process for manufacturing an organic film wherein at least two different types of organic or inorganic thin films, or at least two organic or inorganic thin films of the same type but having different structures, are formed on a substrate; at least one type of said at least two types of organic or inorganic thin films is formed into a pattern; and, an organic film is selectively formed on that patterned organic or inorganic thin film. A seventh means is a process for manufacturing an organic film wherein at least two different types of organic or inorganic thin films, or at least two organic or inorganic thin films of the same type but having different structures, are formed on a substrate; at least one type of said at least two types of organic or inorganic thin films is formed into a pattern; and, an organic film is selectively formed thicker than other regions on that patterned organic or inorganic thin film. An eighth means is a process for manufacturing an organic film wherein at least two different types of organic or inorganic thin films, or at least two organic or inorganic thin films of the same type but having different structures, are formed on a substrate; at least one type of said at least two types of organic or inorganic thin films is formed into a pattern; and, an organic film is selectively formed on regions other than on that patterned organic or inorganic thin film. A ninth means is a process for manufacturing an organic film wherein at least two different types of organic or inorganic thin films, or at least two organic or inorganic thin films of the same type but having different structures, are formed on a substrate; at least one type of said at least two types of organic or inorganic thin films is formed into a pattern; and, an organic film is selectively formed thinner than other regions on that patterned organic or inorganic thin film. A tenth means is a process for manufacturing an organic film wherein at least two different types of organic or inorganic thin films, or at least two organic or inorganic thin films of the same type but having different structures, are formed on a substrate; at least one type of said at least two types of organic or inorganic thin films is formed into a pattern; and, an organic film having a different structure is selectively formed on that patterned organic or inorganic thin film.

An organic film can be oriented by forming the above-mentioned organic or inorganic thin film of the base by tilting the substrate by 10° to 90° with respect to the direction of the projected atoms or molecules using vapor phase deposition. Furthermore, it is preferable that the above-mentioned vapor phase deposition be evaporation deposition, sputtering, MLD (molecular layer deposition), MBD (molecular beam deposition), MBE (molecular beam epitaxy), ion plating or cluster ion evaporation deposition. In addition, surface treatment in a liquid or gas atmosphere may be performed following the above-mentioned formation of an organic or inorganic thin film. In addition, it is preferable that the above-mentioned inorganic film be a silicon oxide film, and that the above-mentioned organic film be comprised of a polyazomethine or polyimide material. In addition, a polymer film may be coated by spin coating followed by rubbing treatment and patterning. Conversely, rubbing treatment may also be performed after patterning. Alternatively, a patterned resist may be formed on a polymer film followed by performing rubbing on only the portion of the pattern window.

An optical waveguide, optical waveguide buffer clad layer, and conductive wiring can be formed using the above-mentioned process for manufacturing an organic film.

A multilayer optical circuit is accomplished by a multilayer optical circuit having a means wherein the above-mentioned optical waveguide is formed in multiple layers, and light migrates between at least one portion of the upper layer optical waveguide and at least one portion of the lower layer optical waveguide. Furthermore, examples of the above-mentioned means for migrating light include a method using a directional coupler, a method that increases or decreases the width of the above-mentioned upper layer and lower layer optical waveguides with the respect to the direction of propagation of the waveguide light, a method wherein the above-mentioned increase or decrease in the width of the optical waveguide is tapered, a method wherein a grating structure is formed in the upper layer and/or lower layer optical waveguide or in a layer in contact with those, and a method that gives distribution to the period of the above-mentioned grating structure. In addition, an optical and/or electronic device can be mounted in the optical circuit upper portion and/or lower portion.

The inventors of the present invention confirmed by experiment that an organic film is selectively grown or selectively not grown, an organic film is grown thicker or thinner than other regions, or that an organic film is grown to a structure differing from other regions, on a patterned organic or inorganic thin film serving as the base.

In addition, the inventors of the present invention also experimentally confirmed that if an organic or inorganic thin film serving as the base is formed by tilting the substrate with respect to the projected molecules and atoms during vapor phase deposition, the organic film that is grown on that substrate is oriented. In addition, it was also discovered that selective orientation is also possible by patterning a rubbing film.

The present invention applies these experimental results.

DESCRIPTION OF THE PREFERRED EMBODIMENTS

The following provides an explanation of the process for manufacturing an organic film and a multilayer optical circuit pertaining to the preferred embodiments of the above-mentioned present invention with reference to the drawings.

Figure 1B:
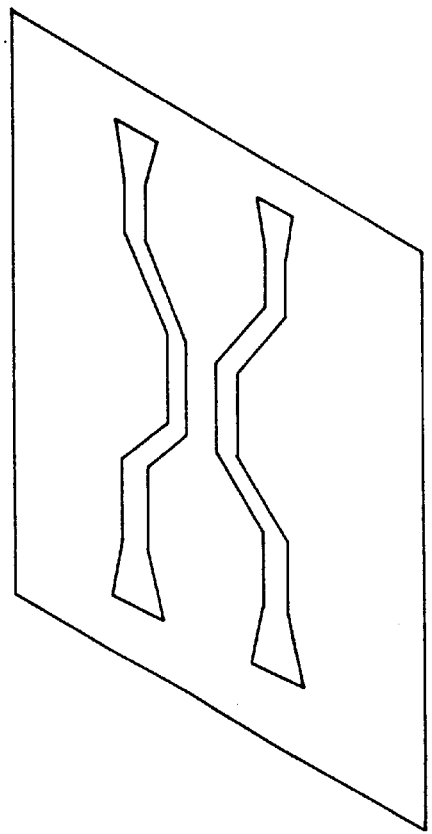
Figure 2B:
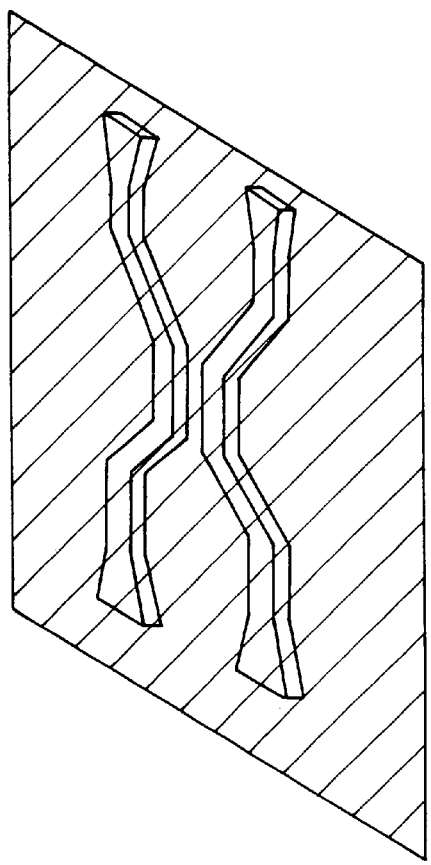
FIGS. 2a and 2b are explanatory drawings of an optical waveguide forming process.
Figure 2A:
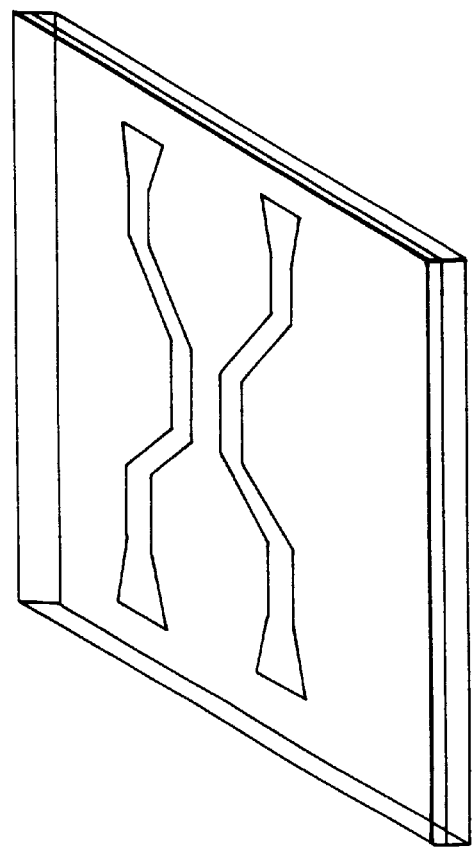

The following provides an explanation of a first embodiment of the present invention with reference to FIGS. 1a, 1b, 2a and 2b. A silicon oxide thin film having a thickness of 10 Å to 10 µm is formed on a silicon substrate using electron beam (EB) evaporation deposition with $SiO_2$ as the evaporation deposition source. This is then patterned and formed into the shape of a waveguide as indicated in FIG. 1a. Regions of the silicon substrate other than the waveguide may be exposed, or another film such as silicon nitride may be exposed as indicated in FIG. 2a.

Figure 12:
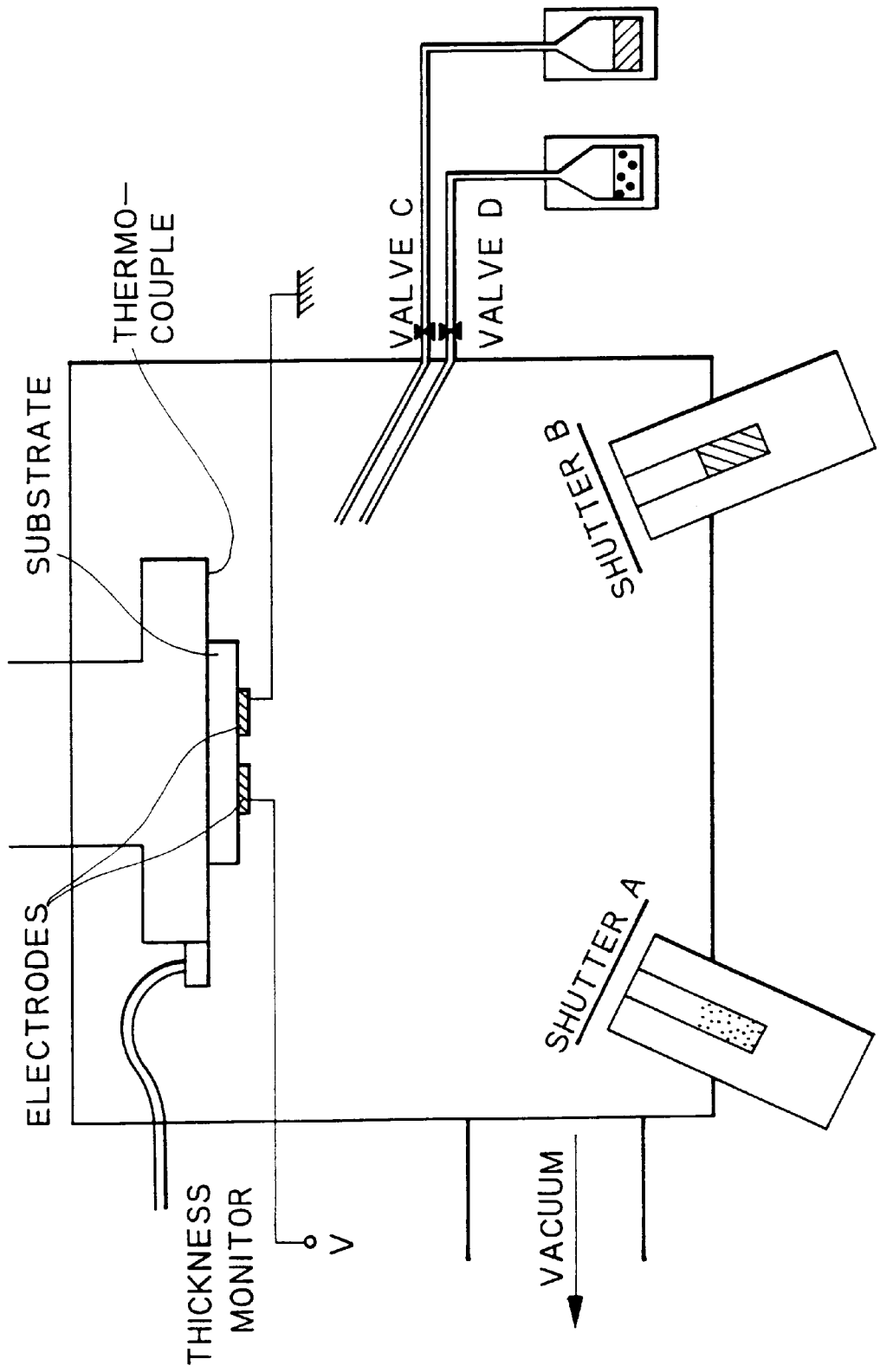
FIG. 12 is a block drawing of a deposition apparatus.

The following refers to FIG. 12. Next, an organic film is formed using the organic film coating apparatus indicated in FIG. 12. When a polyazomethine film is grown by supplying terephthalaldehyde (TPA) and paraphenylenediamine (PPDA) as the raw materials at a substrate temperature of 25° C. to 80° C., a polyazomethine film is selectively grown on a silicon oxide thin film, and the optical waveguide indicated in FIG. 1b and 2b is formed without performing patterning.

Figure 3B:
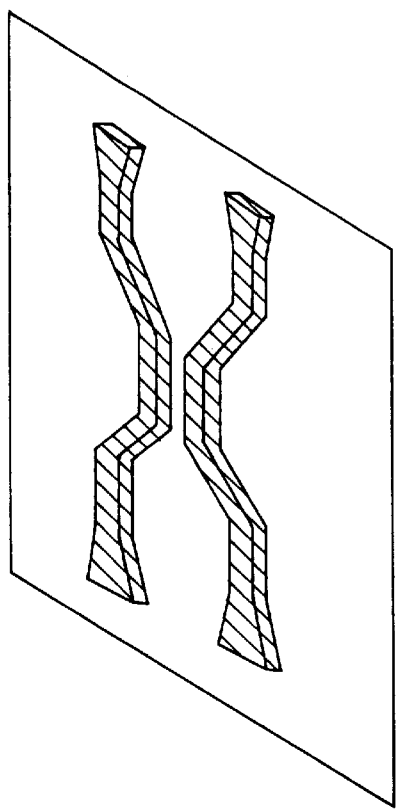
FIGS. 3a and 3b are explanatory drawings of an optical waveguide forming process.
Figure 3A:
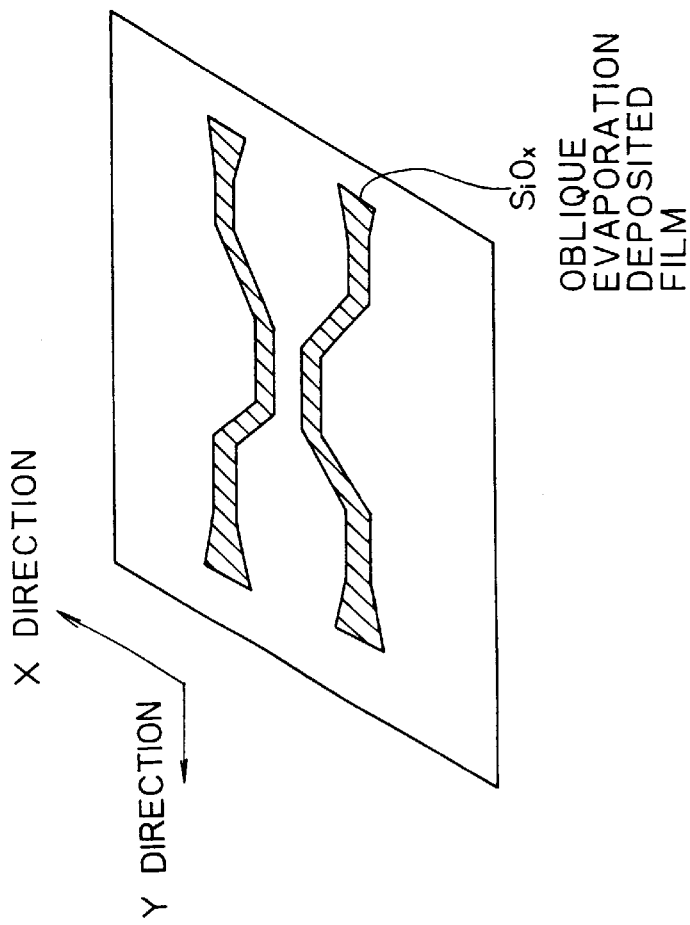
Figure 4B:
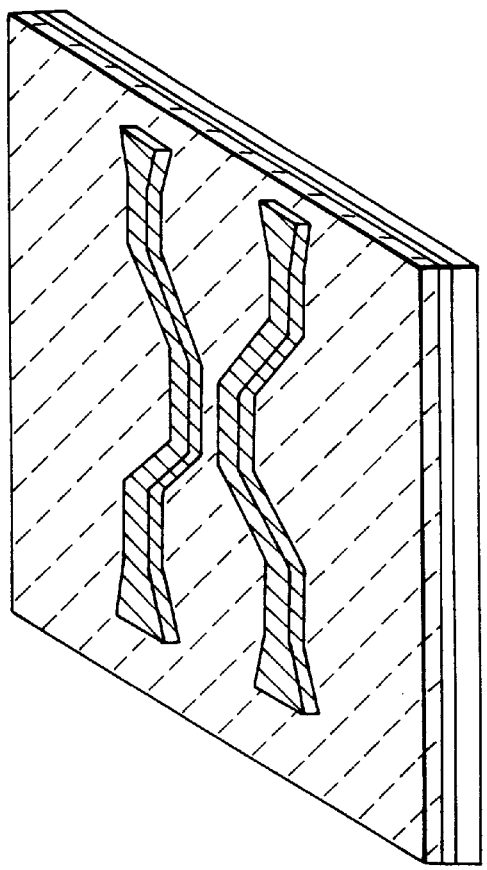
FIGS. 4a and 4b are explanatory drawings of an optical waveguide forming process.
Figure 4A:
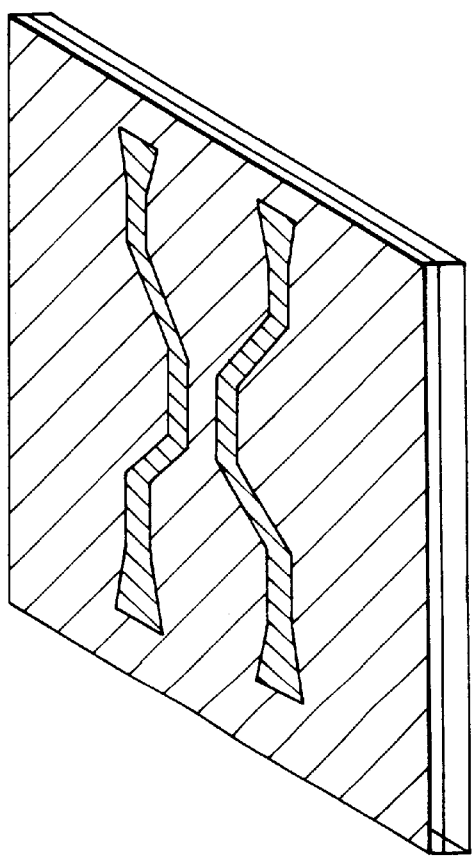

The following provides an explanation of a second embodiment of the present invention with reference to FIGS. 3 and 4. The following explanation is given in regard to oblique evaporation deposition of a silicon oxide thin film. For example, a silicon oxide thin film is formed by tilting the substrate at an angle of, for example, about 80° in the direction of the x axis with respect to the projected direction of the evaporation deposited molecules, followed by patterning and forming into the shape of a waveguide as indicated in FIG. 3a. The vacuum during evaporation deposition is, for example, $10^{-6}$ to $10^{-4}$ Torr, the substrate temperature is 25° C., and the grown film thickness is about 10 Å to 10 µm. Furthermore, those regions of the oxidized silicon substrate other than the waveguide may be exposed, or as indicated in FIG. 4a, another type of thin film such as silicon nitride may be exposed. When quartz substrates are used, quartz surface may be exposed. Alternatively, a vertically evaporation deposited silicon oxide film may be exposed without tilting the substrate in regions other than the waveguide. A polyazomethine thin film is coated using TPA and PPDA at a substrate temperature of 25° C. in the same manner as in the first embodiment. As a result, a waveguide is formed wherein the molecules are oriented in nearly the direction of the x axis as indicated in FIGS. 3b and 4b. In the case of forming a vertically evaporation deposited silicon oxide film in regions other than the waveguide pattern in particular, a polymer film is formed oriented in nearly the direction of the x axis in the waveguide portion as indicated in FIG. 4b, and a random oriented or vertically oriented polymer film is formed in those other portions.

Normally, the refractive index with respect to polarized light in the direction of a polymer chain is larger than the refractive index with respect to polarized light in the direction perpendicular to a polymer chain. Thus, a waveguide is formed with respect to TE mode light wherein the side surfaces are automatically embedded. According to this method, a nearly flat layer can be obtained without planar treatment. Furthermore, in the case of using glass or quartz for the substrate instead of silicon, a random oriented film is formed without particularly forming a silicon oxide film in regions other than the patterned silicon oxide thin film. Conversely, if an oblique evaporation deposited film is formed in a portion other than the waveguide pattern by tilting the substrate in the lengthwise direction of the waveguide, a waveguide is formed with the refractive index of that portion becoming smaller.

It is also possible to make waveguides for TM mode light propagation by using random state polymer for waveguides and alignment state polymer for the surrounding area.

In addition, when a $SiO_2$ film fabricated by tilting in the x direction is patterned on an $SiO_2$ film fabricated by tilting in the y direction, a pattern can be selectively formed with polymer chains oriented in mutually intersecting directions. In addition, it goes without saying that the directions of tilting are not limited to the directions of the x and y axes, but may be any arbitrary directions.

In the case of non-linear optical materials, orientation has a significant effect on physical properties. For example, when non-linear optical waveguides that comprise all-optical devices are considered, it is desirable that the molecules within the waveguide be made uniform in the direction of polarization. A second embodiment of the present invention is effective in these terms as well.

Figure 5B:
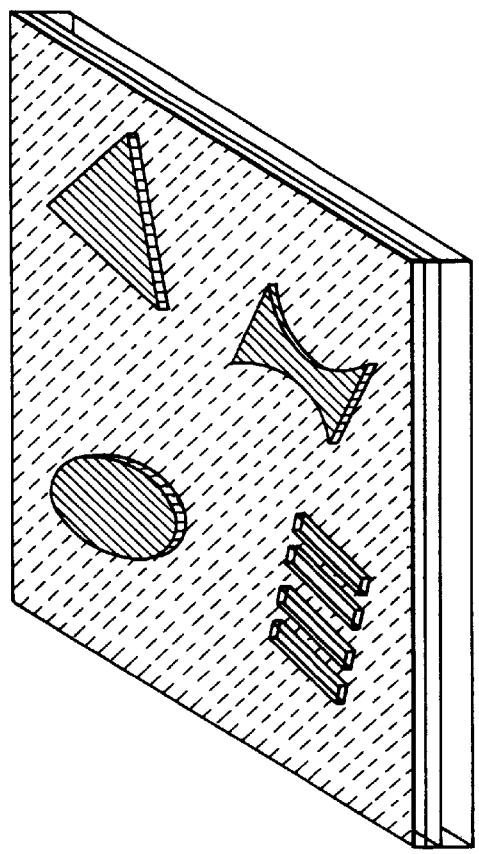
FIGS. 5a and 5b are explanatory drawings of a process for forming an optical device within a slab-type optical waveguide.
Figure 5A:
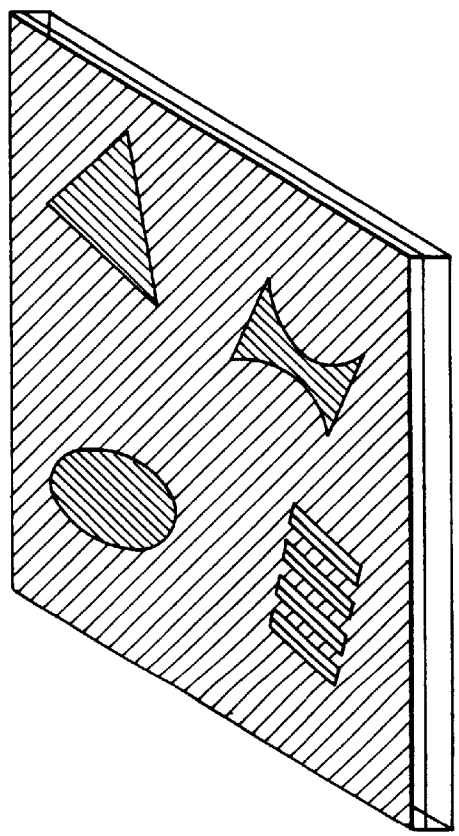

The following provides an explanation of a third embodiment of the present invention with reference to FIGS. 5a and 5b. Examples of forming optical devices such as a lens, prism and grating, in a slab-type optical waveguide are indicated in FIGS. 5a and 5b. Various optical devices can be formed in a planar slab waveguide by selective oriented growth without requiring etching and an embedding process using other materials as in the past.

Figure 6C:
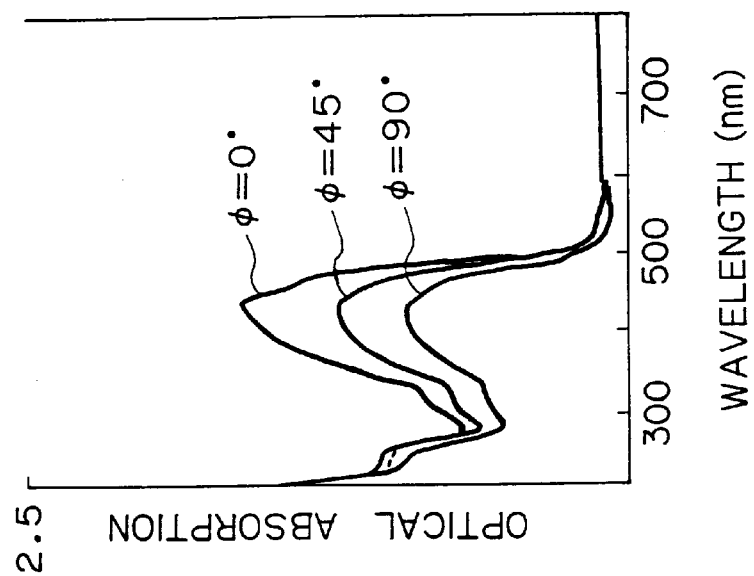
FIGS. 6a through 6c are diagrams indicating the dichroism of a polyazomethine film on an $SiO_2$ EB evaporation deposited film.
Figure 6B:
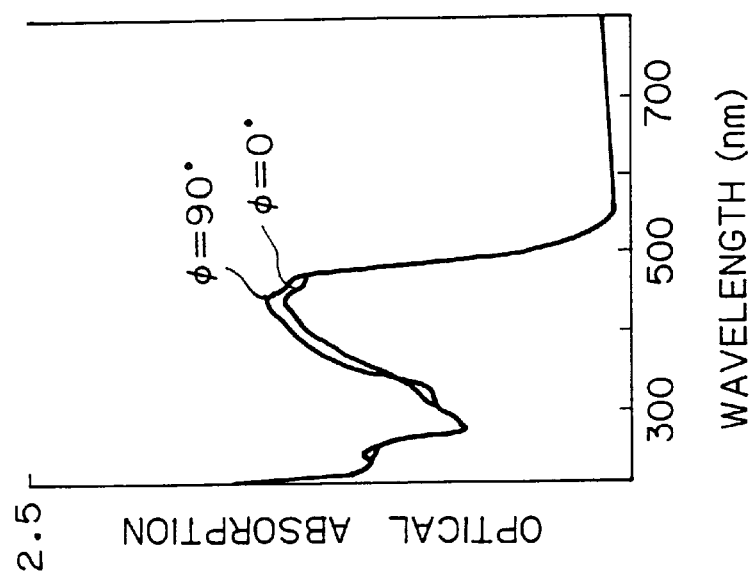

The following provides an explanation of a fourth embodiment of the present invention with reference to FIGS. 6a, 6b, 6c, 7a and 7b. The figures are graphs that indicate the relationships between wavelength and optical absorbance in the cases of taking the angle (see FIG. 6a) formed by the direction of polarization of incident light and the a axis (here, the direction of substrate inclination) to be 0°, 45° and 90°, respectively. FIG. 6b indicates optical absorbance in the case of evaporation depositing a silicon oxide film at a substrate inclination angle of 0° C. followed by formation of an organic film on said silicon oxide film, FIG. 6c indicates such in the case of a substrate inclination angle of 30° C., FIG. 7a indicates such in the case of a substrate inclination angle of 60°, and FIG. 7b indicates such in the case of a substrate inclination angle of 80° C.

By thus taking advantage of the effect wherein the anisotropy of a film increases as the substrate inclination angle increases, waveguide patterns (or optical device patterns) and regions other than said patterns can be formed with oblique angled evaporation deposited film of silicon dioxide in the first and second embodiments of the present invention. However, the substrate inclination angle during oblique evaporation deposition is changed for the waveguide pattern (or optical device pattern) and regions other than said pattern. For example, a silicon oxide thin film formed by tilting the substrate at approximately 45° in the direction of the x axis is used for the waveguide (or optical device pattern), while a silicon oxide thin film formed by tilting the substrate at approximately 30° in the direction of the x axis is used for regions other than said waveguide. As an another example, a silicon oxide thin film formed by tilting the substrate at approximately 70° in the direction of the x axis is used for the waveguide (or optical device pattern), while a silicon oxide thin film formed by tilting the substrate at approximately 50° in the direction of the y axis is used for regions other than said waveguide. According to these examples, the refractive index between the waveguide core and the surrounding clad can be adjusted, thus allowing control of discontinuity at the pattern interface as well as freedom of waveguide design to be improved.

Figure 8A:
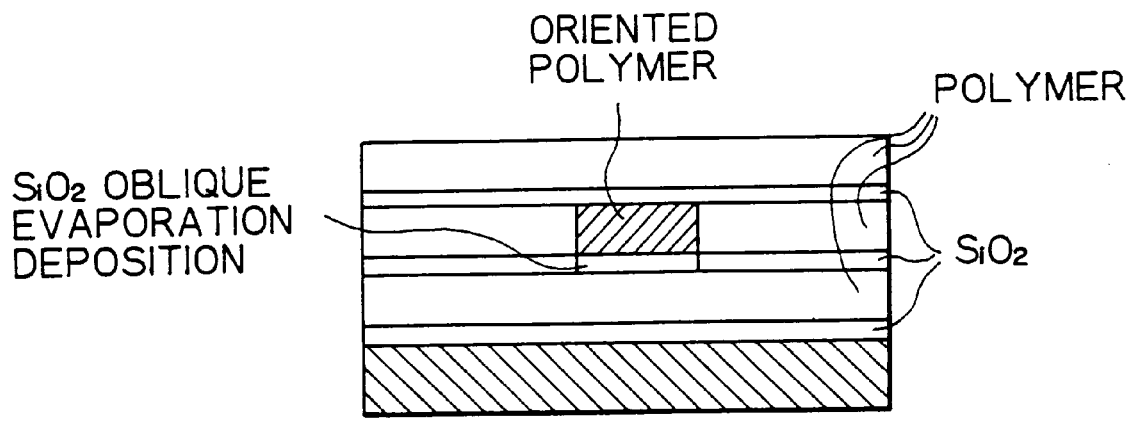
FIGS. 8a and 8b show an example of the structure of an embedded channeled waveguide.
Figure 8B:
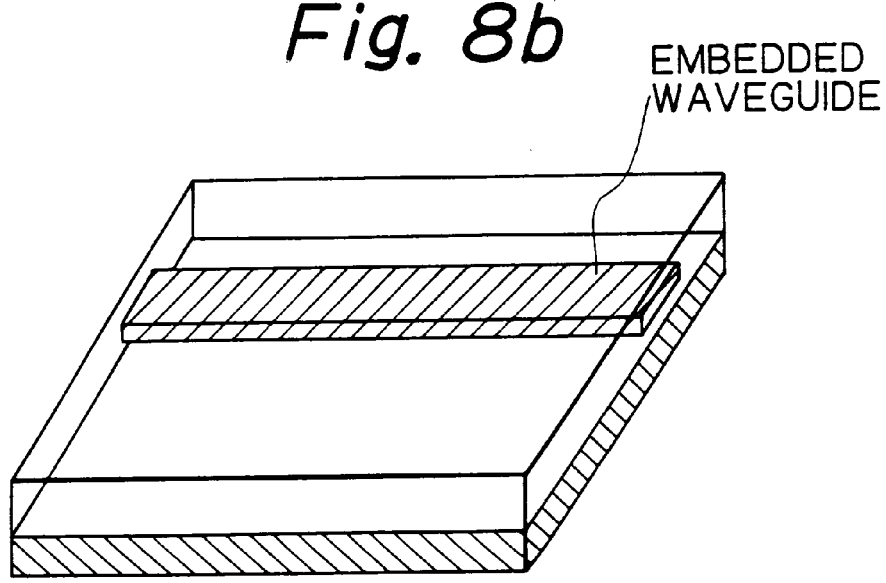

The following provides an explanation of a fifth embodiment of the present invention with reference to FIGS. 8a and 8b. An example of manufacturing an embedded channel waveguide is indicated in FIGS. 8a and 8b. An embedded optical waveguide, wherein the core and clad are formed with identical substances, can be manufactured by controlling the inclination angles during the forming of silicon oxide films for each of the buffer, clad and waveguide layers. FIG. 8a is a cross-sectional view, while FIG. 8b is a perspective view.

Figure 9B:
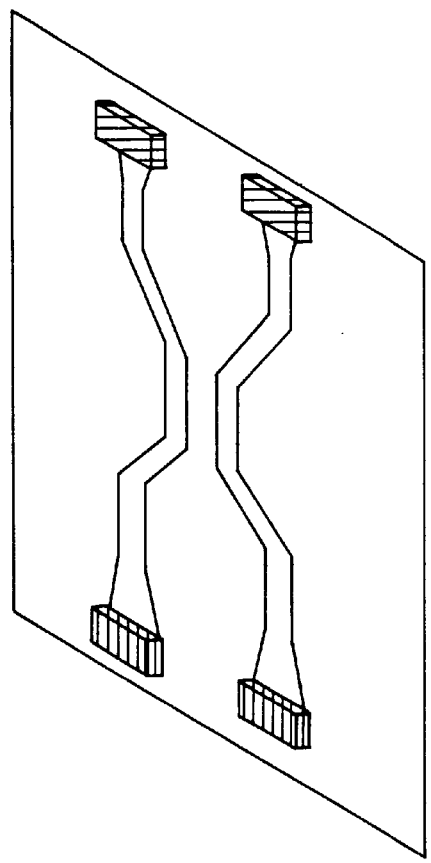
FIGS. 9a and 9b are explanatory drawings of a process for hybrid formation of an opto-electronic device and an optical waveguide.
Figure 9A:
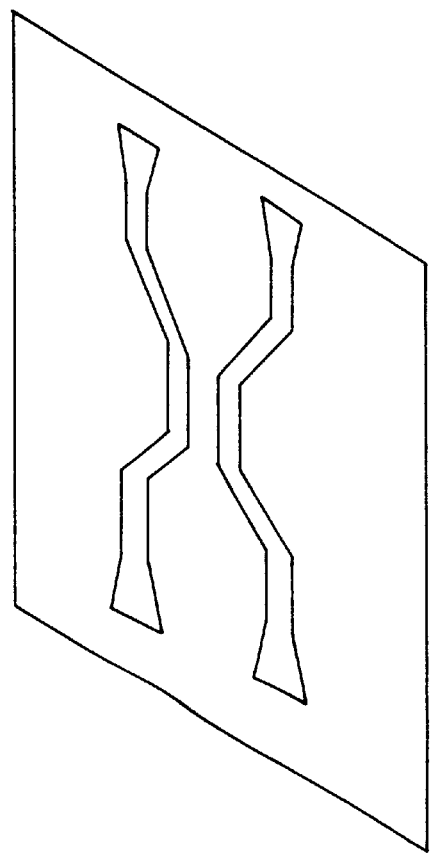
Figure 10B:
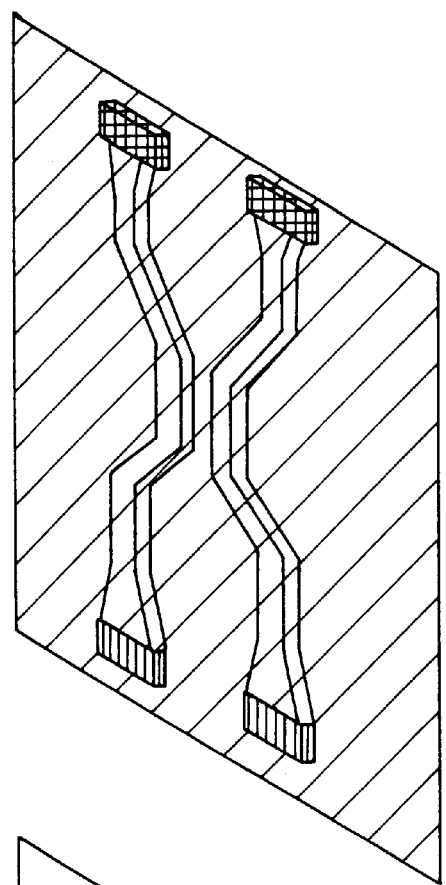
FIGS. 10a and 10b are explanatory drawings of a process for hybrid formation of an opto-electronic device and an optical waveguide.
Figure 10A:
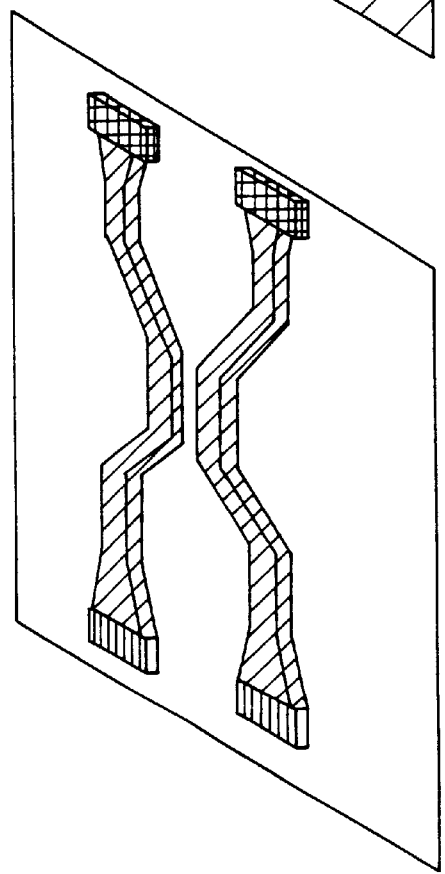

The following provides an explanation of a sixth embodiment of the present invention with reference to FIGS. 9a, 9b, 10a and 10b. This embodiment is an example of hybridization wherein various optical devices (such as a semiconductor laser, photodiode and so forth) and electronic devices (such as an IC) are connected with an optical waveguide. After forming a base pattern in advance as indicated in FIG. 9a, a device is formed as indicated in FIG. 9b. Next, organic films are accumulated as indicated in FIGS. 10a and 10b to form the waveguide. In this case, well-adhered connections with the optical or electronic device can be realized without requiring etching of the waveguide and other positioning procedures.

Although the above explanations are provided using mainly silicon oxide evaporation deposited film for the base material, the present invention is not limited to such, and a thermal oxidized silicon film or inorganic dielectric like $MgF_2$, MgO etc. films may also be patterned. Moreover, organic films of other conductors, 1–10 diaminodecane and so forth, LB films, surface adsorbed layers of silane coupling materials and so forth, as well as rubbing treated polymer films can all be used as long as they are materials that effect the structure of the organic film deposited on said materials.

In addition, although explanations have been provided using the example of formation of a polyazomethine film using TPA and PPDA, other materials may be used provided they are polymers having high transparency that allows the passage of waveguide light and that are susceptible to the effects of the base such as a polysilane film, examples of which include a polymer film having for its base polymethylmethacrylate, polyvinylcarbazole, polycarbonate or polystyrene; a polymer film fabricated by bonding a molecule containing two or more groups chosen from a dianhydride group of carboxylic acid (or a carbonyloxycarbonyl group), an acid halogenated group of carboxylic acid, an —NCO group and a —CHO group, and a molecule containing at least two or more groups chosen from a group containing one or more amino groups or amino protons, an alkylamino group having 1–10 carbon atoms and a silylated amino group; or, a polymer film fabricated by bonding a molecule containing two or more epoxy groups, and a molecule containing two or more groups chosen from a group containing one or more amino groups or amino protons, an alkylamino group having 1–10 carbon atoms, and a silylated amino group. In addition, these materials are not limited to polymer materials, but low molecular weight crystals and low molecular weight/high molecular weight compounds.

In addition, examples of the waveguide material include non-linear optical waveguides such as those having second order non-linear optical effects including electrooptical (EO) effects, or third order non-linear optical effects such as the optical Kerr effect. A portion or all of the core, clad and buffer may be a non-linear optical material.

Figure 11B:
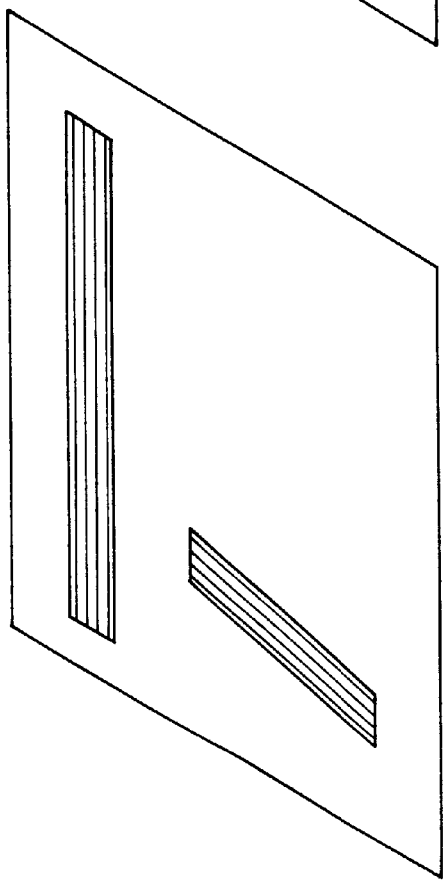
FIGS. 11a and 11b are explanatory drawings of an electrical wiring formation process.
Figure 11A:
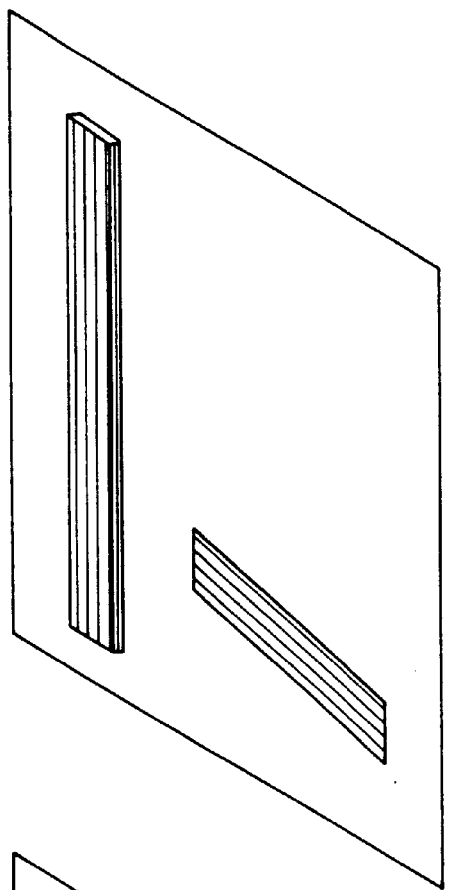

Molecular orientation is also important in the case of forming electrical wiring using conductive organic substances. In this case, it is desirable to make the long axial direction of the molecules uniform in the direction of current flow. Fabrication of a wiring pattern like that indicated, for example, in FIGS. 11a and 11b is possible using the process indicated in the second embodiment of the present invention.

Furthermore, the present invention is of a general nature allowing it to be used in patterning processes for insulating films and other organic films.

The following provides an explanation of a seventh embodiment of the present invention with reference to FIG. 13a. The relationship between inclination of the substrate and the direction of the projected atoms or molecules in the case of forming a silicon oxide thin film on a substrate by electron beam deposition using silicon oxide for the evaporation source is indicated in FIG. 13a.

Silicon oxide thin films are deposited and formed on a substrate in the case of a substrate inclination angle of 70° (oblique evaporation deposition) and 0° (vertical evaporation deposition), respectively.

A silicon oxide thin film is formed having a film thickness of 1000 to 5000 Å with the vacuum during evaporation deposition set to approximately $10^{-4}$ Torr and a substrate temperature of 25° C. A polyazomethine film is then deposited on top of said silicon oxide thin film using TPA and PPDA introducing in gas-phase (gas pressure: $10^{-3}$–$10^{-2}$ torr).

Figure 6A:
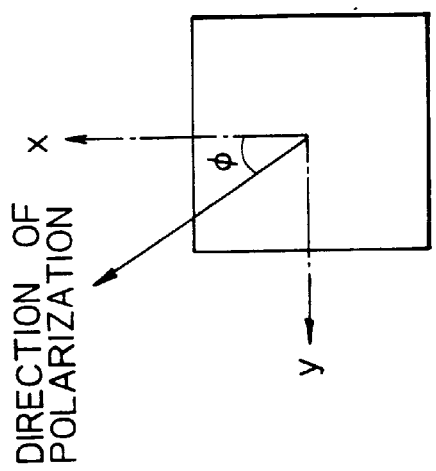
Figure 14A:
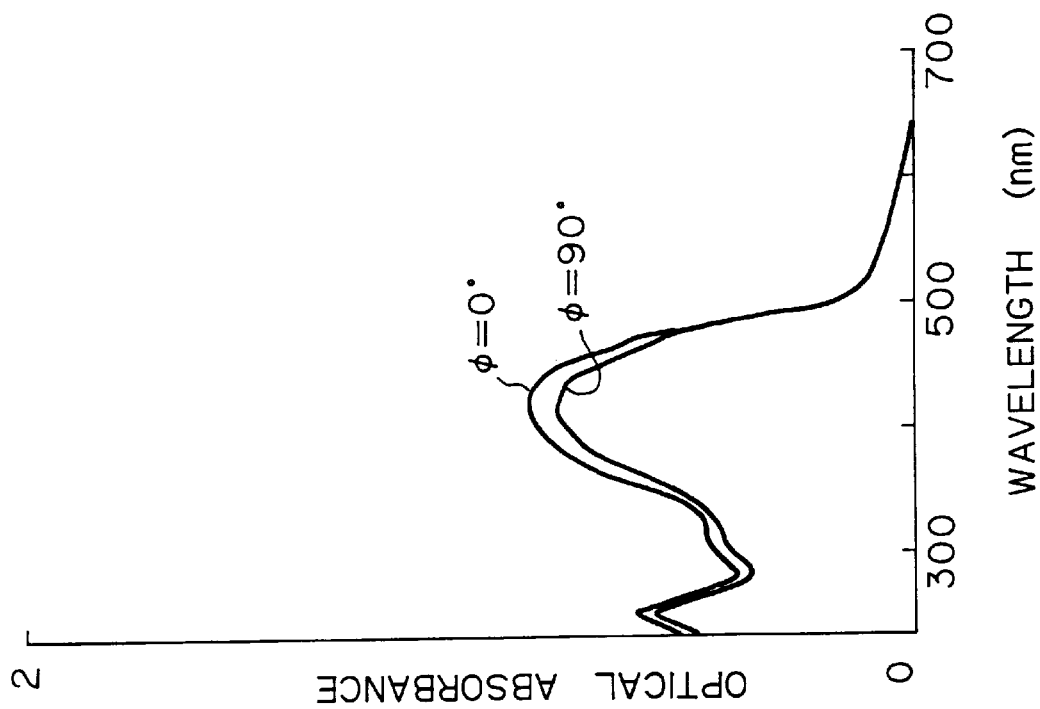
FIGS. 14a and 14b are graphs indicating the dependency on polarization of optical absorbance of a polyazomethine thin film.
Figure 14B:
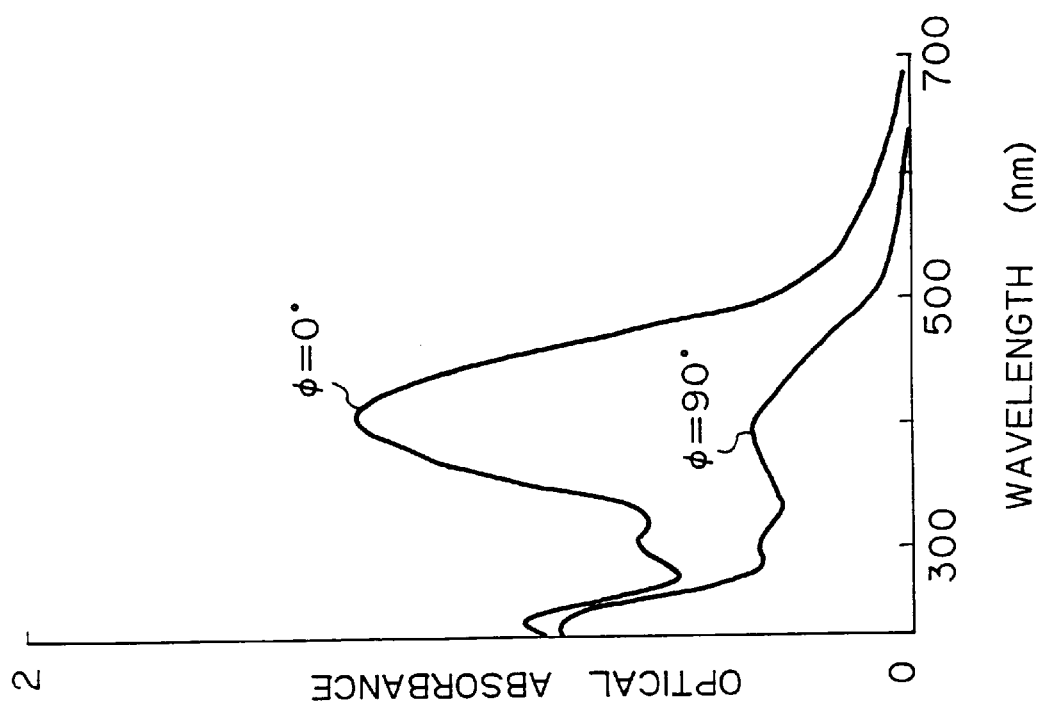

The following explanation refers to FIGS. 14a, 14b, 6a and 16a. The results of measuring the polarization dependency of polyazomethine thin film on light absorption taking the angle formed by the direction of the x axis of the substrate and the direction of polarization to be $\phi$ as indicated in FIG. 6a are indicated in FIGS. 14a and 14b. In the case of using vertically evaporated deposited silicon oxide film, the light adsorption with respect to polarization in the x direction ($\phi=0°$), and the light absorption with respect to polarization in a direction perpendicular to that ($\phi=90°$) are nearly equal as indicated in FIG. 14b. In contrast, in the case of using an angled evaporation deposited silicon oxide film, adsorption with respect to polarization in the direction of the x axis is several times larger than absorption with respect to polarization in a direction perpendicular to that as indicated in FIG. 14a. This indicates that the polymer chain is oriented to the direction of inclination of the substrate (direction of the x axis) during deposition of silicon oxide by using oblique evaporation deposited silicon oxide thin film for the base as indicated in FIG. 16a.

Figure 15:
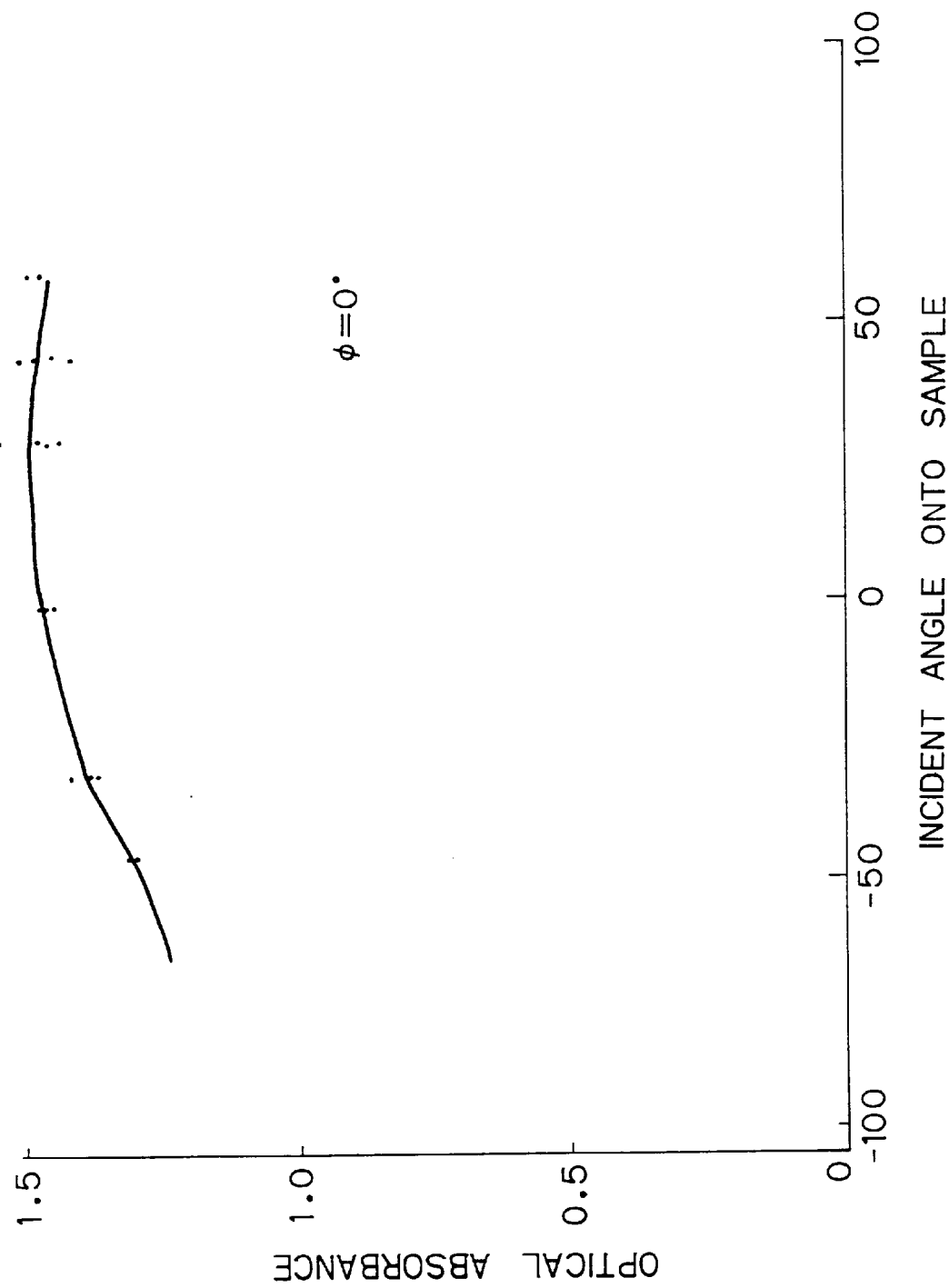
FIG. 15 is a graph indicating the relationship between the incident angle onto the sample and optical absorbance.
Figure 17:
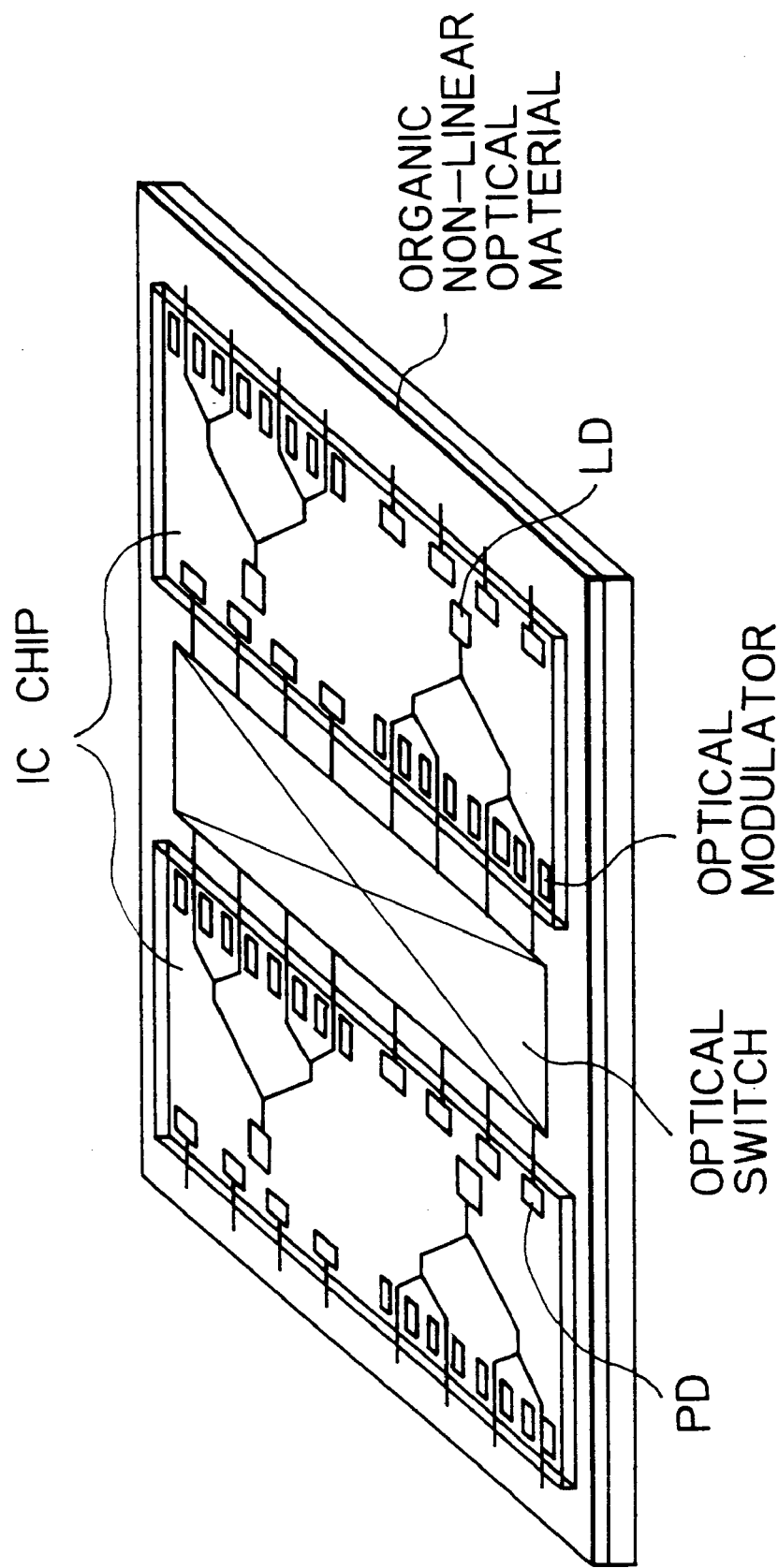
FIG. 17 is a block drawing of an optical interconnection of the prior art.

The following explanation refers to FIGS. 13b, 15 and 16b. Changes in light absorption when angle θ between the incident light and the substrate is taken to be the incident angle and that incident angle θ is changed as indicated in FIG. 13b are indicated in FIG. 15. Absorption increases when incident angle θ is changed to the positive side in comparison with when θ=0, or in other words, when light is allowed to enter vertically (polarization in the direction perpendicular to the y axis), and demonstrates a maximum trend in the vicinity of 30°. In addition, absorption decreases when incident angle θ is changed to the negative side.

Accordingly, it can be said that there are cases wherein the orientation of the polymer principal chain extends upward at an angle of inclination of several tens of degrees from the substrate surface, and grows towards the negative side of the x axis.

The conditions for producing effects like those mentioned above are not limited to the above-mentioned deposition conditions, and are also not limited to evaporation deposition provided the coating process is carried out in a vacuum, such as that in the case of sputtering, MSD, ion plating and cluster ion evaporation deposition.

This process allows the deposition of a non-linear optical material having a high degree of orientation, wherein the donor and acceptor positions along with conjugate length are controlled, to be effectively carried out by a vapor phase deposition process such as CVD (chemical vapor deposition) or MLD (molecular layer deposition). Moreover, the performance of various photonics materials requiring control of the molecular orientation, such as light receiving and light transmitting materials, electrochromic materials, Electroluminescence (EL) materials, and photochromic EL materials, can be improved.

Figure 18A:
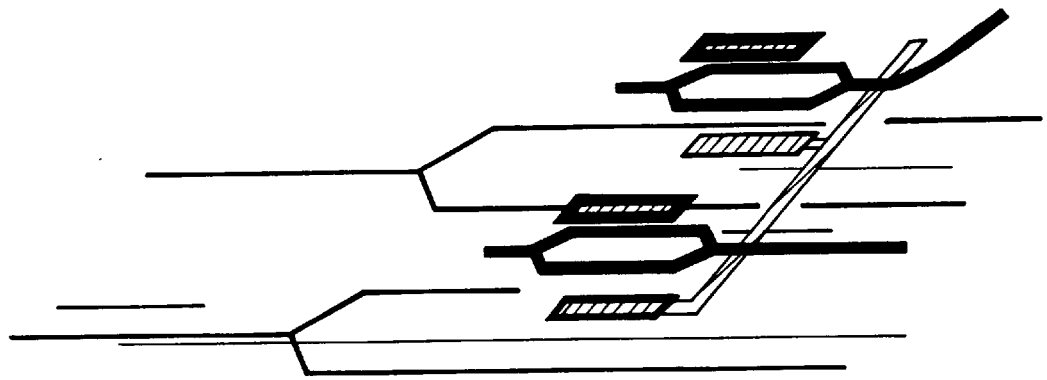
FIGS. 18a and 18b are conceptual drawings of a multilayer optical circuit.
Figure 18B:
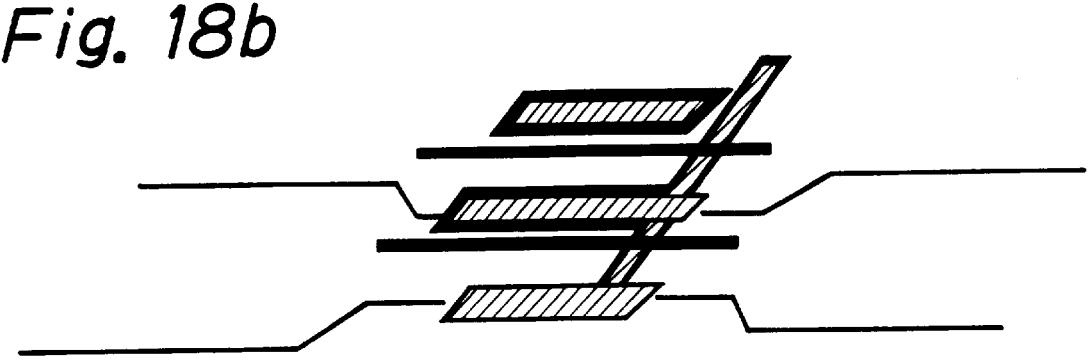

The following provides an explanation of an eighth embodiment of the present invention with reference to FIGS. 18a and 18b. FIGS. 18a and 18b are conceptual drawings of a multilayer optical circuit. The buffer layer is omitted in these drawings. In FIG. 18a, light is guided with a passive waveguide formed in the second layer and then modulated by migrating a portion or all of the light into a non-linear optical waveguide of the upper portion as necessary. In addition, the light again returns to the second layer after passing through the waveguide of a third layer to avoid the wiring in the second layer. In FIG. 18b, the light of the second layer is passed through a non-linear optical waveguide of the first layer and then returned to the wiring of the second layer after switching by a directional coupler.

Figure 19:
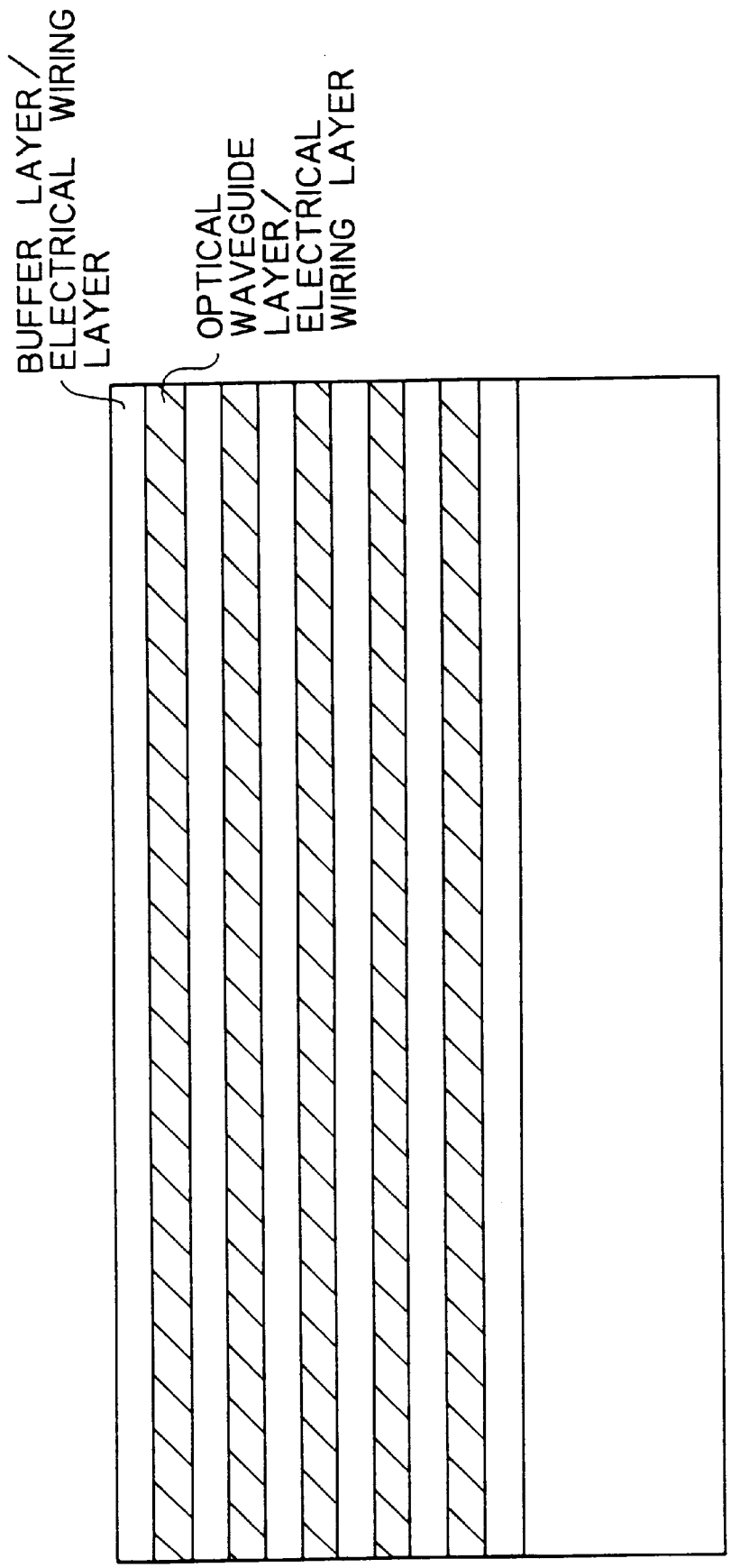
FIG. 19 is a cross-sectional view of a multilayer optical circuit.
Figure 20:
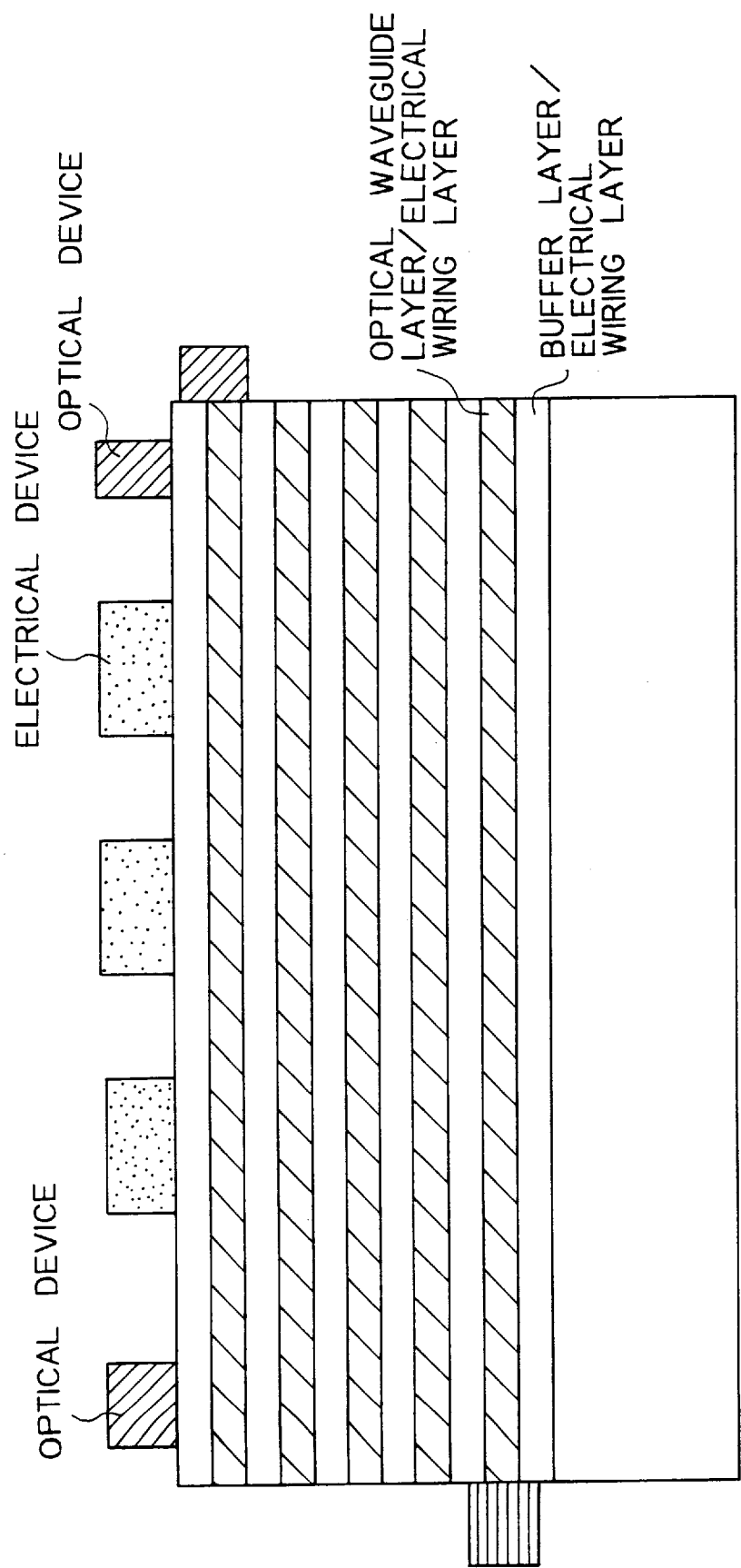
FIG. 20 is a cross-sectional view of a multilayer optical circuit.

The following explanation refers to FIGS. 19 and 20. FIGS. 19 and 20 indicate cross-sectional views of a multilayer optical waveguide. The electrical wiring is formed while avoiding the optical waveguide as described above, and formed in the interface between the buffer layer and optical waveguide layer, or within those layers. The buffer layer and optical waveguide layer fulfill the role of interlayer insulators. Optical devices, such as semiconductor lasers and photodiodes, are mounted on the upper, lower and side surfaces of the optical circuit substrate as indicated in FIG. 20.

Figure 21:
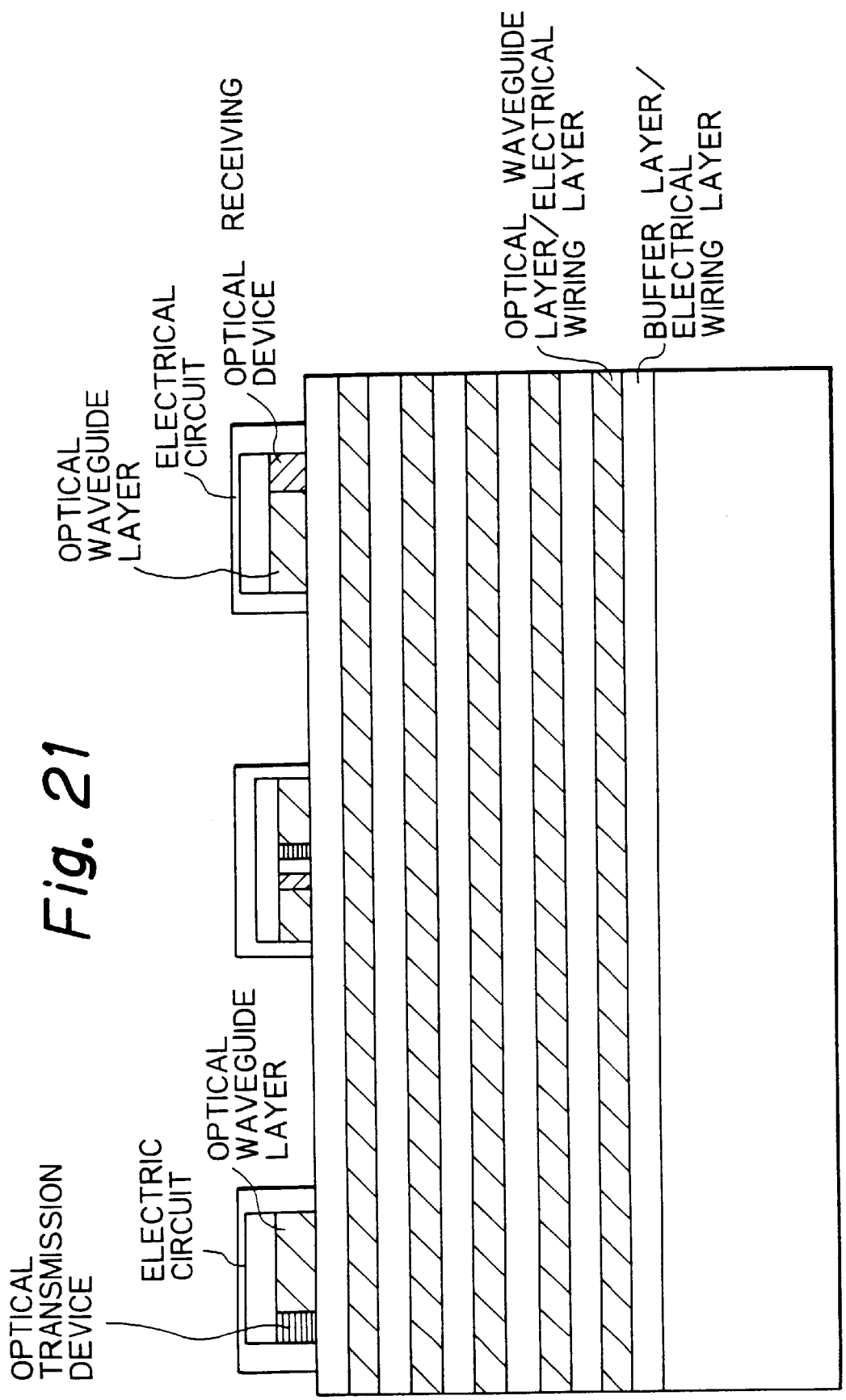
FIG. 21 is a cross-sectional view of a multilayer optical circuit.

The following provides an explanation of a ninth embodiment of the present invention with reference to FIG. 21. An example of promoting the smooth entry and exiting of light to and from optical transmission and receiving devices is indicated in FIG. 21. An optical waveguide is formed on the side of the optical transmission and receiving devices. Light is able to enter and leave by adhering this optical waveguide. As a result, function can be demonstrated by simply placing the device in position without requiring etching of the waveguide and following bothersome steps such as positioned. Not only the waveguide core, but the buffer and clad layers can also be formed.

Figure 22:
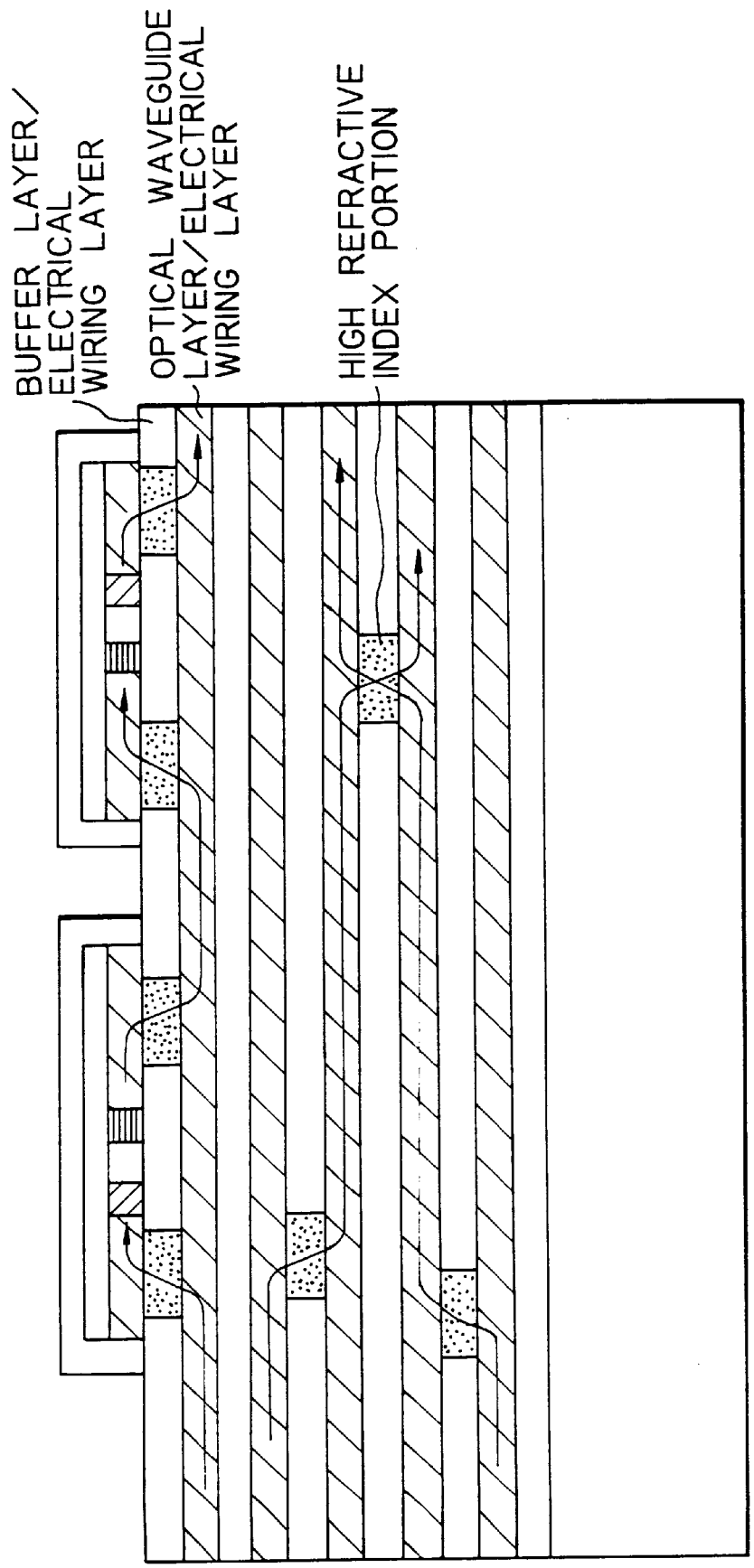
FIG. 22 is a cross-sectional view of a multilayer optical circuit.
Figure 23:
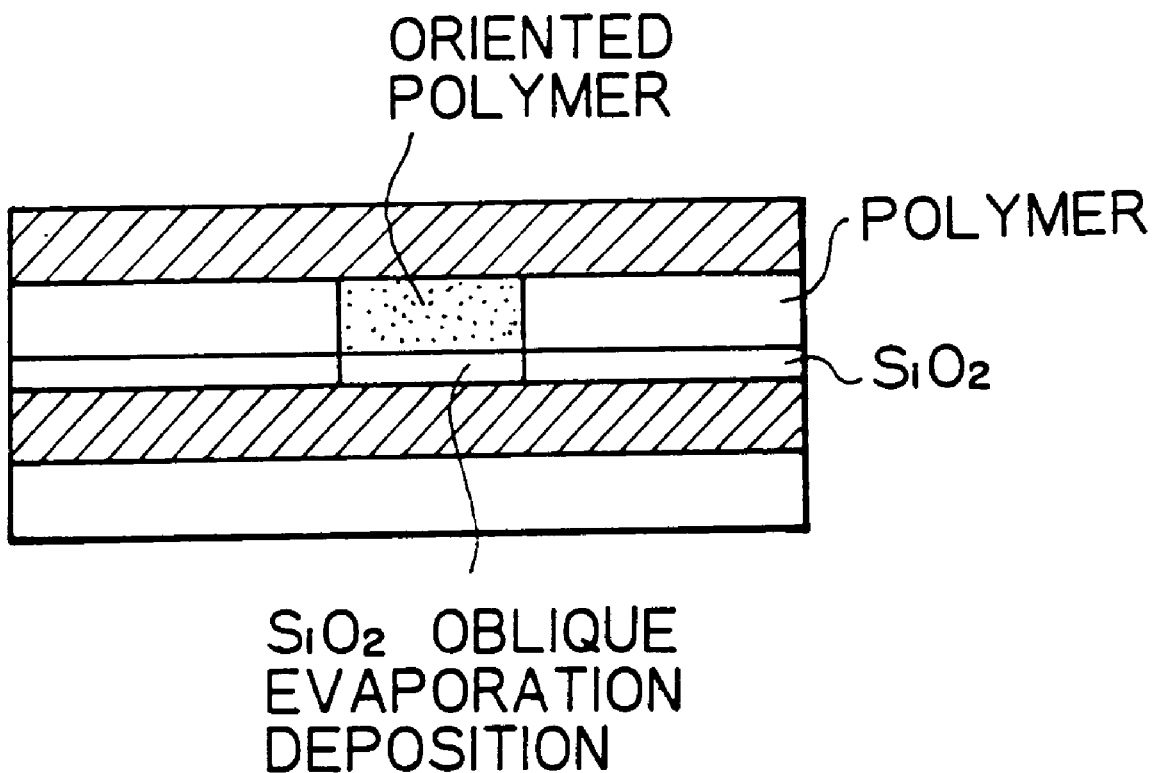
FIG. 23 is an explanatory drawing of the migration of light.
Figure 24A:
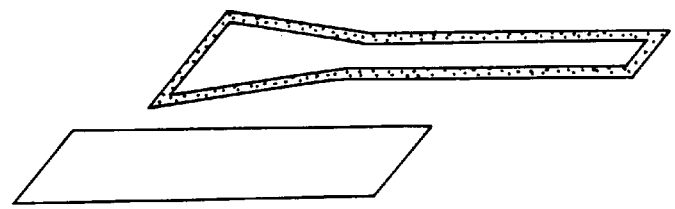
FIGS. 24a through 24c are drawings indicating an example of migration of light.
Figure 24B:
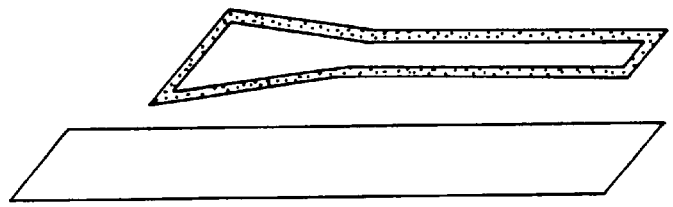
Figure 24C:
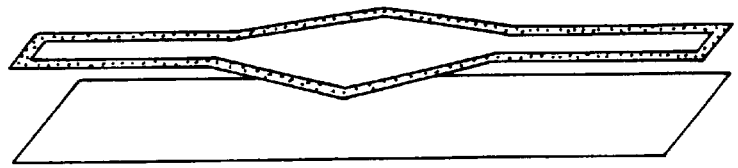
Figure 25A:
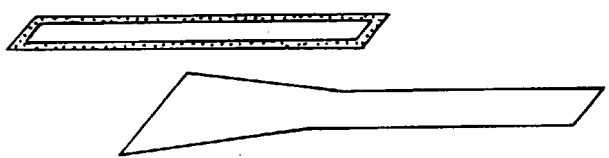
FIGS. 25a through 25c are drawings indicating an example of migration of light.
Figure 25B:
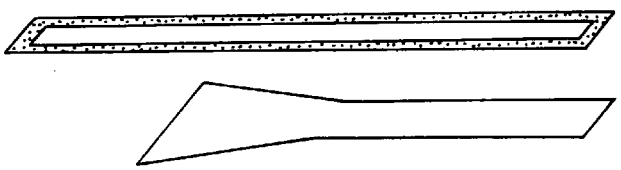
Figure 25C:
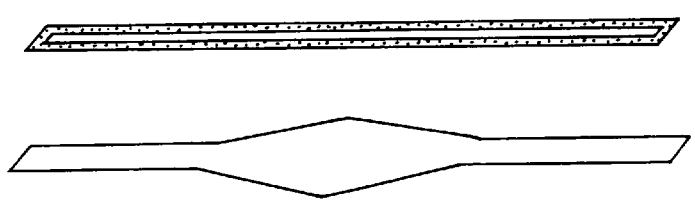
Figure 28A:
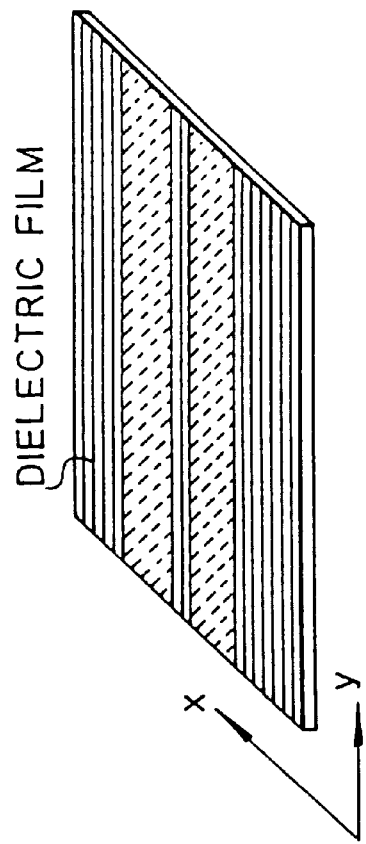
FIGS. 28a through 28d are drawings of a process for manufacturing a polymer film.
Figure 28B:
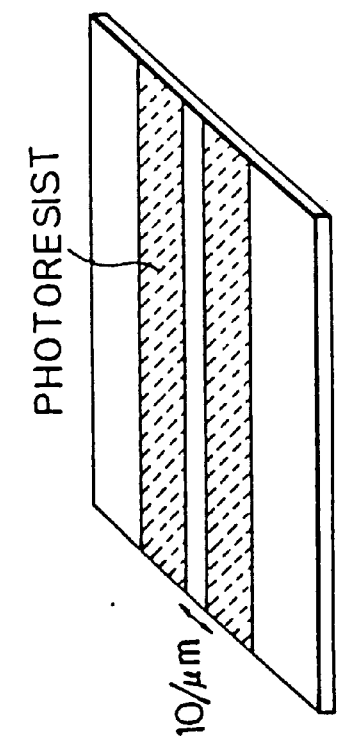
Figure 28C:
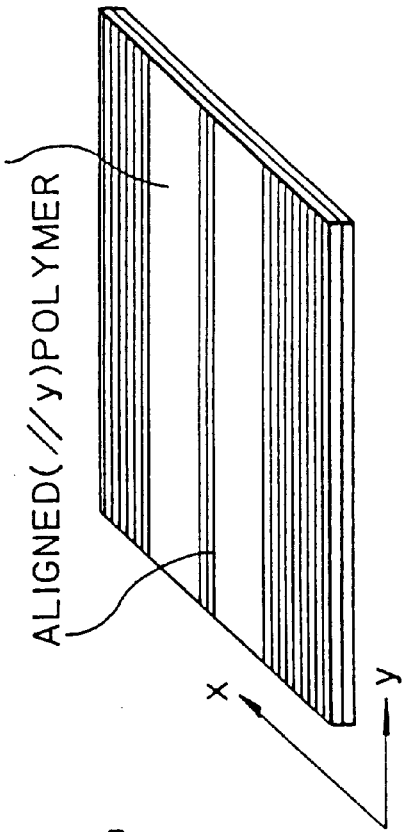
Figure 28D:
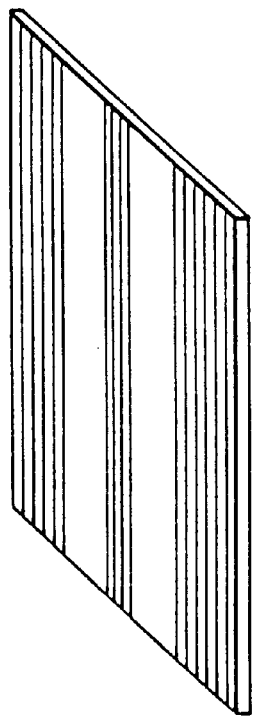

The following provides an explanation of a tenth embodiment of the present invention with reference to FIGS. 22 and 23. A specific example of migrating light between layers is indicated in FIG. 22. For example, a portion of the buffer layer is given a refractive index higher than the surrounding buffer layer. This allows the migration of light. More specifically, as indicated in FIG. 23, a polymer film can be partially oriented by growing a buffer layer using an oblique evaporation deposited silicon oxide film for the base. In the case of oblique evaporation deposition inclined in the direction of the width of the waveguide, the refractive index becomes larger with respect to light of the TE mode. Thus, light migrates in this portion. In the case of oblique evaporation deposition inclined in the direction of the length of the waveguide, the refractive index becomes smaller with respect to light of the TE mode. Thus, light migrates in those portions at which oblique evaporation deposition is not performed. The refractive index can be similarly controlled by changing the inclination of the oblique evaporation deposition. A light migration portion can also be formed by inserting a partially different material using ordinary photolithography.

The following provides an explanation of an eleventh embodiment of the present invention with reference to FIGS. 24a, 24b, 24c, 25a, 25b and 25c. Examples of migrating light by changing the waveguide width are indicated in FIGS. 24a, 24b, 24c, 25a, 25b and 25c. It has been reported that the migration of light can be stabilized by changing the tapered shape of the waveguide (Seminar on Polymer Possibilities, April 1991, Abstract from Lecture on Recent Topics in the Field of Organic Non-linear Optical Materials, p. 48). The present embodiment indicates that in which this has been oriented vertically. Since the effective refractive index increases in those portions in which the width of the waveguide is wide, light migrates easier to those sides. This type of pattern can be formed by ordinary etching. In addition, this can also be formed using silicon oxide evaporation deposited film and oblique evaporation deposited film like that indicated in FIGS. 1 and 2.

Moreover, light is also able to migrate by forming a grating in the waveguide or adjacent layers. Stable migration can be achieved at that time by introducing chirping.

Non-linear optical materials having second order non-linear optical effects, such as passive waveguide and electrooptical (EO) effects, or third order non-linear optical effects, such as the optical Kerr effect, can be used for the waveguide materials and/or buffer and clad materials. In particular, if a non-linear optical material is used for the light migration portion, the amount of migration and the presence or absence of migration can be controlled electrically and/or optically, thereby increasing the flexibility of the optical circuit. Moreover, an increase in the amount of information can be achieved by wavelength multiplexing. The previously mentioned changing of the waveguide width and chirping of the grating and so forth are effective at that time. It also goes without saying that light migration can also be controlled by changing the thickness of the waveguide or the thickness of the buffer layer instead of the width of the waveguide.

The following explanation refers to FIG. 26. FIG. 26 indicates an example of a matrix switch wherein incident light is guided to a first layer and output light is guided to a second layer. Migration of light is controlled by applying a voltage or irradiating light onto a non-linear optical material at the crossing point.

Figure 29A:
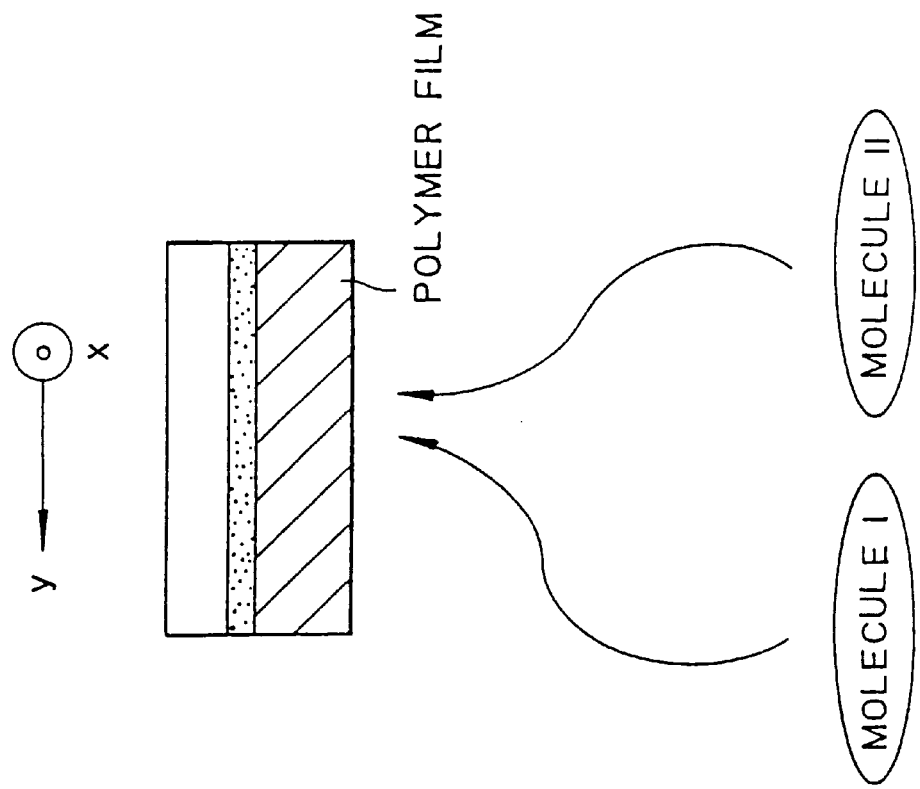
FIG. 29a and 29b are explanatory drawings of a deposition process.
Figure 29B:
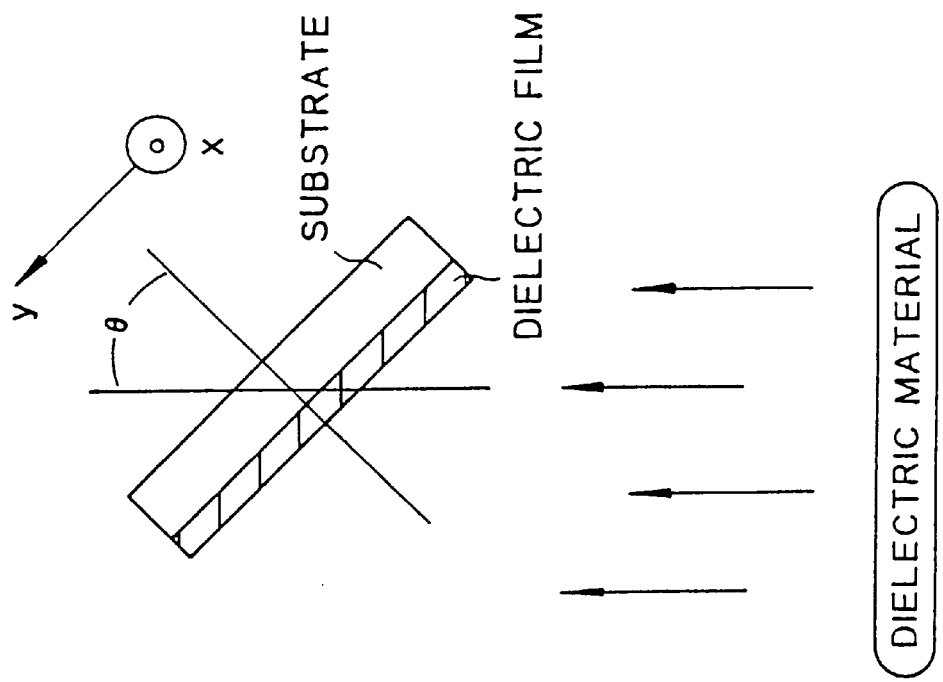

The following provides an explanation of a twelfth embodiment of the present invention with reference to FIGS. 27a, 27b, 27c, 27d, 28a, 28b, 28c, 28d, 29a and 29b. A patterned substrate as indicated in FIGS. 27a through 27d and FIGS. 28a through 28d is inclined in the direction of the y axis as indicated in FIGS. 29a and 29b (inclination angle $\theta=45°$) during EB (electron beam) deposition of $SiO_2$ to a thickness of 800 Å. Next, a polyazomethine film is deposited by CVD using TPA and PPDA gas sources as indicated in the second embodiment of the present invention. The direction of the principal chain tends to be oriented in the direction of the y axis (direction of inclination). The direction of the principal chain be controlled as desired according to the shape and inclination of the pattern.

Figure 30:
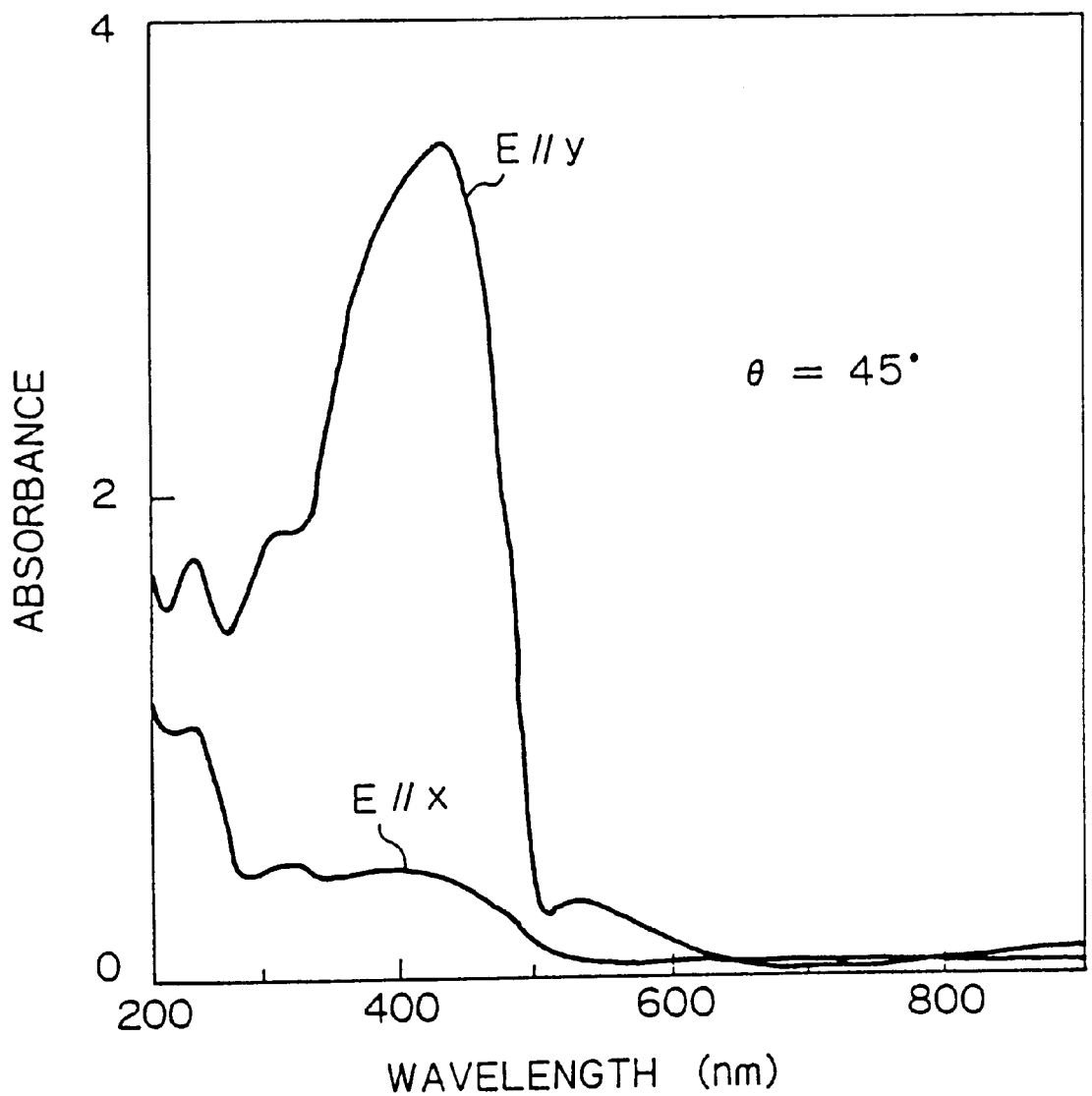
FIG. 30 is the optical absorbance spectrum of a polymer on $SiO_2$ film deposited by oblique evaporation deposition.
Figure 31:
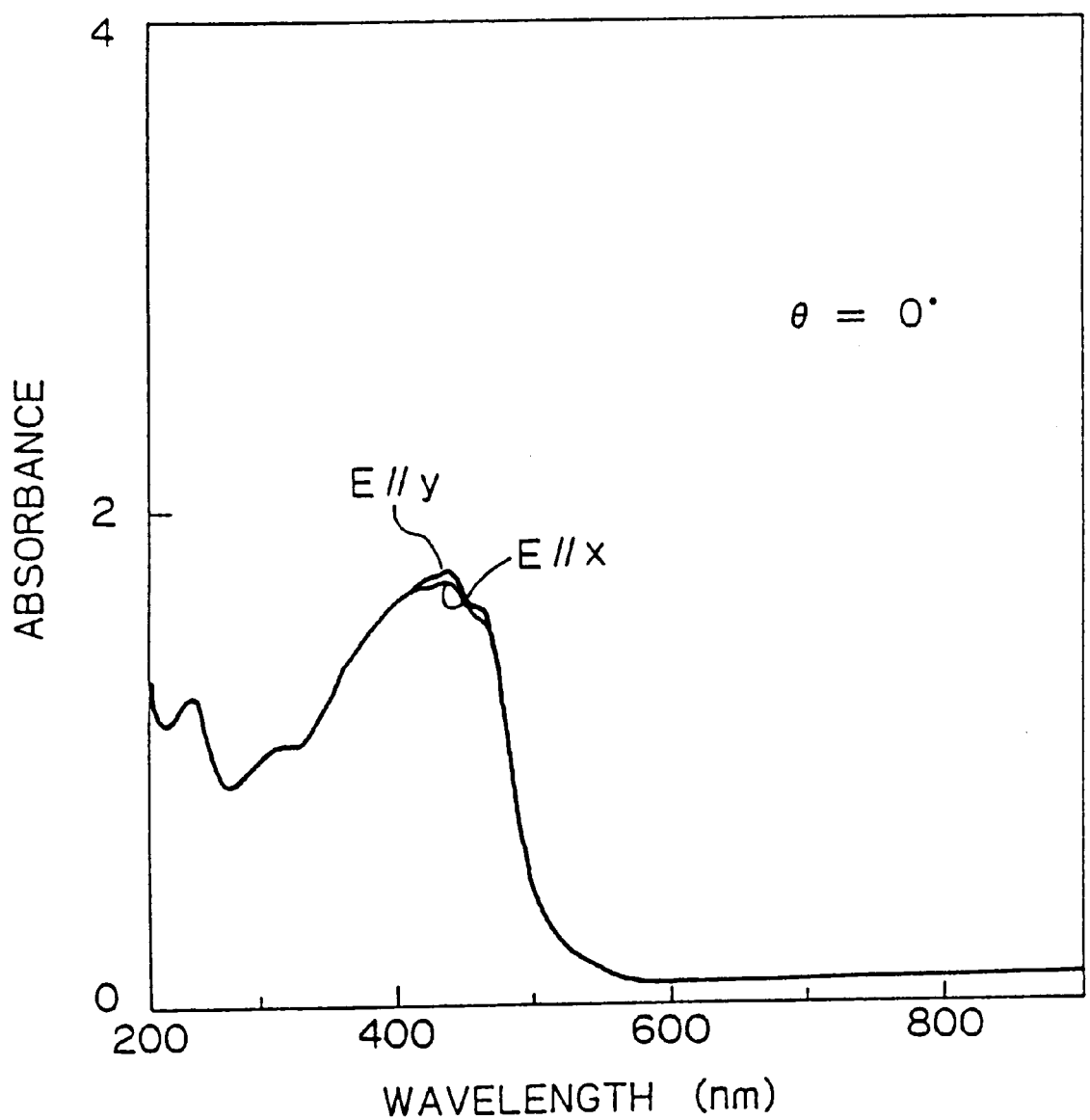
FIG. 31 is the optical absorbance spectrum of a polymer on $SiO_2$ film deposited by vertical evaporation deposition.

The following explanation refers to FIGS. 30 and 31. The light absorption spectrum when a polyazomethine film is deposited on the $SiO_2$ film obliquely evaporated at an inclination of 45° is indicated in FIG. 30. Dichroism is approximately 20 times greater in comparison with the optical absorbance spectrum in the polymer film deposited on $SiO_2$ film obtained during vertical evaporation deposition (FIG. 31).

According to a second aspect of the present invention, the present invention also provides an optical waveguide comprising an organic polymer film formed on a substrate, wherein the above-mentioned polymer film is comprised of, or mainly composed of, a polymer film by vapor phase deposition.

In the present invention, it is preferable that a polymer film by the above-mentioned vapor phase deposition be obtained by vacuum deposition polymerization, CVD, MLD and the like, and particularly preferable that it be comprised of a polyimide. Moreover, this polyimide should be either partially or completely fluorinated.

The present invention also provides a process for manufacturing an optical waveguide including the forming of a patterned organic or inorganic thin film on a substrate followed by selective vapor phase deposition of a polyimide film on this patterned thin film.

The following provides a detailed explanation of the above-mentioned present invention through its embodiments.

Figures 32A, 32B:
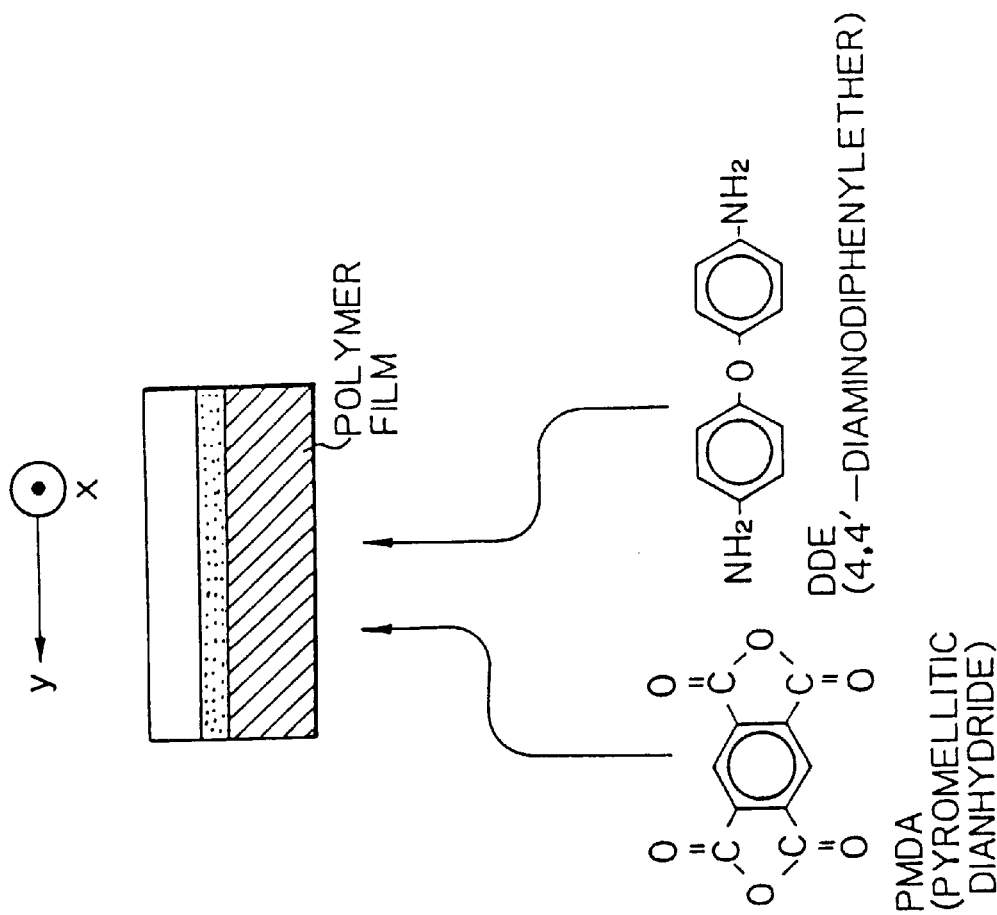
FIGS. 32a and 32b are explanatory drawings indicating one example of an optical waveguide formation process.
Figures 33A, 33B, 33C, 33D:
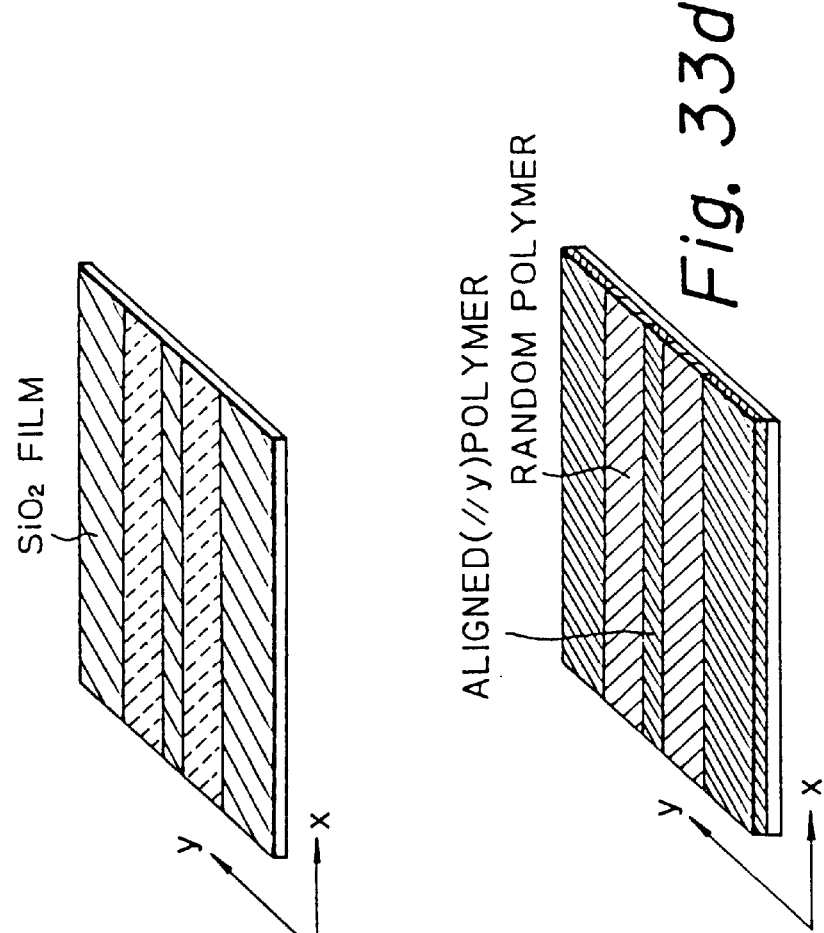
FIGS. 33a to 33d are explanatory drawings indicating an example of a process wherein a waveguide pattern is formed with an oblique evaporation deposited film of silicon oxide.
Figure 34B:
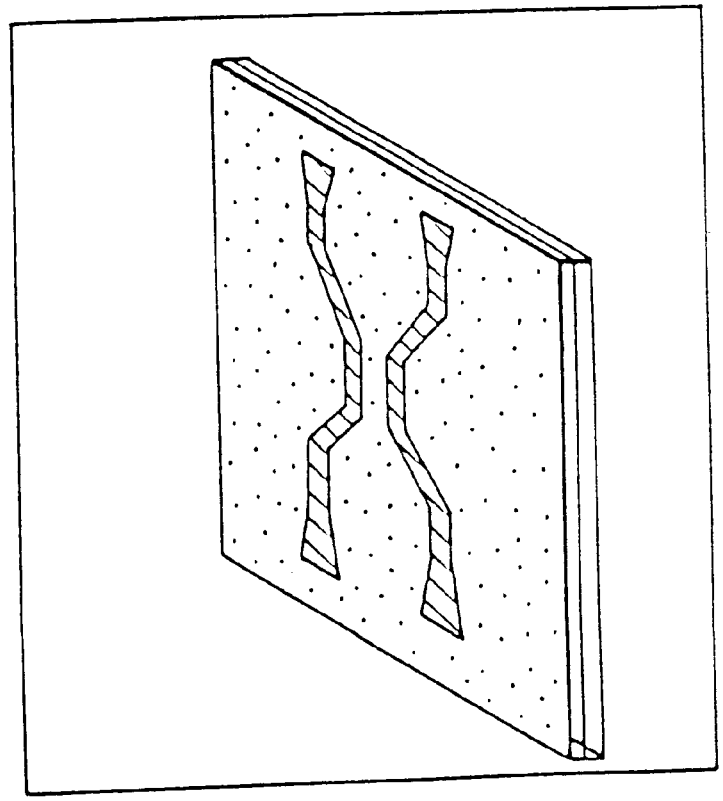
FIGS. 34(a)–34(b) are schematic drawings indicating a specific example of the structure of an optical waveguide.
Figure 34A:
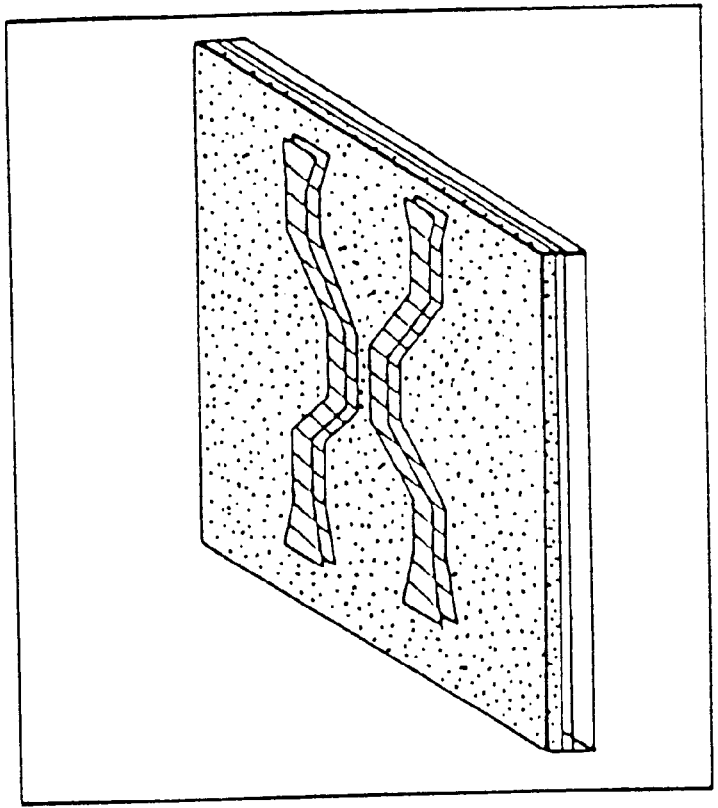

FIGS. 32a and 32b are explanatory drawings indicating one example of an optical waveguide forming process. In the following explanation, the example is given in the case of using electron beam deposition with $SiO_2$ as the evaporation source for the patterned thin film. FIGS. 33a through 33d are explanatory drawings indicating examples of a process wherein a waveguide pattern is formed with an oblique evaporation deposited film of silicon oxide. For example, a silicon oxide thin film, formed by tilting the substrate approximately 45° in the direction of the y axis as indicated in FIGS. 32a, is used. The vacuum at the time of evaporation deposition is, for example, $10^{-6}$ to $10^{-4}$ Torr, and the substrate temperature is 25° C. As a result, a base pattern having a film thickness of 10 Å to 10 microns is made. An Si surface, Si thermal oxidized film surface or quartz surface and so forth may be exposed at portions other than the waveguide pattern, or the surface of another type of thin film, such as silicon nitride, may also be exposed. Alternatively, a vertical evaporation deposited silicon oxide film, formed without tilting the substrate, may be exposed at portions other than the waveguide pattern. Again alternatively, a silicon oxide film, formed by tilting the substrate in a direction different from the waveguide pattern portion, may also be exposed. When, for example, a gas phase reaction is carried out (at a gas pressure of, for example, $10^{-6}$ torr to $10^{-2}$ torr) by introducing pyromellitic dianhydride (PMDA) and 4,4'-diaminodiphenylether (DDE) onto the above-mentioned base pattern, and polyamic acid is accumulated over the entire substrate at a substrate temperature of 50° C., a polyamic acid film oriented in the direction of the y axis is selectively grown on silicon oxide, automatically forming an optical waveguide with respect to TE light (light wherein the plane of polarization is in the direction of the surface interior) (FIG. 32b). Moreover, this becomes a polyimide waveguide when this is annealed at 220° C. for 1 hour. A specific example of the manufacturing of an optical waveguide according to this process is indicated in the form of the schematic drawings of FIGS. 34(a)–34(b). The guiding of a 0.63 micron He-Ne laser (TE light) and near infrared LD light (TE light) was confirmed for this waveguide.

Moreover, a multilayer waveguide can easily be formed by repeating this process, thereby allowing the fabrication of waveguide devices such as vertical directional couplers. This also achieves increased integration of optical circuit boards in such applications as optical interconnections and so forth. In addition, various optical devices, such as lenses, prisms and gratings, can be formed within slab-type optical waveguides by selective oriented growth as described above without performing etching and embedding processes using other materials as done in the past. Moreover, an embedded optical waveguide can be fabricated, wherein the core and clad are formed with the same substance, by controlling the inclination angle for each of the buffer, clad and waveguide layers during forming of the silicon oxide layer. In addition, hybridization can also be performed by connecting various optical devices (such as semiconductor lasers and photodiodes) or electronic devices (such as IC) with an optical waveguide. For example, after forming a base pattern in advance, the device is installed followed by accumulation of an organic film. In this case, well-adhered connections with the optical device or electronic device are realized without requiring etching of the waveguide and other following positioning procedures (refer to specification of Patent Application No. 4-48961).

Although the above explanation primarily used the example of a silicon oxide evaporation deposited film for the base material, said base material is not limited to such. For example, other materials such as other dielectric films conductors, organic films such as that of 1,10-diaminodecane, LE film, surface adsorption films such as silane coupling agents, and rubbing treated polymer films can also be used provided they are films or materials that effect the structure of the organic film that is grown on said materials or films. In addition, although the example of a polyimide film comprising FMDA and DDE was used in the above explanation, it goes without saying that this can also be applied to other polyimide materials, examples of which include partial or completely fluorinated polyimide film fluorinated by 6FDA or PFDB.

FIGS. 35(a)–35(b) are is an explanatory drawings indicating one example of a process for forming an optical waveguide by etching. After forming a polyimide by vacuum deposition polymerization, a resist pattern is made by photolithography. When oxygen plasma etching is then performed using this as the mask, the core portion of a waveguide is obtained. Here, a clad layer should be provided by spin coating or vacuum deposition polymerization prior to core formation, and a clad layer should be covered over said core portion by spin coating or vacuum deposition polymerization after core formation. Although it is desirable to use the same type of polyimide material as used in the core for the clad material, this is not always limited to the use of such a material, with any such material being able to be used provided it has a lower refractive index with respect to the waveguide than the core portion.

Figure 36A:
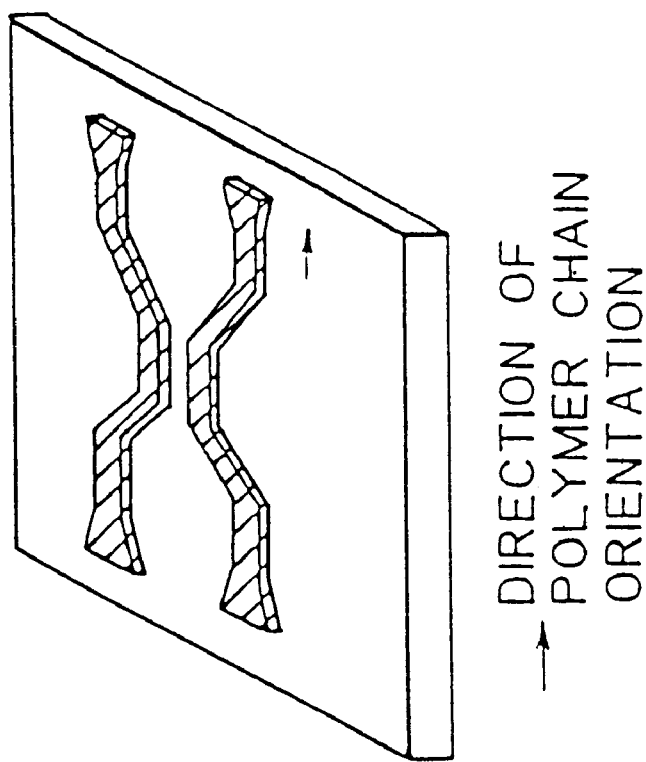
Figure 36B:
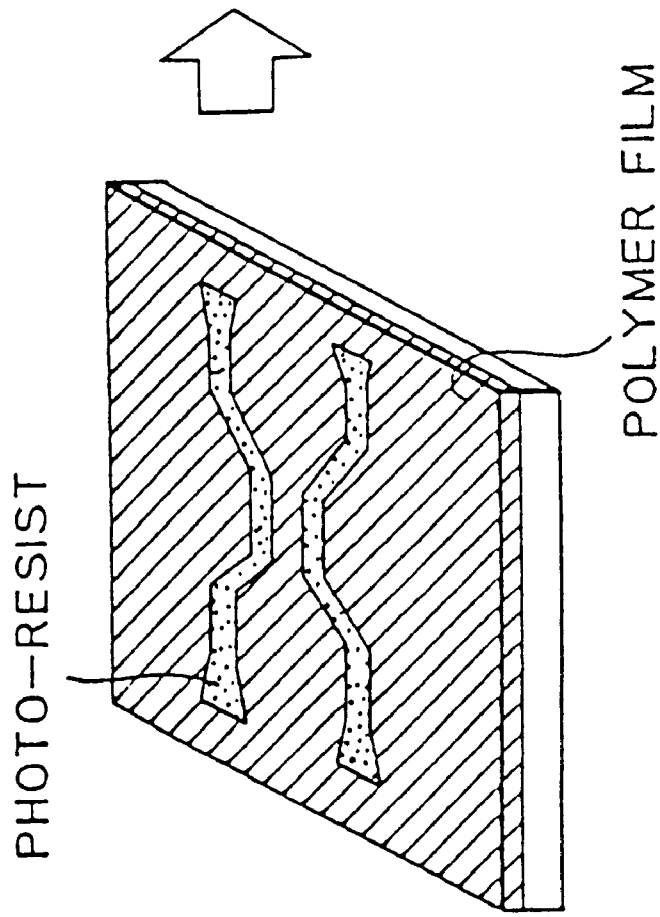
Figure 37A:
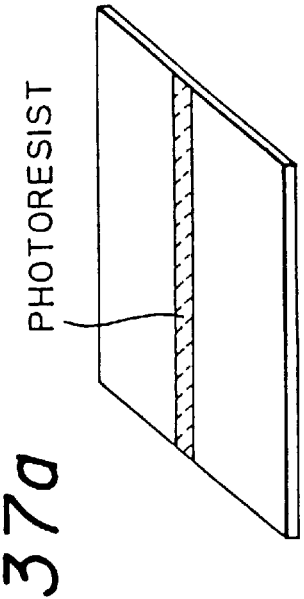
FIGS. 37a through 37d are explanatory drawings indicating an example wherein a polymer chain of portions other than the region of a waveguide pattern is oriented either in the direction of the optical waveguide or in a direction near that direction, and randomly oriented in the portion of the waveguide pattern.
Figure 37B:
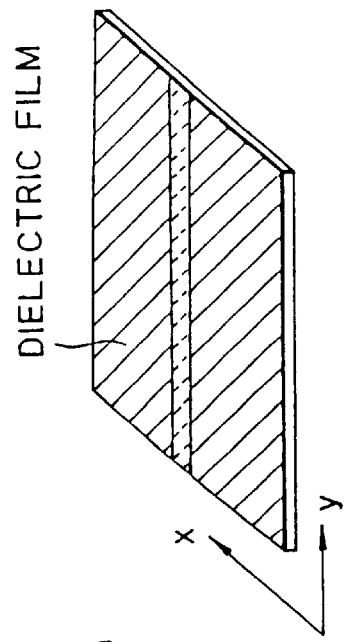
Figure 37C:
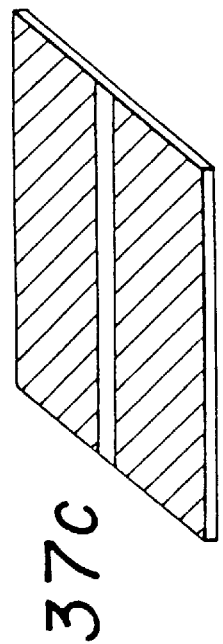
Figure 37D:
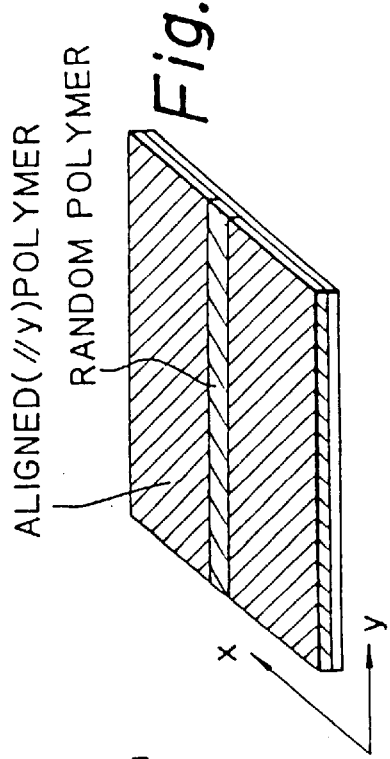

FIGS. 36(a)–36(b) are explanatory drawings indicating an example of orienting the polymer chain of the core during core formation. If the polymer chain is oriented in the direction of light propagation or a direction close to that direction, the absorbance loss of the polymer can be decreased. This is because absorbance weakens when the direction of polarization is perpendicular to the primary polymer chain.

FIG. 37 is an explanatory drawing indicating an example of orienting the polymer chain of the portion other than the waveguide pattern region in the direction of the waveguide, or a direction close to that direction, and performing random orientation in the waveguide pattern portion. As a result, the refractive index within the waveguide pattern with respect to both TM and TE polarized waves becomes larger allowing the formation of a waveguide.

Regions having different orientations can also be made within a substrate. This makes it possible to form curved waveguides. For example, formation of an oblique evaporation deposited film of the base should be performed in a plurality of regions while changing the inclination angle of the substrate.

Figure 38:
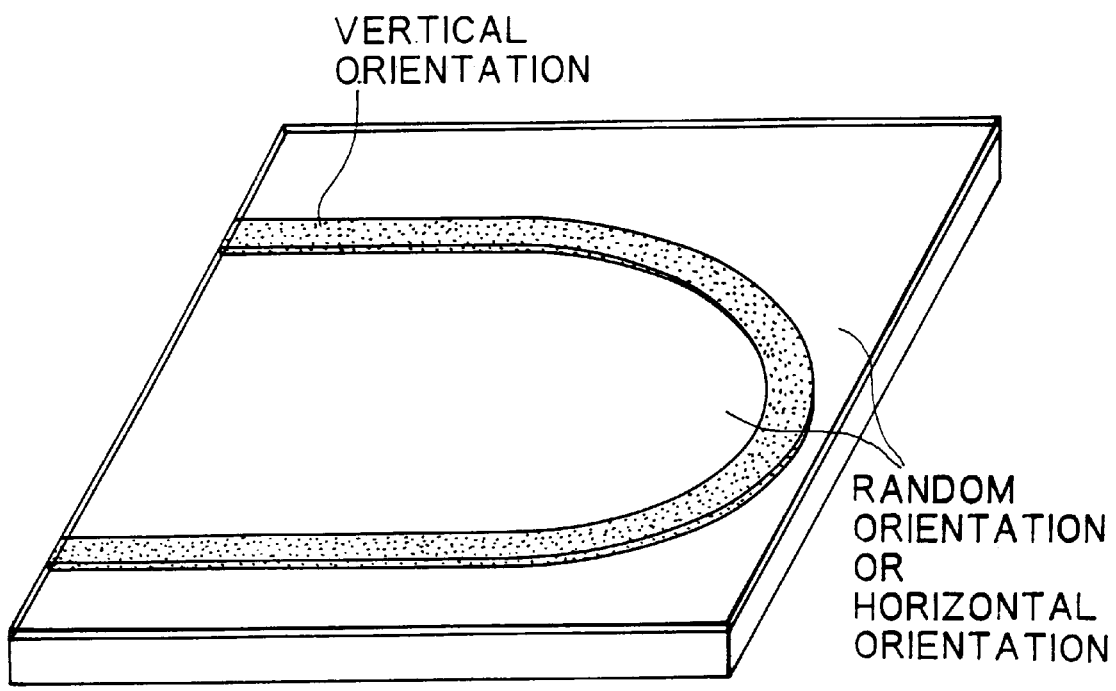
FIG. 38 is an explanatory drawing indicating an example of fabricating a curved waveguide by orienting and forming the polymer of the core portion perpendicular to the substrate.

In addition, as indicated in FIG. 38, if the polymer of the core portion is formed to be oriented perpendicular to the substrate, a curved waveguide can be easily fabricated without dividing the plurality of regions as described above due to the refractive index always becoming higher with respect to the TM mode. Conversely, since the refractive index of the core portion always becomes higher with respect to the TE mode even when the polymer of portions other than the core portion is formed to be oriented perpendicular to the substrate, a curved waveguide can be easily fabricated without dividing the plurality of regions as described above. Moreover, the waveguide will always acts as a waveguide for the TM mode even when the core is given random orientation and other portions are oriented horizontally. These methods may be applied to other optical circuit devices.

In addition, by using a fluorinated polyimide for the polyimide in the above-mentioned process, absorbance loss in the invisible region, 1.3 $\mu$m band and 1.5 $\mu$m band is reduced.

Furthermore, although the above-mentioned process is described with respect to a polyimide, other materials such as polyazomethine are also similarly useful in the present invention.

According to a third aspect of the present invention, a thin film transistor is provided equipped with a gate (G), source electrode (S) and drain electrode (D) and having a gate insulating film and polymer semiconductor film, wherein the polymer semiconductor film is oriented in the direction of the source electrode (S) and drain electrode (D).

In the polymer thin film transistor of the above-mentioned present invention, it is preferable that the polymer semiconductor be selectively oriented in the S-D direction between the source electrode and drain electrode.

The following provides a detailed explanation of the above-mentioned present invention through its embodiments.

FIG. 39 is a schematic cross-sectional view indicating an example of the structure of the thin film transistor (TFT). FIGS. 39a through 39d, 39i and 39j indicate a reverse staggered TFT, while FIGS. 39e through 39h indicated a staggered structure TFT. FIG. 39a indicates an example of forming silicon oxide oblique evaporation deposited film 2 for the gate insulating film and fabricating polyazomethine film 3 on top of said oblique evaporation deposited film 2. For example, by evaporation depositing silicon oxide with the substrate inclined at approximately 45° in the direction of the y axis as indicated in FIG. 40, a gate insulating film is formed having a thickness of 1000 to 5000 Å. Next, a polyazomethine film is deposited on said gate insulating film by CVD using terephthalaldehyde (TPA) and paraphenylenediamine (PPDA) to obtain a polymer semiconductor film. When an evaporation deposited film is formed by inclining the substrate along the direction of current (y axis) between S and D in this manner, a conjugated polymer (polymer semiconductor) film is obtained oriented in the S-D direction. As a result, a favorable TFT can be formed with improved mobility in the S-D direction. The degree of orientation of the polymer can be controlled with the inclination angle of the substrate, and mobility in the S-D direction as well as that in a direction perpendicular to that can be adjusted.

Figure 39A:
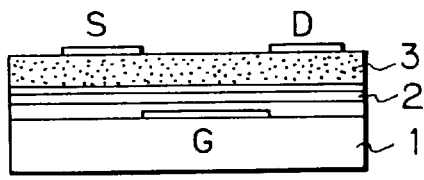
FIGS. 39a through 39j are schematic cross-sectional views indicating an example of the structure of the polymer thin film transistor of the present invention.
Figure 39B:
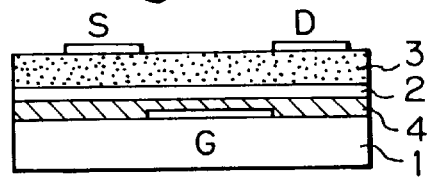
Figure 39C:
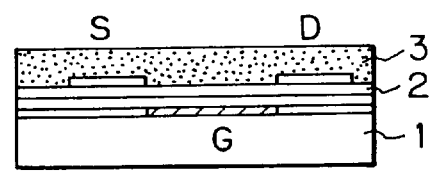
Figure 39D:
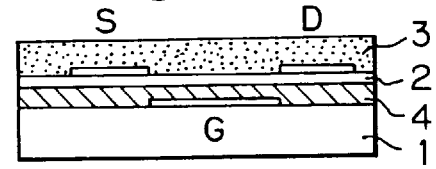

FIG. 39b is an example of controlling the orientation of a polymer in the same manner as above by forming a dielectric oblique angled evaporation deposited film 2 having a thickness of 50 to 200 Å on a gate insulating film 4 comprised of a dielectric, and forming a conjugated polymer film 3 on top of said semiconductor angled evaporation deposited film 2. FIGS. 39c and 39d are examples of forming S and D at the interface of a polymer semiconductor and insulator. In this case, the polymer is selectively oriented in the region between S and D.

Figure 39E:
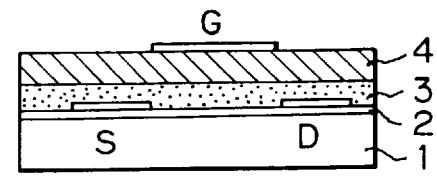
Figure 39F:
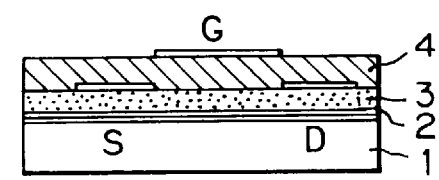
Figure 39G:
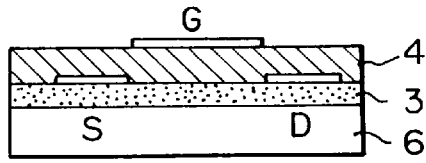
Figure 39H:
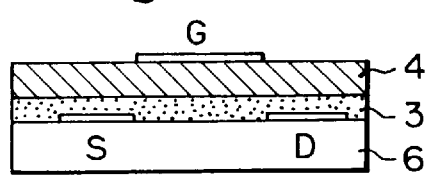
Figure 39I:
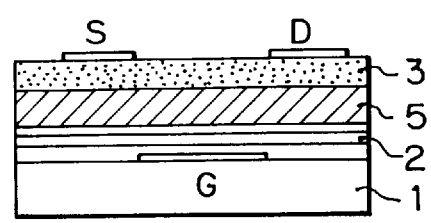

In the example shown in FIG. 39i, after forming a gate on substrate 1, oblique evaporation deposited film 2 (for example, an SiO$_2$ film) is formed in the same manner as above. Next, a polyimide film 5 (1000 to 5000 Å) and polyazomethine film 3 (100 to 3000 Å) are sequentially formed by CVD. This results in hysteresis of orientation demonstrating orientation to both the polyimide gate insulating film and the polyazomethine polymer semiconductor film.

Figure 39J:
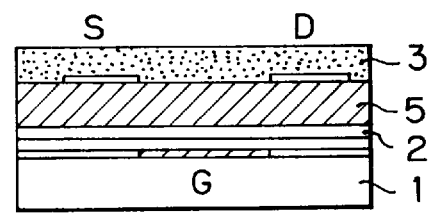

In FIG. 39j, oblique evaporation deposited film 2 is formed after forming a gate on substrate 1 in the same manner as above. Next, after forming polyimide film 5 (1000 to 5000 Å) and S and D, polyazomethine film 3 (100 to 3000 Å) is formed. As a result, polyazomethine is selectively oriented in the region between S and D.

FIG. 39e is an example wherein after forming oblique evaporation deposited film 2 on substrate 1. Next, after forming polyazomethine film 3, S and D are formed on top of said polyazomethine film 3. Next, gate insulating film 4, comprised of polyimide or silicon nitride, is formed and G is then formed on top. In FIG. 39e, selective orientation of a polymer semiconductor is obtained in the region between S and D, and in FIG. 39f, orientation of the polymer semiconductor is obtained over the entire surface.

FIGS. 39g and 39h are examples of giving orientation to the substrate itself. In these examples, a substrate comprising a drawn polymer or a substrate comprising a rubbing treated polymer and so forth can be used for substrate 6. Alternatively, a substrate like that which is rubbing treated after forming a polymer film on a glass plate may also be used. Alternatively, after forming a gate polymer insulating layer, said layer may be rubbed followed by formation of a polymer semiconductor film.

In the above-mentioned examples, an orientation treated organic film (such as a rubbed film) may also be used instead of an oblique evaporation deposited film. In addition, evaporation deposited films of conjugated polymers such as polythiophene and polysilane etc. may be used for the polymer semiconductor film.

Other materials can be selected over a broad range for use as the gate insulating film, examples of which include a polymer film having for its base polymethylmethacrylate, polyvinylcarbazole, polycarbonate, polystyrene or epoxy etc.; a polymer film fabricated by bonding a molecule containing two or more groups chosen from a dianhydride group of carboxylic acid (carbonyloxycarbonyl group), an acid halogenated group of carboxylic acid, an —NCO group and a —CHO group, and a molecule containing at least two or more groups chosen from a group containing one or more amino groups or amino protons, an alkylamino group having 1–10 carbon atoms and a silylated amino group; a polymer film fabricated by bonding a molecule containing two or more epoxy groups, and a molecule containing two or more groups chosen from a group containing one or more amino groups or amino protons, an alkylamino group having 1–10 carbon atoms, and a silylated amino group, or a polysiloxane film.

In addition, the material of the gate insulating film is not limited to a polymer material, and low molecular weight crystals and low molecular weight/high molecular weight compounds can also be used and annealing of the semiconductor polymer film is effective to enhance the mobility of carriers in the film.

According to a fourth aspect of the present invention, means are provided for manufacturing a high molecular weight, three-dimensional optical waveguide as described below.

A first means is a process for manufacturing a high molecular weight, three-dimensional optical waveguide wherein at least one pair of electrodes is formed on a substrate, and a polymer thin film containing polar groups is formed using CVD or vacuum deposition polymerization while applying a voltage between the electrodes to orient the polar groups of the polymer.

A second means is a process for manufacturing a high molecular weight, three-dimensional optical waveguide wherein at least one pair of electrodes is formed on a substrate, a polymer thin film containing polar groups is formed using CVD or vacuum deposition polymerization (VDP), the polar groups are oriented by forming a polymer thin film containing polar groups using CVD or VDP while applying a voltage between said electrodes, and a polymer thin film containing polar groups is formed using CVD or VDP by removing the voltage applied between said electrodes.

A third means is a process for manufacturing a high molecular weight, three-dimensional optical waveguide wherein at least one pair of electrodes are formed with one electrode on a substrate and the other electrode above a substrate, and a polymer thin film containing polar groups is formed using CVD or VDP while applying a voltage between those electrodes.

A fourth means is a process for manufacturing a high molecular weight, three-dimensional optical waveguide wherein at least one pair of electrodes is formed with one of the electrodes on a substrate and the other electrode above a substrate, a polymer thin film containing polar groups is formed using CVD or VDP, a polymer thin film containing polar groups is formed using CVD or VDP while applying a voltage between said electrodes to orient the polar groups, and a polymer thin film containing polar groups is formed using CVD or VDP by removing the voltage applied between said electrodes.

A fifth means is a process for manufacturing a high molecular weight, three-dimensional optical waveguide wherein the magnitude of the voltage applied between said electrodes in the first, second, third and fourth means is continuously changed to continuously change the refractive index of the optical waveguide in the vertical direction.

A sixth means is a process for manufacturing a high molecular weight, three-dimensional optical waveguide wherein a buffer layer is formed on the optical waveguide formed using the process for manufacturing a high molecular weight, three-dimensional waveguide of the first, third or fifth means, and a process for again forming an optical waveguide using the process for manufacturing a high molecular weight, three-dimensional optical waveguide of the first, third or fifth means is repeated to form a multilayer optical waveguide.

A seventh means is a process for manufacturing a high molecular weight, three-dimensional optical waveguide wherein the process for manufacturing a high molecular weight, three-dimensional optical waveguide of the first, second, fourth or fifth means is repeated to form a multilayer optical waveguide.

An eighth means is a process for manufacturing a high molecular weight, three-dimensional optical waveguide wherein a plurality of opposing electrodes are formed along the region where an optical waveguide is formed on a substrate, and a polymer thin film containing polar groups is formed using CVD or VDP while sequentially applying a voltage between the plurality of opposing electrodes.

A ninth means is a process for manufacturing a high molecular weight, three-dimensional optical waveguide wherein the process for manufacturing a high molecular weight, three-dimensional optical waveguide of the eighth means is repeated to form a multilayer optical waveguide.

A tenth means is a process for manufacturing a high molecular weight, three-dimensional optical waveguide wherein a plurality of fine electrodes are formed on a substrate, and a polymer thin film containing polar groups is formed using CVD or VDP while forming an arbitrary electric field pattern pattern by controlling the voltage respectively applied to the fine electrodes.

An eleventh means is a process for manufacturing a high molecular weight, three-dimensional optical waveguide wherein the process for manufacturing a high molecular weight, three-dimensional optical waveguide of the tenth means is repeated to form a multilayer optical waveguide.

A twelfth means is a process for manufacturing a high molecular weight, three-dimensional optical waveguide wherein one of the opposing electrodes is arranged above a substrate in the process for manufacturing a high molecular weight, three-dimensional optical waveguide of the eighth means or tenth means.

A thirteenth means is a process for manufacturing a high molecular weight, three-dimensional optical waveguide wherein the process for manufacturing a high molecular weight, three-dimensional optical waveguide of the twelfth means is repeated to form a multilayer optical waveguide.

A fourteenth means is a process for manufacturing a high molecular weight, three-dimensional optical waveguide wherein the magnitude of the voltage applied in the process for manufacturing a high molecular weight, three-dimensional optical waveguide of the eighth, ninth, tenth, eleventh, twelfth or thirteenth means is continuously changed to continuously change the refractive index of the optical waveguide in the vertical direction.

Methods have been developed in recent years for forming polymer thin films by vacuum deposition polymerization of polymer raw materials. These methods have the characteristics indicated below.

(1) The inherent functions of the film (such as insulation and so forth) are improved due to allowing the obtaining of a film having a low level of impurities.

(2) Accumulation of solvent molecules in the film can be prevented since a solvent is not used during coating.

(3) Since these methods involve a dry process, the entire semiconductor production process can be carried out in a vacuum.

Although polyimides, polyamides, polyazomethine and polyurea, etc., have thus far been verified to be molecules that can be coated by CVD or VDP, deposition of epoxy polymers (either one-dimensional or three-dimensional) is also possible by reaction of fatty amine and epoxy.

As a result of repeated research based on the idea that the objective of the present invention could be achieved if it were possible to form an optical waveguide simultaneous to coating using a polymer film coating method by this CVD or VDP, the inventors of the present invention discovered that when a polymer film containing polar groups is coated using CVD or VDP while applying an electric field between electrodes formed on a substrate, the polar groups of the polymer film in the region at which the electric field is applied are oriented, and the refractive index is different from that of other regions. The present invention applies the results of this research.

When a polymer film is coated while applying an electric field between electrodes formed on a substrate, light is confined due to differences in refractive indices between the air, polymer film and substrate in the vertical direction, and differences in the refractive indices resulting from the orientation of polar groups in the lateral direction.

In addition, when a polymer film is coated on an electrode formed on a substrate, if a polymer film is first formed to an arbitrary thickness without applying an electric field, a polymer film, in which the polar groups are oriented, is then formed on top of said polymer film to an arbitrary thickness by applying an electric field, and a polymer film is finally formed on top of said polymer film to an arbitrary thickness without applying an electric field, light is confined in both the vertical and lateral directions due to changes in the refractive indices of the polymers, thus forming a completely embedded waveguide.

Furthermore, single mode waveguides are desirable in waveguide-type optical control devices. Those that are symmetrical in all four directions and result in suitable changes in the refractive index of the waveguide portion are ideal. However, since the majority of embedded waveguides are covered with a buffer layer that differs from the substrate, they do not achieve completely vertical symmetry. The use of the manufacturing process of the present invention allows the realization of a completely symmetrical structure in all four directions, thus allowing the formation of an ideal waveguide.

In addition, since a waveguide is formed using orientation of polar groups, said waveguide can also be used as an optical modulator since it is able to confine light within the waveguide as well as produce non-linear optical effects.

Moreover, since the degree of orientation of the molecules, or in other words, the change in refractive index, can be controlled by changing the magnitude of the voltage applied between the electrodes, said manufacturing process is also extremely advantageous in terms of waveguide design. Furthermore, various optical devices can also be formed by multilayering.

The following provides an explanation of a process for manufacturing a high molecular weight, three-dimensional waveguide pertaining to the embodiments of the above-mentioned present invention with reference to the drawings.

Figure 41:
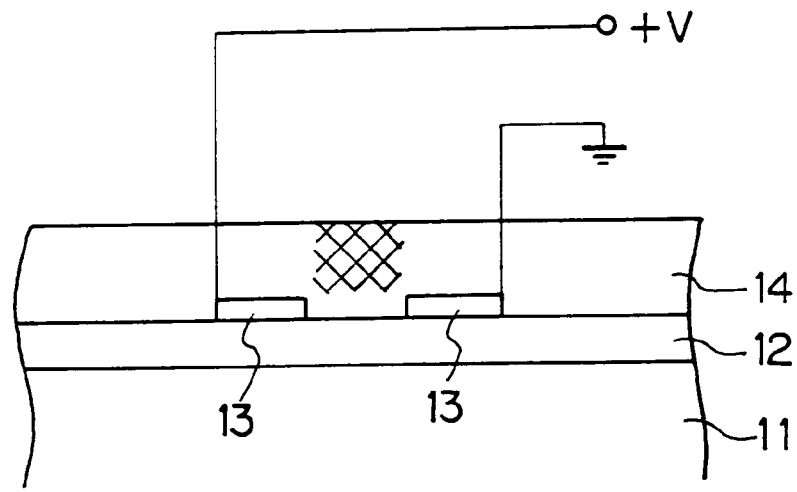
FIG. 41 is an explanatory drawing of a process for manufacturing an optical waveguide.

The following provides an explanation of a first embodiment of the present invention with reference to FIG. 41. A buffer layer in the form of a silicon oxide film 12 is formed on silicon substrate 11, and an aluminum film is formed to a thickness of 1000 Å and patterned on said film 12 followed by forming a pair of opposing aluminum electrodes 13 at an interval of 10 μm.

Aminoethylaminonitropyridine (AEANP) and tetramethylbiphenylepoxy (TMBE) are placed in separate cells of a CVD apparatus and heated to evaporate. Polymer film 14 is then formed on buffer layer 12 under the conditions listed below.

| | |
|---|---|
| Substrate temperature | 32° C. |
| Gas pressure | 2 to 3.5 × $10^{-5}$ Torr |
| Evaporation deposition rate | 3–5 Å/s |
| Evaporation deposition time | 2 hours |
| Film thickness | 2 μm |
| Voltage applied to electrodes | 200V (0.2 MV/cm) |
| Cell temperatures  AEANP: | 70 to 72° C. |
| BE: | 100 to 105° C. |

Figure 42:
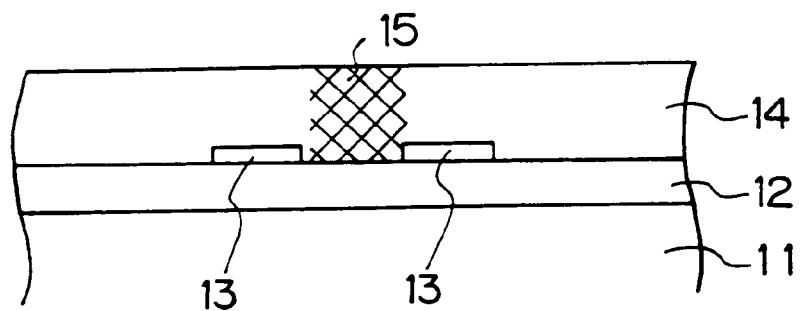
FIG. 42 is a block drawing of an optical waveguide.

The following explanation refers to FIG. 42. As a result, polymer film 14 is oriented in the region between electrodes 13 resulting in the formation of three-dimensional waveguide 15.

The following provides an explanation of a second embodiment of the present invention with reference to FIGS. 43a, 43b, 43c and 43d. An aluminum film is formed to a thickness of 1000 Å on non-doped silicon substrate 11 and patterned followed by the forming of a pair of opposing electrodes 13 at an interval of 10 μm. Next, polymer film 14 is formed with the conditions for substrate temperature, gas pressure, evaporation deposition rate and cell temperatures the same as those in the first embodiment.

Figure 43A:
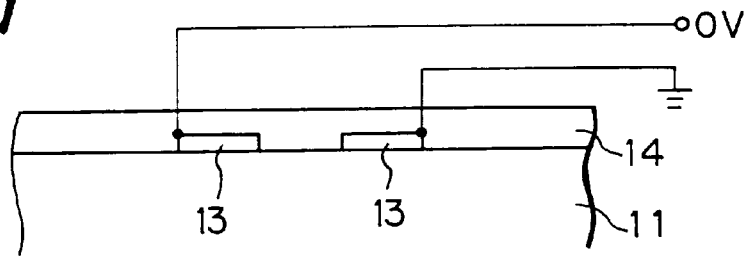
FIGS. 43a through 43d are explanatory drawings of a process for manufacturing an optical waveguide.

At that time, a polymer film 14 having a thickness of 0.5 μm is formed without applying a voltage between the electrodes for the first 30 minutes as indicated in FIG. 43a.

Figure 43B:
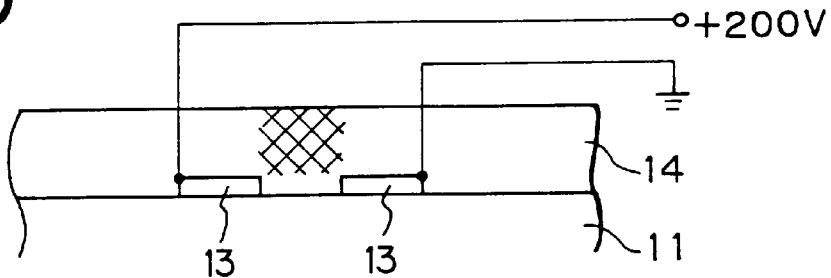

A polymer film 14 is then formed to a thickness of 1.0 μm by applying a voltage of 200 V (0.2 MV/cm) for the next 60 minutes at indicated in FIG. 43b. The molecules of said polymer film 14 are oriented in the region between the electrodes.

Figure 43C:
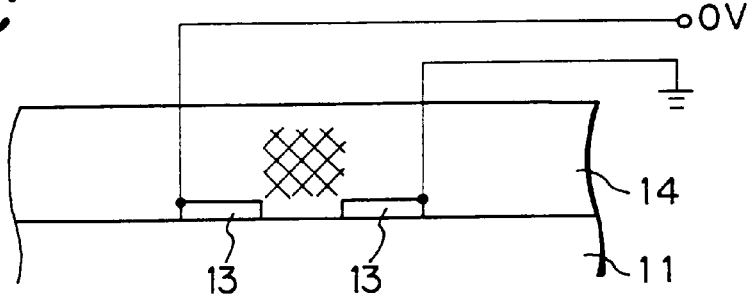

A polymer film 14 having a thickness of 0.5 μm is then formed again without applying a voltage for the next 30 minutes as indicated in FIG. 43c.

Figure 43D:
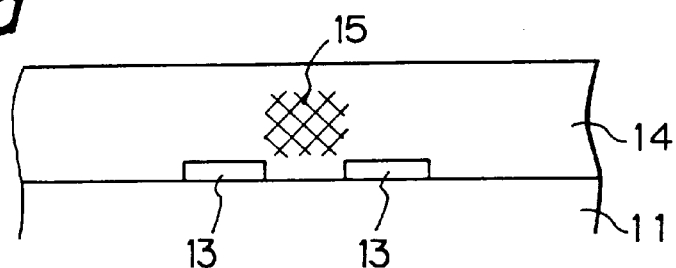

As a result, an embedded three-dimensional waveguide 15 is formed surrounded by polymer 14 in all directions as indicated in FIG. 43d.

The guiding of He-Ne laser light was tested for the above-mentioned two types of waveguides by direct bonding to the cleavage surface. As a result, well-defined guided light was observed on a screen thus confirming the formation of a three-dimensional optical waveguide. In addition, guided light of the second embodiment was confirmed to have remarkably fewer modes than that of the first embodiment, the formation of an embedded waveguide and its effects were also confirmed. In addition, as a result of measuring electrooptical effects by Mach-Zehnder interferrometer for the waveguide of the first embodiment, the electrooptical constant $r_{11}$ was observed to be 0.1 pm/v, thus confirming that this waveguide can also be used as an optical modulator.

Figure 44:
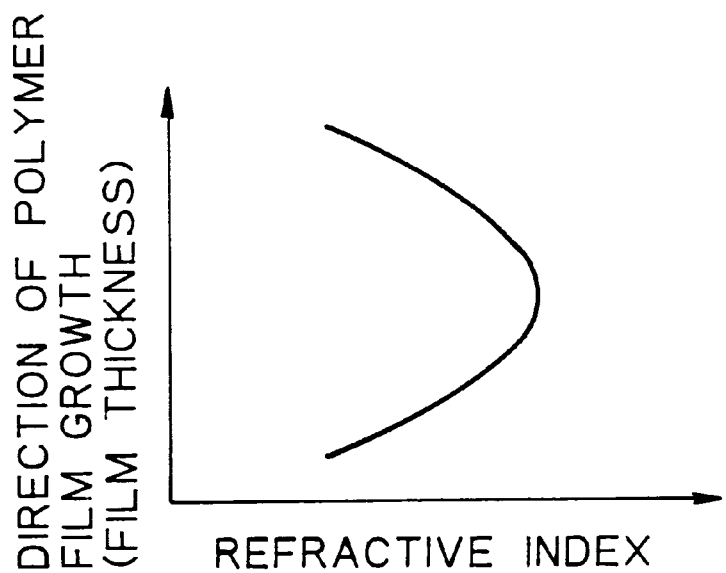
FIG. 44 is a graph of the distribution of the refractive index of an optical waveguide.

The following provides an explanation of a third embodiment of the present invention with reference to FIG. 44. If the voltage applied between electrodes 13 during polymer film growth in the first or second embodiment is gradually increased starting from 0 and then gradually decreased to 0, the refractive index of the waveguide can be distributed as indicated in FIG. 44.

Figure 45:
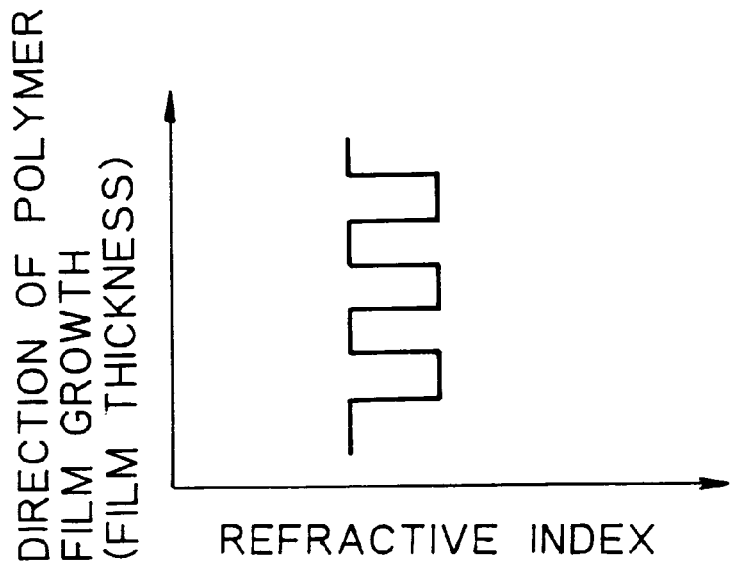
FIG. 45 is a graph of the distribution of the refractive index of a multilayer optical waveguide.

The following provides an explanation of a fourth embodiment of the present invention with reference to FIG. 45. A multilayer waveguide can be formed by repeating the polymer film growth process of the second embodiment. The refractive index of the polymer film in this case is distributed in the direction of polymer film growth as indicated in FIG. 45.

Figure 46:
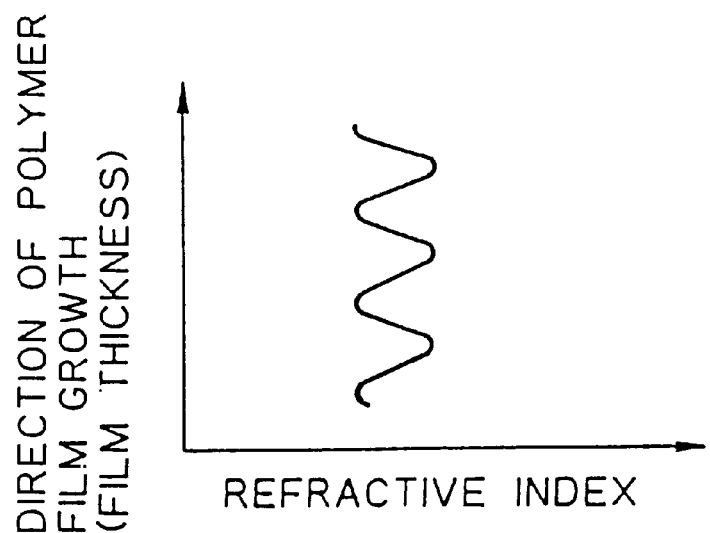
FIG. 46 is a graph of the distribution of the refractive index of a miultilayer optical waveguide.

The following provides an explanation of a fifth embodiment of the present invention with reference to FIG. 46. A multilayer waveguide can be formed by repeating the polymer film growth process of the third embodiment. The refractive index of the polymer film in this case is distributed in the direction of polymer film growth as indicated in FIG. 46.

Figure 47:
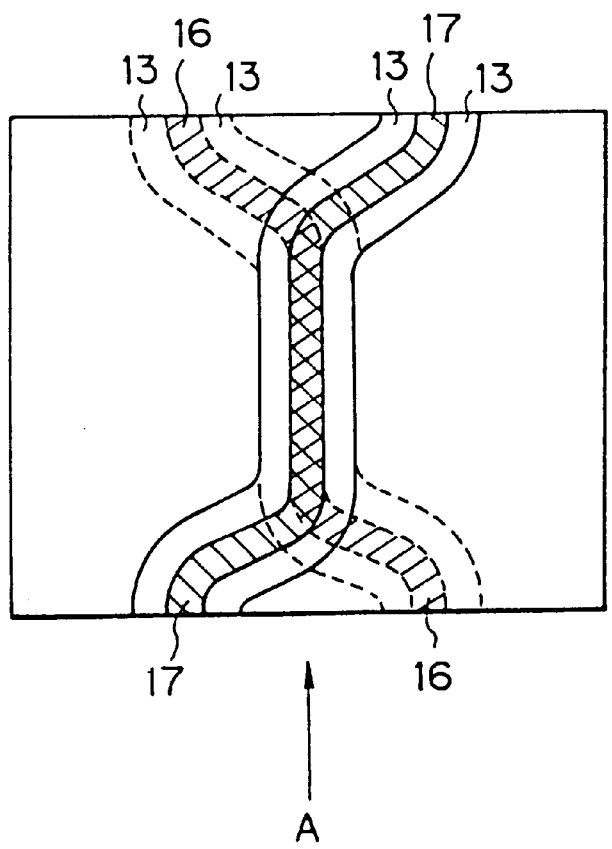
FIG. 47 is an explanatory drawing of a process for manufacturing a multilayer optical waveguide.
Figure 48:
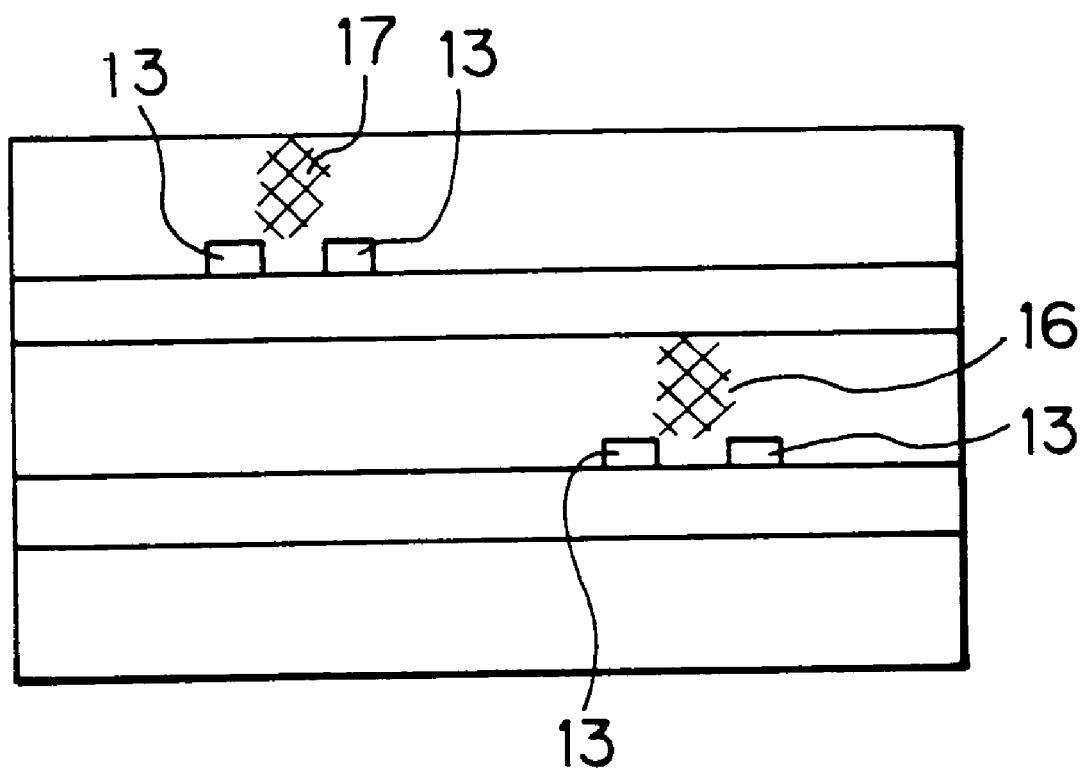
FIG. 48 is a side view from the direction of arrow A of FIG. 47.

The following provides an explanation of a sixth embodiment of the present invention with reference to FIGS. 47 and 48. A multilayer waveguide, wherein the shape of waveguide 16 of the lower layer and the shape of the waveguide 17 of the upper layer differ, can be formed by repeating the process of the first embodiment and changing the shape of the electrodes 13 as indicated in FIGS. 47 and 48 (FIG. 48 is a cross-sectional view from the direction of arrow A of FIG. 47).

Figure 49:
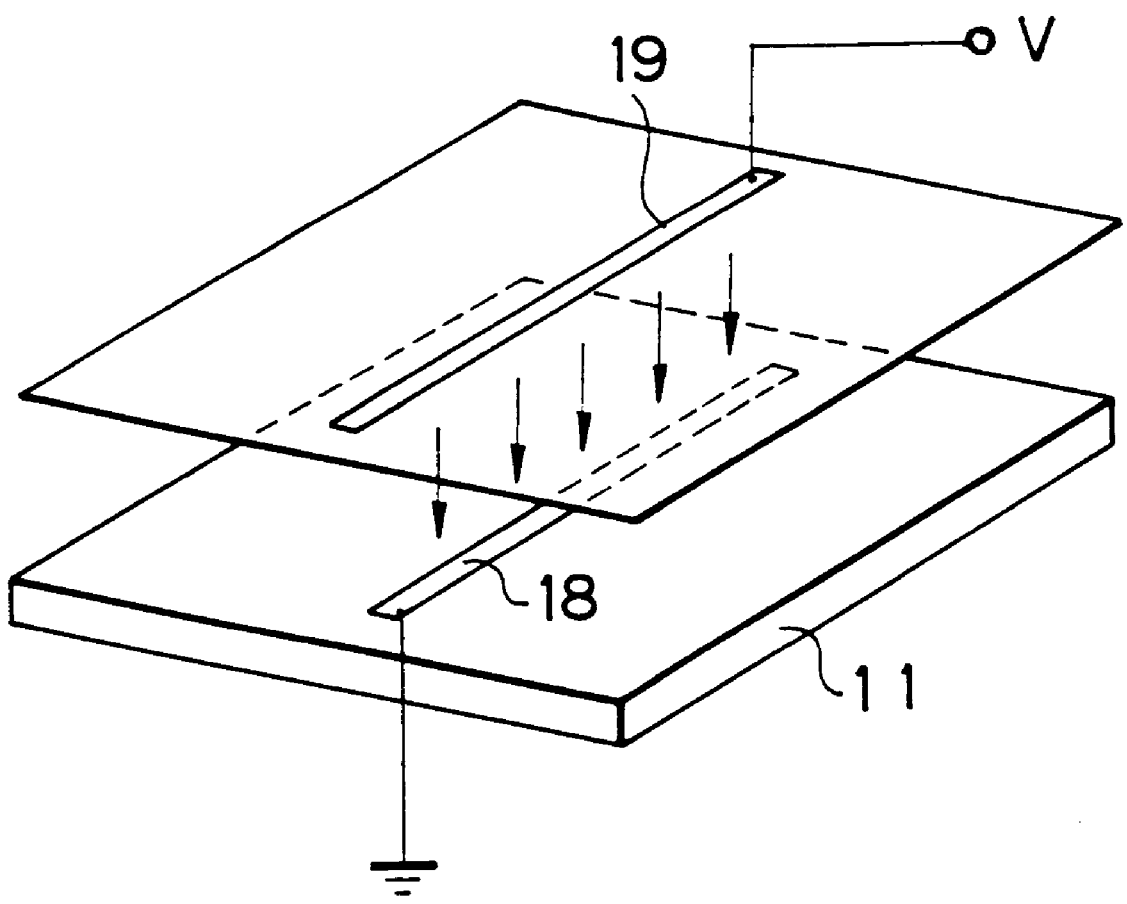
FIG. 49 is an explanatory drawing indicating another example of an electrode arrangement.
Figure 52A:
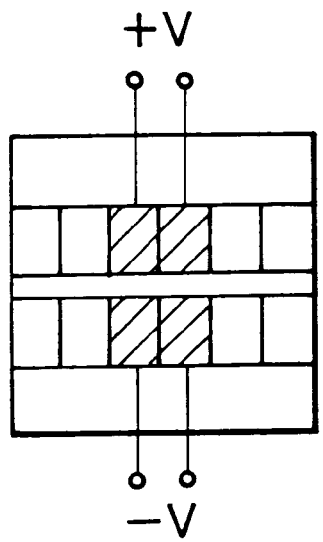
FIGS. 52a and 52b are explanatory drawings of a process for manufacturing an optical waveguide curved in the vertical direction.
Figure 52B:
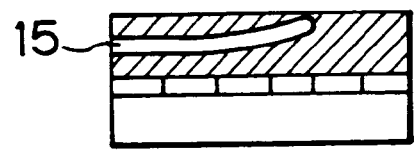
Figure 53A:
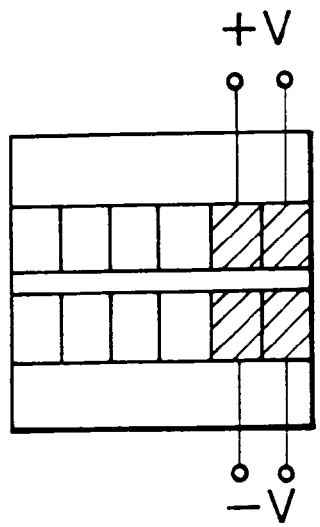
FIGS. 53a and 53b are explanatory drawings of a process for manufacturing an optical waveguide curved in the vertical direction.
Figure 53B:
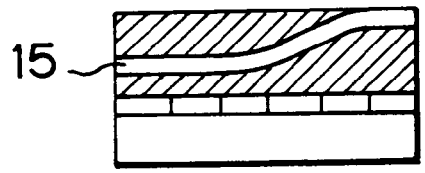
Figure 54A:
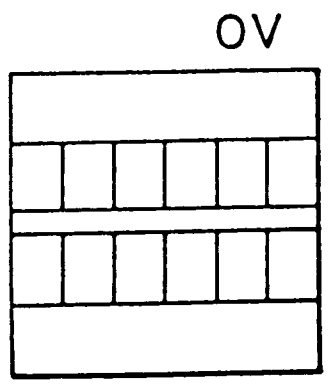
FIGS. 54a and 54b are explanatory drawings of a process for manufacturing an optical waveguide curved in the vertical direction.
Figure 54B:
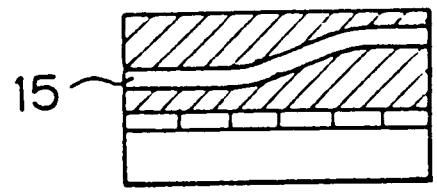

The following provides an explanation of a seventh embodiment of the present invention with reference to FIG. 49. Instead of forming opposing electrodes on a substrate, a polymer film can be oriented by arranging one of the electrodes 18 on a substrate and arranging the other electrode 19 above a substrate 11 as indicated in FIG. 49.

The following provides an explanation of an eighth embodiment of the present invention with reference to FIGS. 50*a*, 50*b*, 51*a*, 51*b*, 52*a*, 52*b*, 53*a*, 53*b*, 54*a* and 54*b*. FIGS. 50*a* through 54*a* are overhead views, while FIGS. 50*b* through 54*b* are side views. When a polymer film is grown by dividing a pair of opposing electrodes 13 into a plurality of electrodes along the direction in which a waveguide is formed as indicated in FIGS. 50*a* and 50*b*, and shifting the positions of those electrodes to which a voltage is sequentially applied as indicated in FIGS. 51*a*, 52*a*, 53*a* and 54*a* while, in particular, gradually moving the electrodes to which a voltage is applied in FIG. 52*a*, an upwardly curved waveguide 15 is formed in the polymer film grown on the substrate as indicated in FIGS. 51*b*, 52*b*, 53*b* and 54*b*.

Figure 55:
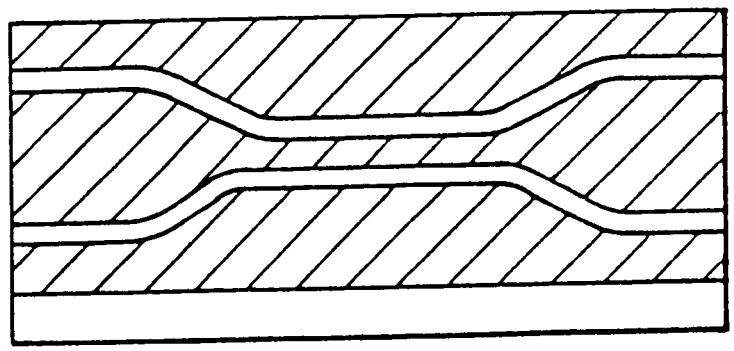
FIG. 55 is a block drawing of a directional coupler.

The following explanation refers to FIG. 55. The directional coupler like that indicated in FIG. 55 can be formed by combining the above-mentioned processes.

Figure 56:
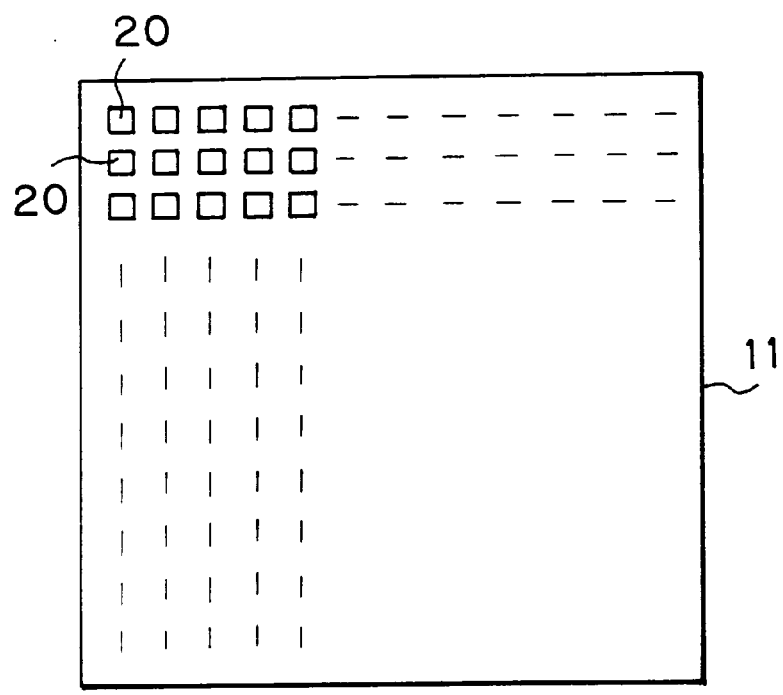
FIG. 56 is an explanatory drawing of a process for manufacturing an optical waveguide using microelectrodes.

The following provides an explanation of a ninth embodiment of the present invention with reference to FIG. 56. A waveguide having a complex planar shape can be formed by arranging fine electrodes 20 on substrate 11 and growing a polymer film while applying a voltage between arbitrary opposing electrodes. In addition, an upwardly curved waveguide can be formed if the position of electrodes 20 to which a voltage is applied is gradually moved during polymer film growth.

As a means of applying a voltage to the fine electrodes, a TFT (thin film transistor) should be arranged on a substrate, fine electrodes should be formed on said TFT, growth of the polymer film should be synchronized by an IC and so forth to drive the TFT, and a voltage should be applied between arbitrary electrodes. Using LSI driver instead of TFT, optical circuits are fabricated on LSL.

Figure 57:
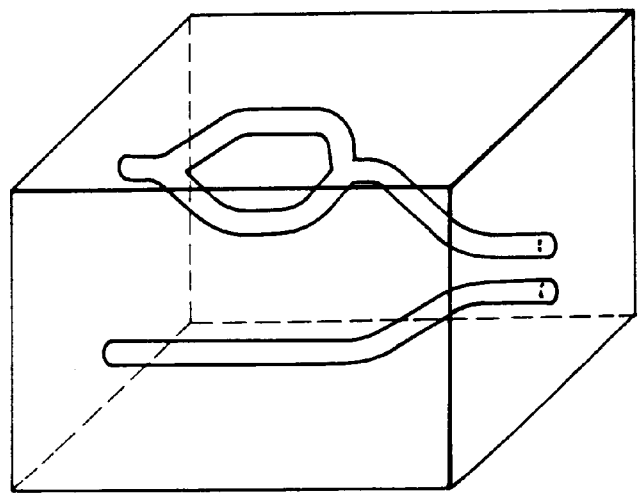
FIG. 57 is a block drawing of a compound optical device.

The following explanation refers to FIG. 57. A compound optical device having a complex shape like the compound optical device indicated in FIG. 57 can be manufactured using this method.

The following provides an explanation of a tenth embodiment of the present invention. In the eighth and ninth embodiments, one of the opposing fine electrodes may be arranged above a substrate as indicated in the seventh embodiment. Furthermore, when it is difficult achieve a fine size for the electrodes formed on a substrate, said electrodes may be formed into an integrated structure.

According to a fifth aspect of the present invention, a process for manufacturing an organic non-linear optical material is provided that includes the forming of a pre-oriented film on a substrate resulting in orientation of the molecular chain of a polymer film or the promotion of orientation of polar groups during forming of at least one pair of electrodes on said substrate and manufacturing said polymer film by CVD or VDP while applying a voltage between said electrodes.

More specifically, the present invention allows the manufacturing of a high molecular weight, three-dimensional optical waveguide that is able to realize coating of a polymer film using a dry process as well as both polymer film coating and waveguide formation in a single step, and particularly, the manufacturing of an optical waveguide having an arbitrary refractive index distribution, a completely embedded optical waveguide, an optical waveguide that changes in the vertical direction on a substrate, and an optical waveguide comprising a multilayer structure of the above.

As was previously stated with respect to a fourth characteristic of the present invention, when a polymer film is coated using CVD or VDP while applying an electric field between electrodes formed on a substrate, a polymer chain having polar groups is oriented as a result of orientation of polar molecules. On the other hand, when an oriented film is formed on a substrate during coating of a polymer film by CVD or VDP, a polymer chain is oriented. Accordingly, in the present invention, a substrate, on which an oriented film is formed as the substrate, is used during manufacturing of a polymer film by this electric field-assisted CVD.

In the case of attempting to manufacture a polymer film that is oriented by electric field-assisted CVD, if the orientation of the polymer chain and the orientation of the polar groups are not coinciding, the magnitude of the molecular polarization is too small, or the applied voltage is not sufficient, it may be difficult to obtain an optical waveguide by orienting the polymer chains by electric field-assisted CVD. If an oriented film is used at such times, an optical waveguide can be formed in which the polymer chains are oriented.

In addition, the orientation efficiency of molecular polarization by the application of an electric field can be optimized by controlling the orientation of the polymer chains according with an oriented film. As a result, the non-linear optical constant of the polymer film can be improved.

Moreover, polymer non-linear optical devices can be formed in a single process by forming a passive waveguide pattern using an oriented film, and performing CVD coating while applying an electric field to a portion of that pattern.

According to the process of the present invention, the following advantages can be obtained. More specifically, in the case of manufacturing an optical waveguide by coating a polymer film by electric field-assisted CVD, the entire optical waveguide will demonstrate non-linear optical effects. However, if a pre-oriented film is formed only at a specific portion of a substrate at this time, and a polymer film is formed by electric field-assisted CVD using this substrate, a waveguide can be obtained wherein non-linear optical effects are only demonstrated by that portion of the substrate. In addition, when attempting to manufacture a polymer non-linear optical device by electric field-assisted CVD, there are disadvantages including the electrode pattern required for application of the electric field being excessively complex, and manufacturing of such a device being excessively difficult. However, in such cases, the electrode pattern can be simplified by forming a pre-oriented film on a substrate, thus allowing the manufacturing of such devices.

The following provides a detailed explanation of the above-mentioned invention through its embodiments.

Figure 58:
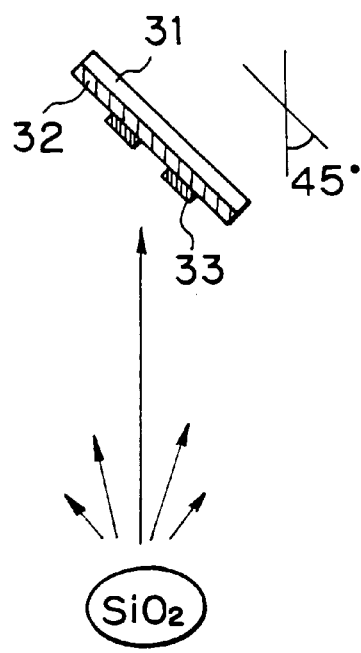
FIG. 58 is an explanatory drawing of the formation of an oriented film by oblique evaporation deposition.

The following provides an explanation of a first embodiment of the present invention. As indicated in FIG. 58, after thermal oxidizing silicon wafer 31 and forming $SiO_2$ layer 32, a single pair of opposing Al electrodes 33 was formed on said $SiO_2$ layer at an interval of 10 μm. After positioning this by inclining at an angle of 45° and forming an $SiO_2$ oblique evaporation deposited film using EB evaporation to form the oriented film, the $SiO_2$ film on the electrodes was removed by lift-off.

Electric field-assisted CVD was then performed under the conditions indicated below after placing orthophthalaldehyde (OPA) and methoxyphenylenediamine (MPDA) in separate cells of a CVD apparatus and heating to evaporation.

| | | |
|---|---|---|
| Substrate temperature | Room temperature | |
| Gas pressure | $1 \times 10^{-3}$ Torr | |
| Deposition rate | Approx. 5 Å/s | |
| Film thickness | 1 μm | |
| Applied voltage | 20V (Max. 0.2 MV/cm) | |
| Cell temperatures | OPA: | 45 to 55° C. |
| | MPDA: | 60 to 70° C. |

In addition, with the exception of not forming the $SiO_2$ oriented film, electric field-assisted CVD was also performed in the exact same manner as described above, and resulting two samples were compared. All experiments were carried out using an He-Ne laser.

As a result, in the case when an oriented film was present, a channeled waveguide was formed having an electrooptical constant r up to 0.1 pm/V. On the other hand, in the case when an oriented film was not present, a slab-type waveguide instead of a channeled waveguide was formed. The part between the electrodes gap of this slab-type waveguide demonstrated an electrooptical constant r up to 0.03 pm/v.

Based on the above-mentioned results, the molecules are oriented and a channeled waveguide is formed due to the present of an oriented film. In addition, the degree of orientation of the polar portion is increased resulting in improved electrooptical effect.

Figure 59:
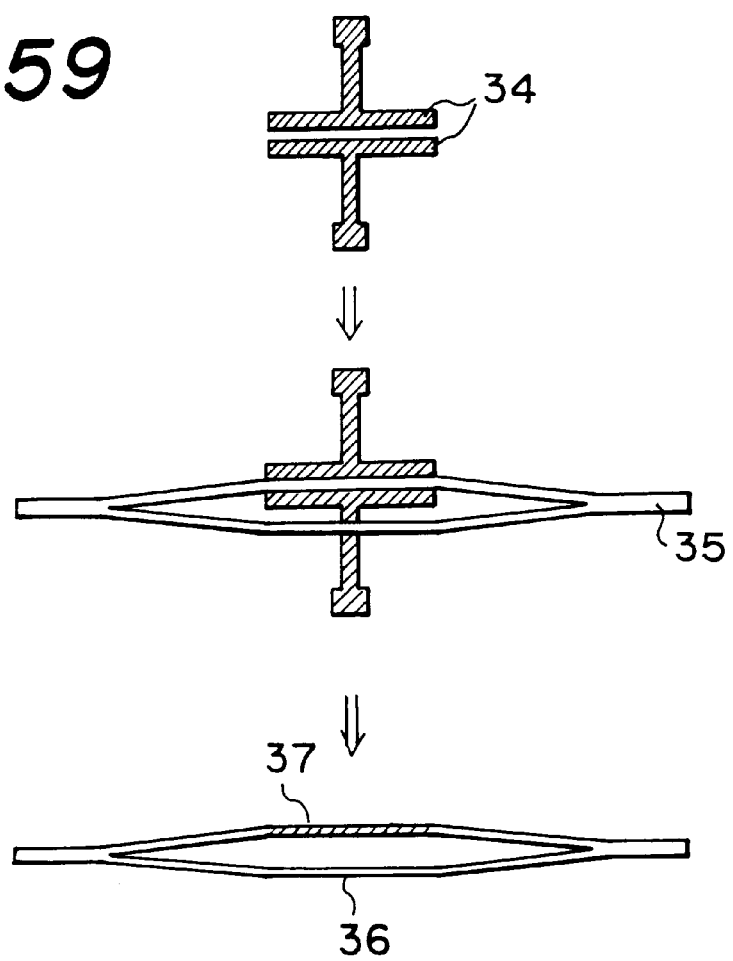
FIG. 59 is a drawing indicating an example of the structure of a polymer non-linear optical device.

The following provides an explanation of a second embodiment of the present invention. Al electrode 34 was formed on a substrate comprising the same Si wafer having an $SiO_2$ layer that was used in the first embodiment as indicated in FIG. 59. Next, $SiO_2$ angled evaporation deposited film 35 was form in the exact same manner as in the first embodiment in the shape indicated in the drawing. Electric field-assisted CVD was then performed using this for the substrate. The resulting film formed a Mach-Zehnder switching device and the intensity of outgoing light was observed to change when a voltage of 6.5 V was applied.

Thus, a polymer non-linear optical device was formed in a single process containing passive optical waveguide 36 and non-linear optical waveguide 37.

According to a sixth aspect of the present invention, an optical switch between over and under waveguides is provided comprising a single pair of upper and lower optical waveguides formed using a non-linear optical material, wherein the orientation of polarization of the over and under optical waveguides is mutually opposite, and light migrates between the optical waveguides as a result of application of an electric field.

In addition, an optical switch between upper and lower waveguides is provided comprising a single pair of over and under optical waveguides formed using a non-linear optical material, wherein the orientation of polarization of the over and under optical waveguides is equal, an intermediate layer is provided between the optical waveguides that is weakly polarized in the opposite direction, and light migrates between the optical waveguides as a result of application of an electric field. In addition, an optical switch between over and under waveguides is provided wherein optical waveguides are formed using a non-linear optical material to pass over and under a passive waveguide, the orientation of polarization of the over and under waveguides is mutually opposite, and light of said passive waveguide migrates to either of the over and under optical waveguides as a result of application of an electric field by a pair of electrodes.

In addition, the present invention also provides a three-dimensional optical switch that includes a multilayer waveguide formed by using at least one of the above-mentioned optical switches between upper and lower waveguides, wherein the direction of migration of light is arbitrarily controlled within a plane and between layers. As a result of employing this constitution, an optical switch between upper and lower waveguides that can migrate light between upper and lower waveguides, as well as a three-dimensional optical waveguide, can be obtained.

FIGS. 60a through 60c, 61a through 61c and 62a through 62d are theoretical explanatory drawings of an optical switch between upper and lower waveguides of the present invention.

The optical switch between upper and lower waveguides indicated in FIGS. 60a through 60c is provided with optical waveguides 41,42 composed of non-linear optical materials, having mutually different directions of polarization as indicated by the arrows, and arranged above and below in parallel on substrate 40 as indicated in FIG. 60a, and a pair of electrodes 43,43'. The upper and lower optical waveguides have the same magnitude of refractive indices as indicated in FIG. 60b. When a voltage is applied to electrodes 43,43' and an electrical field is applied to optical waveguides 41,42, the refractive index of one of the optical waveguides 41 decreases and that of the other optical waveguide 42 increases due to electrooptical effects. As a result, the difference in refractive indices between both optical waveguides 41,42 becomes large resulting in the complete absence of coupling. The light path thus changes from the state of FIG. 60b to the state of FIG. 60c.

In addition, FIGS. 61a through 61c indicate an optical switch between upper and lower waveguides wherein optical waveguides 44,45, composed of non-linear optical materials, having identical directions of polarization as indicated by the arrows, and arranged above and below in parallel on substrate 40 as indicated in FIG. 61a, and a pair of electrodes 43,43' are formed on said substrate 40, intermediate layer 46 is weakly polarized in the opposite direction, and the refractive indices of upper and lower waveguides 44,45 and intermediate layer 46 are as indicated in FIG. 61b. When a voltage is applied to electrodes 43, 43' and an electrical field is applied to optical waveguides 44,45 and intermediate layer 46, the refractive indices of optical waveguides 44,45 decrease and the refractive index of intermediate layer 46 increases due to electrooptical effects as indicated in FIG. 61c. As a result, the potential barrier is lowered and the light path changes from that in FIG. 61b to that in FIG. 61c.

In addition, FIGS. 62a through 62d indicate an optical switch between upper and lower waveguides provided with optical waveguides 47,48 composed of a non-linear optical material, having identical directions of polarization as indicated by the arrows, and arranged above and below in parallel on substrate 40 as indicated in FIG. 62a, a pair of electrodes 43,43', and passive waveguide 49 arranged between optical waveguides 47,48. The refractive indices of said optical waveguides 47,48 and passive waveguide 49 are as indicated in FIG. 62d. When a voltage is not applied to electrodes 43,43', optical waveguides 47,48 and passive waveguide 49 are not coupled resulting in light being guided through passive waveguide 49 as indicated in FIG. 62d.

In addition, when a positive voltage is applied to electrodes 43,43', the refractive index of upper optical waveguide 47 decreases and the refractive index of lower optical waveguide 48 increases as a result of electrooptical effects as indicated in FIG. 62b. As a result, coupling forms between lower optical waveguide 48 and central passive waveguide 49 resulting in light migrating to lower optical waveguide 48. In addition, when an opposite voltage is applied, the refractive index of upper optical waveguide 47 increases and the refractive index of lower optical waveguide 48 decreases as a result of electrooptical effects as indicated in FIG. 62c. As a result, coupling forms between upper optical waveguide 47 and central passive waveguide 49 resulting in light migrating from passive waveguide 49 to upper optical waveguide 47.

Figure 63:
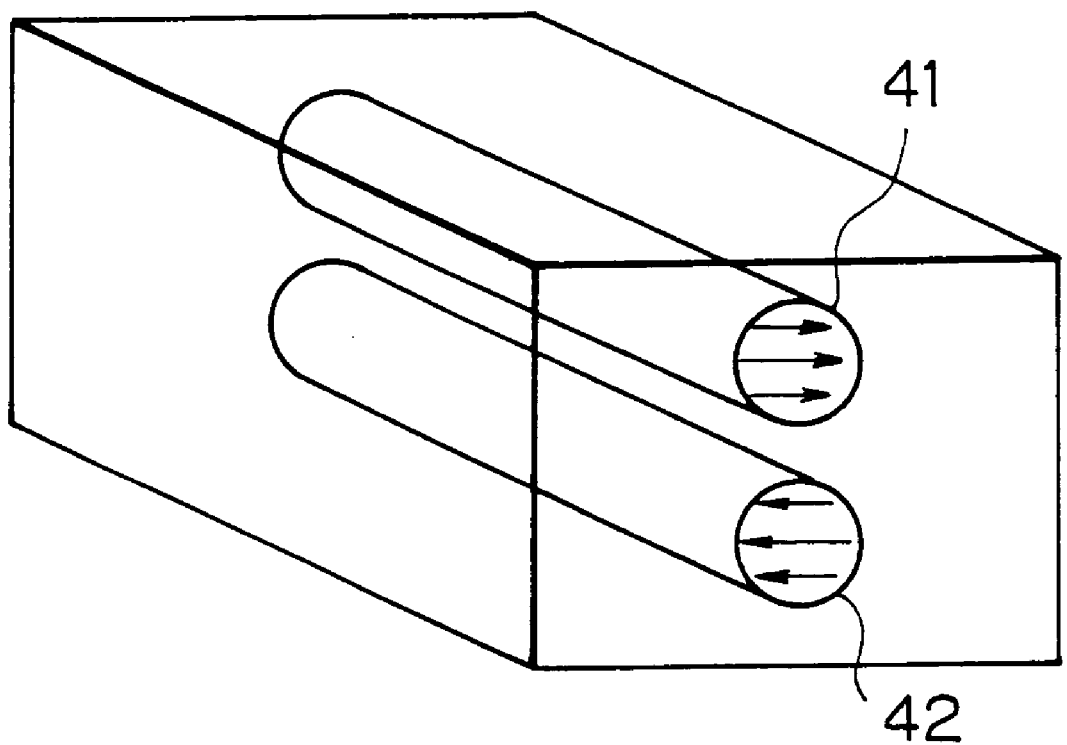
FIG. 63 is a drawing indicating a first embodiment of the optical switch between upper and lower waveguides of the present invention.

FIG. 63 indicates a first embodiment of the optical switch between upper and lower waveguides of the above-mentioned present invention.

In the present embodiment, Al is evaporation deposited on thermal oxidized Si serving as the substrate not shown. A pattern having a gap of 10 μm is formed by etching to serve as the electrodes. Optical waveguides 41,42 are then formed using a polymer by CVD so as to be in parallel above and below, and polarized in the directions indicated with the arrows in FIG. 63.

Although the reversing of the orientation of polarization in the over and under optical waveguides is not possible with ordinary polling utilizing the glass transition of the polymer (since polling of the over and under optical waveguides cannot be performed separately), in the present embodiment, optical waveguides were formed by changing the orientation and magnitude of polarization one layer at a time, using CVD film formation while applying an electric field. In the case of CVD film since formation in the presence of an electric field, polarization orientation is performed simultaneous to polymerization and the film is fixed as is, when forming upper optical waveguide 41, the polarization of the lower optical waveguide is not reversed even when an electric field of opposite orientation is applied.

Previously described AEANP (2-(2-aminoethylamino)-5-nitropyridine) and TMBE (tetramethylbiphenylepoxy) were used for the molecules used in CVD film formation. An AEANP/BE polymer having the molecular structure described previously was obtained by CVD at a substrate temperature of 32° C. and applied electrical field of 800 v (0.8 Mv/cm). The refractive index of the resulting polymer was approximately 1.7 and the electrooptical constant was approximately 5 pm/V.

In the present embodiment composed in this manner, when the cross-sections of optical waveguides 41,42 have a width of 10 μm and a thickness of 0.6 μpm, and the interval between upper and lower waveguides is 0.4 μm, the migration of laser light was confirmed between the upper and lower waveguides according to the principle explained in FIG. 60 when a voltage of 10 V/μm was applied to the electrodes.

Figure 64:
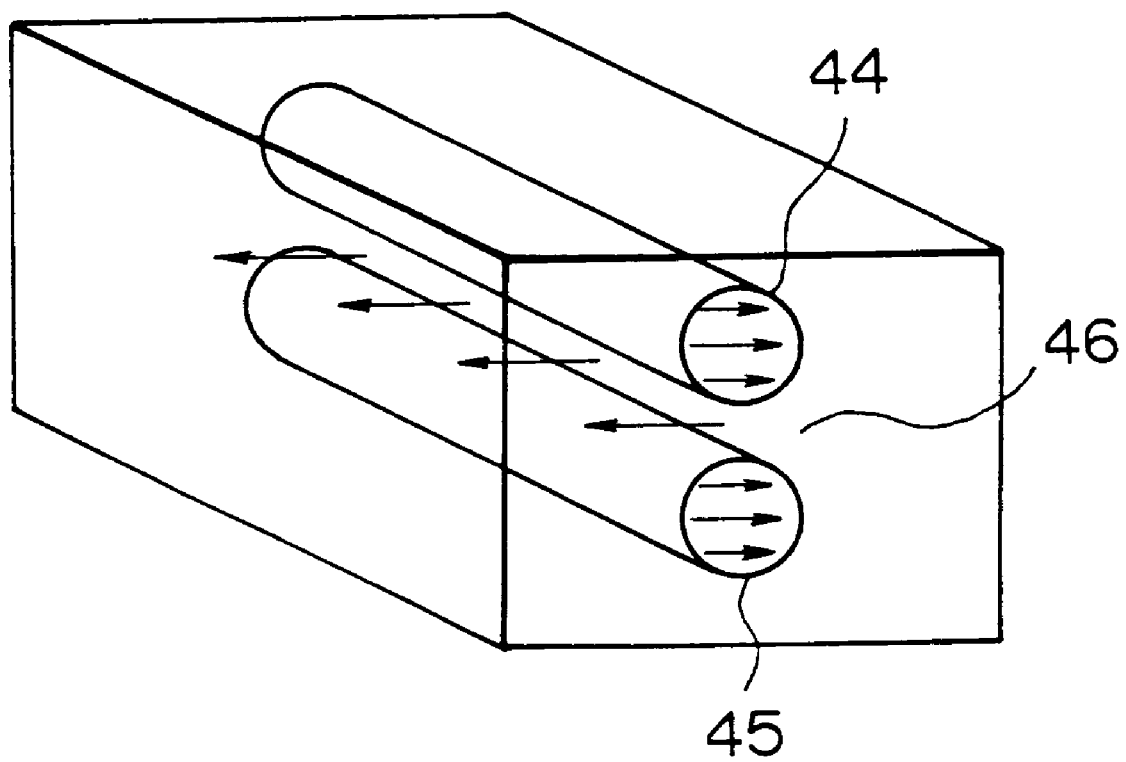
FIG. 64 is a drawing indicating a second embodiment of the optical switch between upper and lower waveguides of the present invention.

FIG. 64 indicates a second embodiment of an optical switch between upper and lower waveguides of the present invention. The constitution of this embodiment is essentially the same as that of the previous embodiment with the exception of the direction of polarization of over and under optical waveguides 44,45 being the same, and the intermediate layer being formed to be weakly polarized in the opposite direction.

In the present embodiment, when the cross-sections of optical waveguides 44,45 have a width of 10 μm and a thickness of 0.6 μm, and the thickness of intermediate layer 46 is 0.6 μm, the migration of laser light was confirmed between the upper and lower waveguides according to the principle explained in FIG. 61 when a voltage of 8 V/μm was applied to the electrodes.

Figure 65:
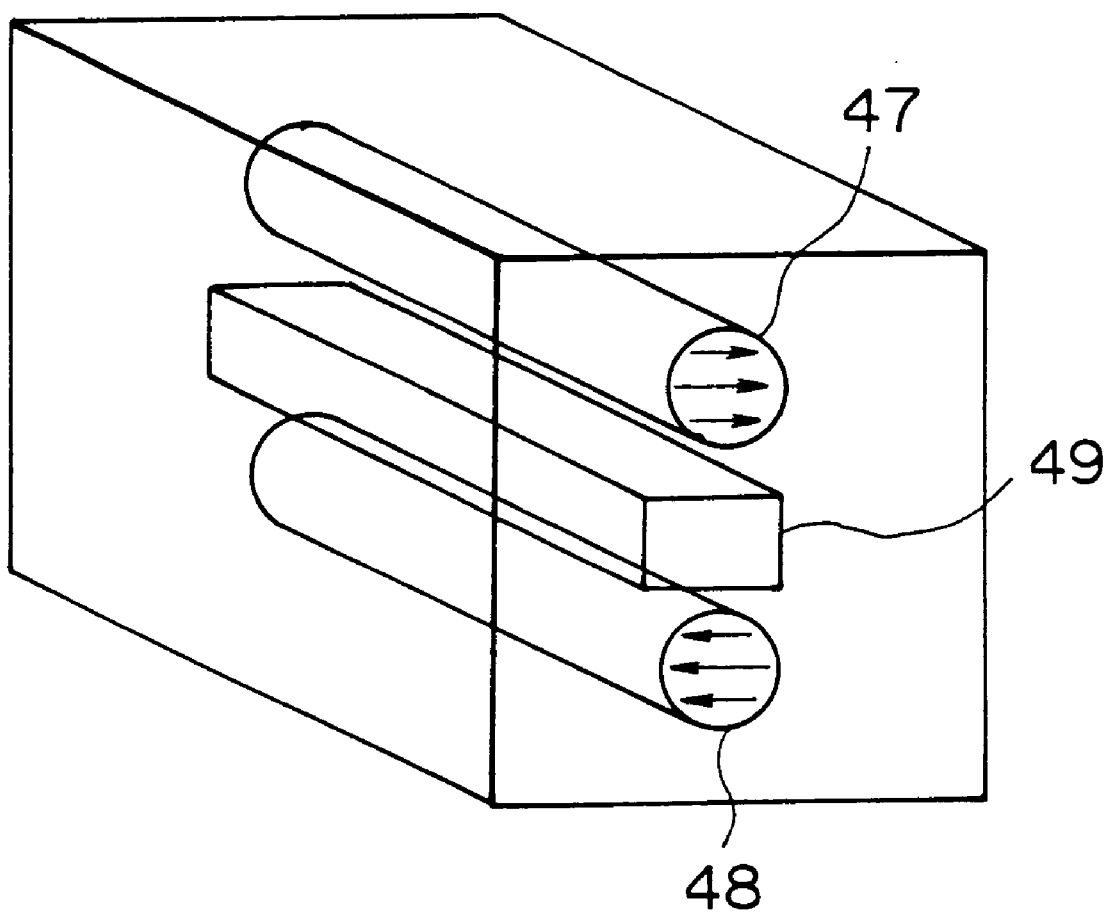
FIG. 65 is a drawing indicating a third embodiment of the optical switch between upper and lower waveguides of the present invention.

FIG. 65 indicates a third embodiment of the optical switch between upper and lower waveguides of the present invention. This embodiment is similar to the first embodiment with the exception of a passive waveguide 49 being provided between over and under optical waveguides 47, 48. Furthermore, the passive waveguide was fabricated by pattering of chalcogenite glass (As—S—Se—Ge base, refractive index: approximately 2.4) using an electron beam.

In the present embodiment, when the cross-sections of optical waveguides 47,48 and passive waveguide 49 have a width of 10 μm and a thickness of 0.6 μm, and the interval between each of the waveguides is 0.4 μm, switching of laser light to upper and lower optical waveguides 47,48 was confirmed according to the principle explained in FIG. 62 when a voltage of 15 v/μm was applied to the electrodes.

In the above-mentioned first through third embodiments, switching operation was demonstrated at an applied voltage of 80–90% that of the type wherein polarization is made uniform in the same direction. In addition, selective switching to over and under waveguides, as in the case of the third embodiment of FIG. 65, can naturally not be realized with the type wherein polarization is made uniform in the same direction.

Figure 66:
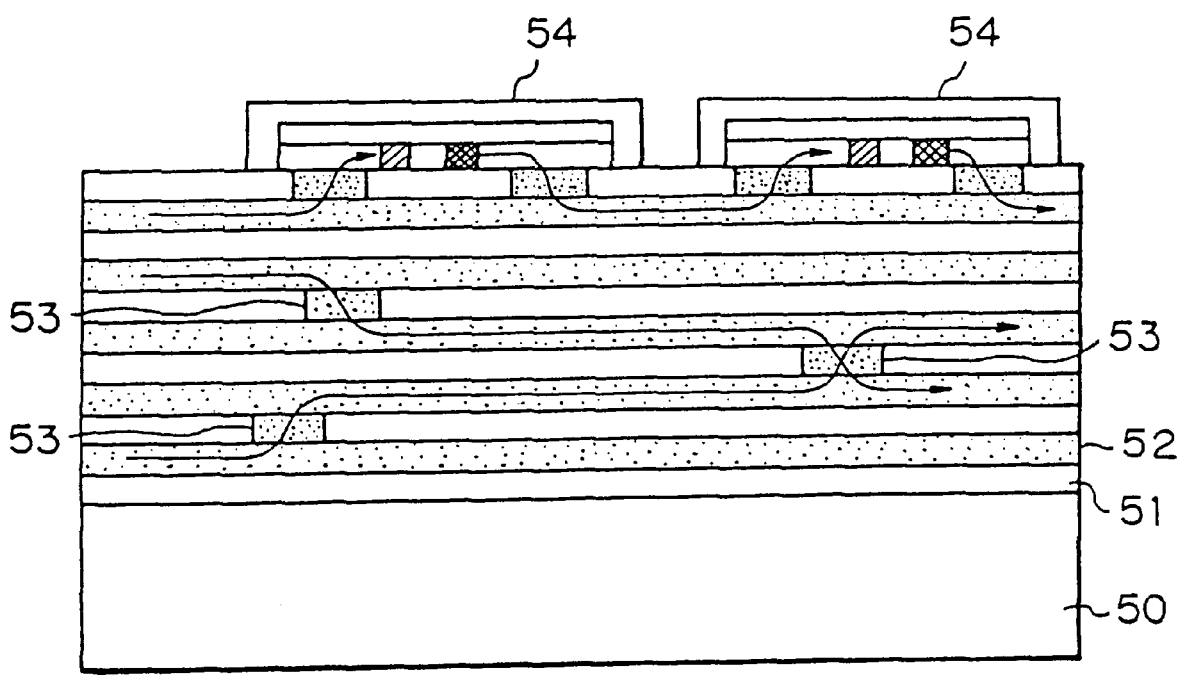
FIG. 66 is a cross-sectional view indicating an embodiment of the three-dimensional optical circuit of the present invention.

FIG. 66 is a cross-sectional view indicating an embodiment of a three-dimensional optical circuit of the present invention.

In this embodiment, a buffer layer 51 and optical waveguide layer 52, comprising a polymer having a high refractive index, are alternately layered on substrate 50. The optical switch 53 of the above-mentioned first through third embodiments are arranged at the required locations to form a a multilayer optical waveguide. IC 54, equipped with an optical transmission and receiving device, were then arranged on top. Furthermore, a known optical switch of the prior art should be provided for migration of light within the same layer.

According to the present embodiment, light can be bent in an arbitrary direction by optical switch 53 in a multilayer waveguide, thereby allowing that light to be guided to the target IC terminal (optical receiving portion).

We claim:

1. An optical circuit device containing an organic film formed on a substrate, said film either being selectively formed on a portion of the region on a substrate or said film being formed over the entire region on a substrate, and a portion of a region of that film either being selectively formed to a thickness differing from other regions or selectively having a different structure wherein the organic film is an organic polymer film, a polysilane film, an organic low molecular weight crystal film or an organic low molecular weight/high molecular weight compound film and wherein the organic polymer film is a polymer film having for its base polyazomethine, polymethylmethacrylate, polyvinylcarbazole, polycarbonate or polystyrene; a polymer film obtained by bonding a molecule containing two or more groups chosen from a dianhydride group of carboxylic acid, an acid halogenated group of carboxylic acid, an —NCO group and a —CHO group, and a molecule containing at least two or more groups chosen from a group containing one or more amino groups or amino protons, an alkylamino group having 1–10 carbon atoms and a silylated amino group; or, a polymer film obtained by bonding a molecule containing two or more epoxy groups, and a molecule containing two or more groups chosen from a group containing one or more amino groups or amino protons, an alkylamino group having 1–10 carbon atoms, and a silylated amino group.

2. A multilayer optical circuit at least partially containing an optical waveguide comprised of an optical circuit device containing an organic film formed on a substrate, said film either being selectively formed on a portion of the region on a substrate or said film being formed over the entire region on a substrate, and a portion of a region of that film either being selectively formed to a thickness differing from other regions or selectively having a different structure wherein all or a portion of the optical waveguide buffer cladding is comprised of a secondary and/or tertiary non-linear optical material.

3. A circuit as set forth in claim 2 having a means whereby an optical waveguide is formed in multiple layers, and light passes between at least a portion of the optical waveguide of the upper layer and at least a portion of the optical waveguide of the lower layer.

4. A circuit as set forth in claim 3 wherein the means whereby light passes is a directional coupler.

5. A circuit as set forth in claim 3 wherein the means whereby light passes is such that the width of the waveguides of the upper and lower layers is either increased or decreased with respect to the propagating direction of the waveguide light.

6. A circuit as set forth in claim 5 wherein the increase or decrease of the width of the optical waveguides is carried out by forming into a tapered shclpe.

7. A circuit as set forth in claim 3 wherein the means whereby light passes comprises a grating structure formed in the waveguide of the upper and/or lower layer or a layer in contact with those.

8. A circuit as set forth in claim 7 wherein the period of the grating structure has distribution.

9. A circuit as set forth in claim 2 wherein an optical and/or electronic element is mounted in the upper and/or lower portion of an optical circuit.

10. A circuit as set forth in claim 9 wherein an optical waveguide or optical waveguide buffer clad-layer is formed in the optical and/or electronic element mounted in an optical circuit, said optical waveguide or optical waveguide buffer clad layer is adhered to the upper and/or lower surface of an optical circuit substrate, and light is introduced into an optical circuit and/or extracted from an optical circuit.

11. A multilayer optical circuit at least partially containing an optical waveguide comprised of an optical circuit device containing an organic film formed on a substrate, said film either being selectively formed on a portion of the region on a substrate or said film being formed over the entire region on a substrate, and a portion of a region of that film either being selectively formed to a thickness differing from other regions or selectively having a different structure; wherein an optical and/or electronic element is mounted in the upper and/or lower portion of an optical circuit; wherein an optical waveguide or optical waveguide buffer clad layer is formed in said element and is adhered to the upper and/or lower surface of an optical circuit substrate; wherein light is introduced into or extracted from said optical circuit; and wherein is formed the means whereby light passes of the multilayer optical circuit as defined in anyone of claims 4 through 8.

12. A circuit as set forth in anyone of claims 2 through 10 wherein electrical wiring is formed in the same layer as the layer in which an optical waveguide is formed, and/or a different layer from the layer in which an optical waveguide is formed, and/or the interface between those layers.

13. A circuit as set forth in anyone of claims 2 through 10 wherein the optical waveguide and/or buffer clad layer are insulated.

14. A circuit as set forth in anyone of claims 2 through 10 wherein the optical waveguide guides light of a plurality of wavelengths.

15. An optical switch between upper and lower waveguides that performs migration of light between optical waveguides by applying an electrical field, comprising a pair of upper and lower optical waveguides formed using a non-linear optical material, and the orientation of polarization of said upper and lower optical waveguides being mutually reversed.

16. An optical switch between upper and lower waveguides that performs migration of light between optical waveguides by applying an electrical field, comprising a pair of upper and lower optical waveguides formed using a non-linear optical material, the orientation of polarization of said upper and lower optical waveguides is the sane, and an intermediate layer is provided that is weakly polarized in the opposite direction between the optical waveguides.

17. An optical switch between upper and lower waveguides wherein optical waveguides are formed using a non-linear optical material above and below a passive waveguide, the orientation of polarization of the upper and lower optical waveguides is reversed, and the light of said passive optical waveguide is migrated into arbitrary upper and lower optical waveguides by applying an electrical field by a pair of electrodes.

18. A three-dimensional optical circuit containing a multilayer waveguide formed using an optical switch between upper and lower waveguides, said upper and lower waveguides being in parallel above and below one another and polarized, said optical switch allows the direction of propagation of light to be arbitrarily controlled in a plane as well as between layers.

19. An optical circuit device having an optical waveguide, the optical circuit device containing an organic or inorganic thin film pattern formed on a substrate and an organic film selectively formed on regions on the substrate other than on said organic or inorganic thin film pattern.

20. An optical circuit device having an optical waveguide, the optical circuit device containing an organic or inorganic thin film pattern formed on a substrate and an organic film formed over the entire region on the substrate including regions on which said organic or inorganic thin film pattern is formed, the organic film having a different thickness on said organic or inorganic thin film pattern or on regions on the substrate other than on said organic or inorganic thin film pattern.

21. An optical circuit device having an optical waveguide, the optical circuit device containing an organic or inorganic thin film pattern formed on a substrate and an organic film formed over the entire region on the substrate including regions on which said organic or inorganic thin film pattern is formed, the organic film having a different structure on said organic or inorganic thin film pattern or on regions on the substrate other than on said organic or inorganic thin film pattern.

* * * * *